US012646369B2

(12) United States Patent
Nishimura et al.

(10) Patent No.: US 12,646,369 B2
(45) Date of Patent: Jun. 2, 2026

(54) PAPER SHEET HANDLING DEVICE, CALCULATION METHOD OF NUMBER OF PAPER SHEETS IN PAPER SHEET BATCH, AND PROGRAM

(71) Applicant: JAPAN CASH MACHINE CO., LTD., Osaka (JP)

(72) Inventors: Fumihide Nishimura, Osaka (JP); Kazuya Uemura, Osaka (JP); Koji Yoshitake, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 180 days.

(21) Appl. No.: 18/257,742

(22) PCT Filed: Nov. 8, 2021

(86) PCT No.: PCT/JP2021/041045
§ 371 (c)(1),
(2) Date: Jun. 15, 2023

(87) PCT Pub. No.: WO2022/137850
PCT Pub. Date: Jun. 30, 2022

(65) Prior Publication Data

US 2024/0054846 A1 Feb. 15, 2024

(30) Foreign Application Priority Data

Dec. 24, 2020 (JP) ................................ 2020-214908

(51) Int. Cl.
*G07D 11/22* (2019.01)
*B65H 5/04* (2006.01)
(Continued)

(52) U.S. Cl.
CPC ............... *G07D 11/22* (2019.01); *B65H 5/04* (2013.01); *B65H 29/12* (2013.01); *B65H 31/30* (2013.01);
(Continued)

(58) Field of Classification Search
CPC .... G07D 11/50; G07D 11/22; B65H 2511/13; B65H 2511/15; B65H 2701/1912; B65H 2511/30; B65H 2301/422
See application file for complete search history.

(56) References Cited

U.S. PATENT DOCUMENTS

| | | | | |
|---|---|---|---|---|
| 9,939,857 B1 * | 4/2018 | Pham | ...................... | G06F 1/187 |
| 2021/0125447 A1 | 4/2021 | Oiyama | | |

FOREIGN PATENT DOCUMENTS

| | | | | |
|---|---|---|---|---|
| EP | 0819634 A1 * | 1/1998 | ......... | B65H 2511/25 |
| JP | S59-74468 U | 5/1984 | | |

(Continued)

OTHER PUBLICATIONS

WIPO, Japanese International Search Authority, International Search Report (with English translation) and Written Opinion mailed Dec. 7, 2021 in International Patent Application No. PCT/JP2021/041045, 8 pages.

(Continued)

*Primary Examiner* — Jeremy R Severson
(74) *Attorney, Agent, or Firm* — MASUVALLEY & PARTNERS; Peter Martinez

(57) ABSTRACT

The present invention provides a paper sheet handling device that can calculate the number of paper sheets in a paper sheet batch being transported on a transport route without requiring complicated processing. The paper sheet handling device includes a transport unit that can transport a paper sheet batch, a shifting unit that shifts according to the thickness of the paper sheet batch when the paper sheet
(Continued)

batch is transported, a generating unit that generates thickness information based on a shift amount of the shifting unit, a memory unit that memorizes reference information determined based on the thickness of one paper sheet, and a calculating unit that calculates the number of paper sheets in the paper sheet batch from the thickness information and the reference information.

6 Claims, 57 Drawing Sheets

(51) Int. Cl.

| | |
|---|---|
| ***B65H 29/12*** | (2006.01) |
| ***B65H 31/30*** | (2006.01) |
| ***B65H 43/00*** | (2006.01) |
| ***G07D 11/16*** | (2019.01) |
| ***G07D 11/50*** | (2019.01) |

(52) U.S. Cl.

CPC ............. *B65H 43/00* (2013.01); *G07D 11/16* (2019.01); *G07D 11/50* (2019.01); *B65H 2301/321* (2013.01); *B65H 2404/144* (2013.01); *B65H 2511/13* (2013.01); *B65H 2511/15* (2013.01); *B65H 2511/224* (2013.01); *B65H 2511/30* (2013.01); *B65H 2553/22* (2013.01); *B65H 2555/21* (2013.01); *B65H 2557/30* (2013.01); *B65H 2701/1912* (2013.01); *G07D 2211/00* (2013.01)

(56) References Cited

FOREIGN PATENT DOCUMENTS

| | | | |
|---|---|---|---|
| JP | 2001-113029 | A | 4/2001 |
| JP | 2007-072885 | A | 3/2007 |
| JP | 2011-164802 | A | 8/2011 |
| JP | 6449972 | B1 | 1/2019 |

OTHER PUBLICATIONS

Japanese Patent Office, Office Action dated Nov. 19, 2021 with English translation in Japanese Patent Application No. 2020-214908, 6 pages.

* cited by examiner

FIG.5(a) NEUTRAL STATE
FIG.5(b) COLLECTING OPERATION STATE
FIG.5(c) RETURN OPERATION STATE

■DETECTING PROCESSING

■ CORRECTING PROCESSING

PAPER SHEET HANDLING DEVICE, CALCULATION METHOD OF NUMBER OF PAPER SHEETS IN PAPER SHEET BATCH, AND PROGRAM

RELATED APPLICATIONS

This application is the U.S. National Phase of and claims priority to International Patent Application No. PCT/JP2021/041045, International Filing Date Nov. 8, 2021, entitled Paper Sheet Handling Device, Method For Calculating Number Of Paper Sheets In Paper Sheet Bundle, And Program, which claims benefit of Japanese Application No. 2020-214908 filed Dec. 24, 2020, both of which are incorporated herein by reference in their entireties.

FIELD

The present invention relates to a paper sheet handling device, a calculation method of the number of paper sheets in a paper sheet batch, and a program.

BACKGROUND

Techniques for calculating the number of transported paper sheets are conventionally employed. For example, a technique for detecting transported paper sheets one by one and adding a value "1" to number information indicating the number of transported paper sheets each time a paper sheet is detected is disclosed in a configuration described in Patent Literature 1.

CITATION LIST

Patent Literature

Patent Literature 1: Japanese Patent Application Laid-open No. 2001-113029

SUMMARY

Technical Problem

A technique for collecting a plurality of paper sheets as a paper sheet batch and transporting this paper sheet batch is employed in some cases. However, in the configuration described in Patent Literature 1, the number of paper sheets in the state of a paper sheet batch cannot be calculated. In view of circumstances described above, the present invention has an object to enable the number of paper sheets transported as a paper sheet batch to be calculated (estimated).

Solution to Problem

In order to solve the above problem, a paper sheet handling device according to the present invention includes a transport unit that transports a paper sheet batch, a shifting unit that shifts according to a thickness of the paper sheet batch when the paper sheet batch is transported by the transport unit, a generating unit that generates thickness information based on a shift amount of the shifting unit, a memory unit that memorizes reference information determined based on a thickness of one paper sheet, and a calculating unit that calculates the number of paper sheets in the paper sheet batch from the thickness information and the reference information.

Advantageous Effects of Invention

According to the present invention, it is possible to calculate the number of paper sheets in a paper sheet batch.

DESCRIPTION OF EMBODIMENTS

Figure 1:
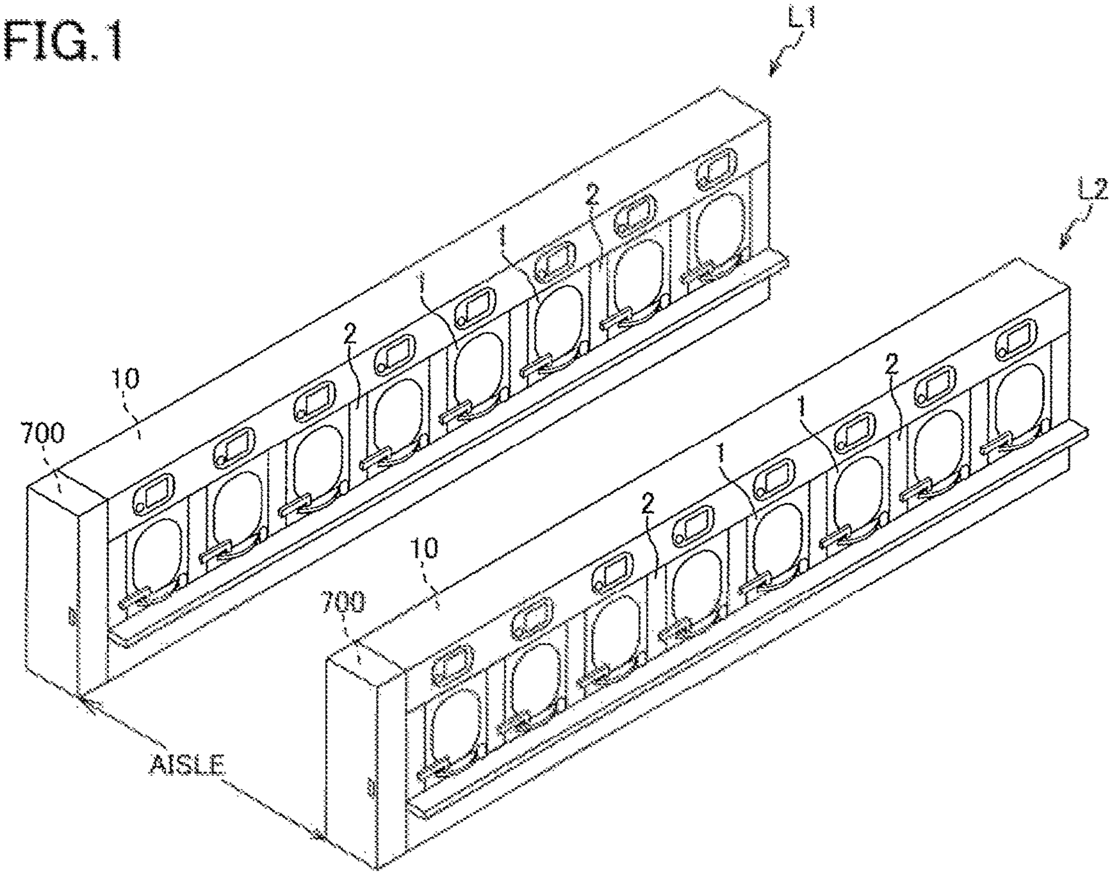
FIG. 1 is a perspective view illustrating a schematic configuration of a bank facility including a plurality of game machines.

The present invention will be described below in detail with an embodiment illustrated in the drawings. Constituent elements, types, combinations, shapes, and relative arrangements described in the following embodiment are merely explanatory examples, and are not intended to limit the scope of the present invention solely thereto unless otherwise specified.

An embodiment of the present invention is described below in detail.

A. Paper Sheet Transport System According to First Invention

A basic configuration and an operation of a paper sheet transport system according to a first invention are explained below.

The paper sheet transport system is installed on each of bank facilities in a game hall where various types of game machines such as pachinko machines or pachislot (pachinko-slot) machines are installed. Although banknotes are mainly explained as an example of paper sheets in the following embodiment, the present invention is also applicable to paper sheets (sheets) other than the banknotes, including securities such as cash vouchers or gift certificates, cards, and the like.

Although not particularly illustrated or explained, the paper sheet transport system according to the present invention is also applied to a banknote transport system or a banknote transport device in casinos.

[Schematic Configuration of Bank Facilities]

FIG. 1 is a perspective view illustrating a schematic configuration of bank facilities including a plurality of game machines.

Game machines 1 are installed on bank facilities L (L1, L2, . . . ) and eight game machines 1 are arranged back to back on each of two opposing side surfaces of each of the bank facilities L, that is, a total of 16 game machines 1 are arranged back to back. An aisle on which players or clerks of the game hall walk is provided between the bank facilities L and a chair (not illustrated) is provided for each of the game machines 1 on the aisles.

A sandwiched machine 2 is installed for each of the game machines 1 on the bank facilities L. The sandwiched machine 2 includes a banknote inlet (a banknote input part) that receives input banknotes, a game media dispensing device that dispenses the number of pachinko balls corresponding to the money amount of input banknotes, and the like. A banknote transport system 10 that transports banknotes inserted through the sandwiched machines 2 to a cashbox unit 700 placed at one end portion of the associated bank facility L is installed in each of the bank facilities L illustrated in FIG. 1.

Figure 2:
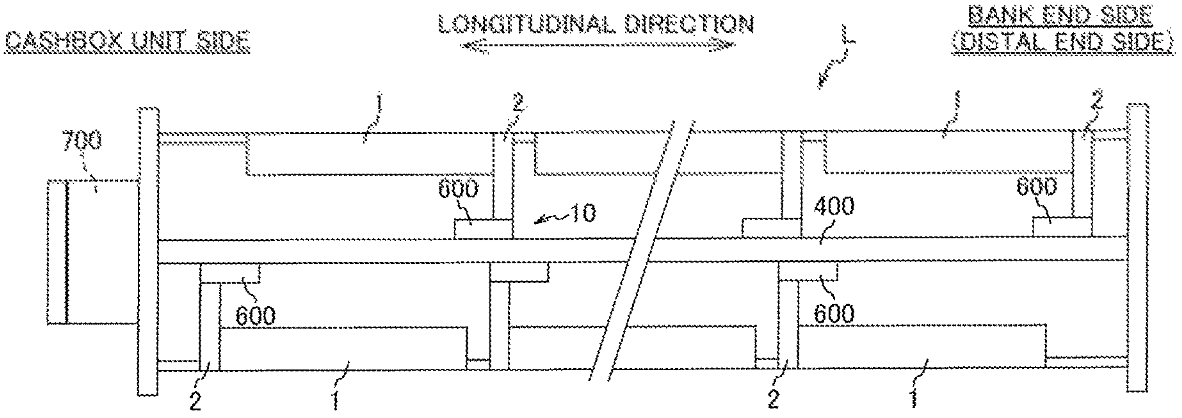
FIG. 2 is a plan view illustrating a schematic configuration of the bank facility including a plurality of the game machines.

FIG. 2 is a plan view illustrating a schematic configuration of the bank facility including a plurality of the game machines.

The banknote transport system 10 installed in each of the bank facilities L includes receiving units (paper sheet receiving devices) 600 that each receive banknotes inserted from the banknote inlet of the associated sandwiched machine 2 therein, a transport tube 400 that extends in a longitudinal direction of the bank facility L (an array direction of the game machines 1) and that transports the banknotes received by the receiving units 600, the cashbox unit 700 that is arranged at one end of the transport tube 400, and the like.

[Schematic Configuration of Banknote Transport System]

<Overall Outline>

Figure 3:
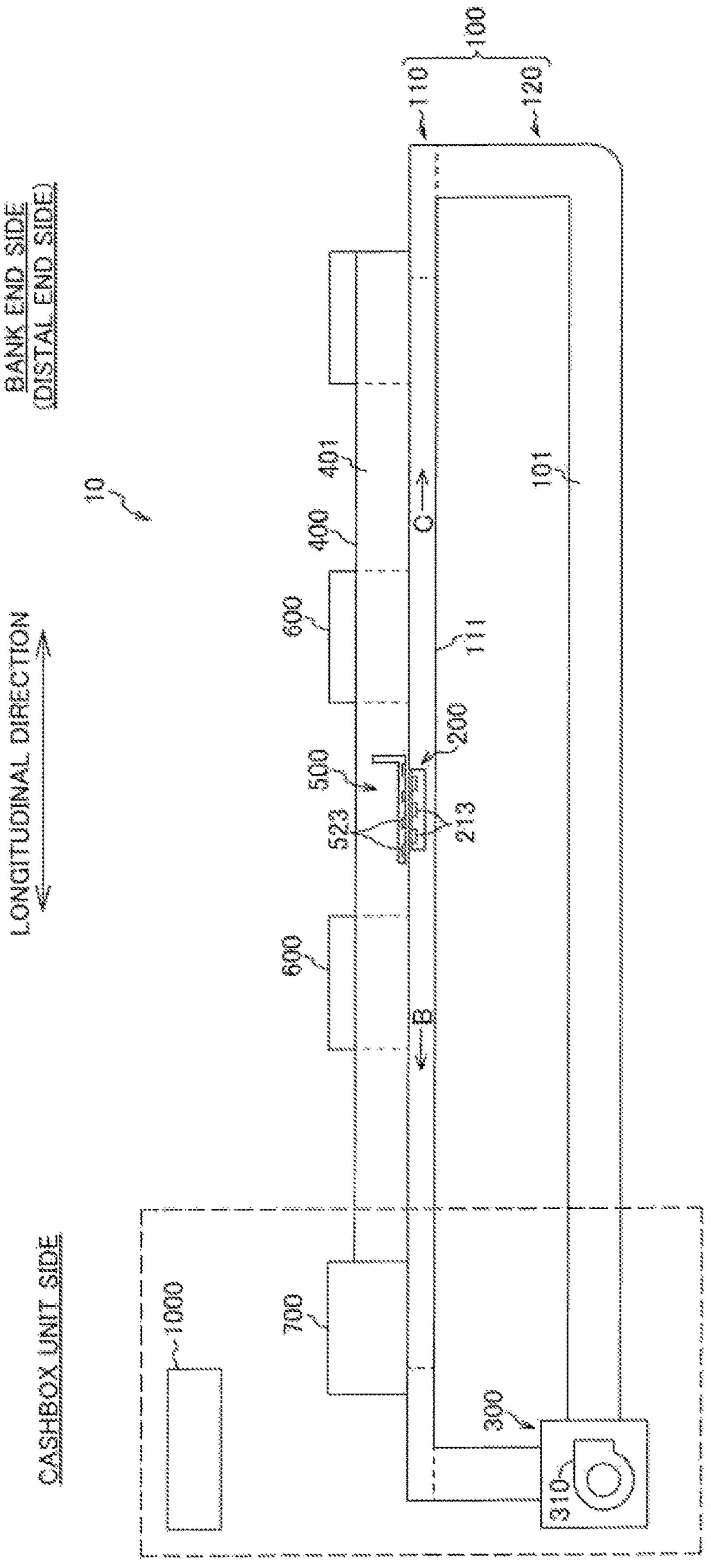
FIG. 3 is a schematic diagram illustrating a schematic configuration of a banknote transport system according to a first invention.

FIG. 3 is a schematic diagram illustrating a schematic configuration of the banknote transport system. The banknote transport system (paper sheet transport mechanism) 10 according to one embodiment of the first invention is characterized in transporting banknotes using an air flow and a magnetic force.

The banknote transport system 10 includes an air blowing tube 100 that forms a flow path (an air flow path 101) of a gas, a moving body 200 that travels (moves) inside the air blowing tube 100 while receiving an air flow flowing in a predetermined direction within the air blowing tube 100, an air-blow control unit 300 that controls the air flow flowing inside the air blowing tube 100, the transport tube 400 (a transport path 401) that has at least a portion arranged along the air blowing tube 100 to be adjacent to the air blowing tube 100, and a transport body 500 that is configured to be able to retain banknotes (paper sheets) and that travels (moves) inside the transport tube 400. The transport tube 400 forms the transport path 401 (a banknote (paper sheet) transport route and a transport space) for banknotes.

The moving body 200 includes a moving body magnetic material (moving body magnets 213), and the transport body 500 includes a transport body magnetic material (transport body magnets 523). At least one of the moving body magnetic material and the transport body magnetic material is formed of a magnet.

The banknote transport system 10 includes the receiving units 600 that receive banknotes input from outside and keep the banknotes at predetermined locations in the transport tube 400, respectively, the cashbox unit 700 that includes a banknote accommodating part that accommodates therein banknotes transported by the transport body 500, and a management unit (control means) 1000 that controls the components constituting the banknote transport system 10.

In the present example, the air-blow control unit 300 and the cashbox unit 700 are accommodated in a housing 1001 that has the management unit 1000 housed therein.

The banknote transport system 10 is characterized in moving the moving body 200 arranged in the air blowing tube 100 back and forth in the longitudinal direction of the air blowing tube 100 with the air flow flowing inside the air blowing tube 100, and in moving the transport body 500 arranged in the transport tube 400 along the longitudinal direction of the air blowing tube 100 with a magnetic force acting between the transport body 500 and the moving body 200. That is, the banknote transport system 10 is characterized in moving the transport body 500 in conjunction with movement of the moving body 200 receiving the air flow due to attraction and/or repulsion based on a magnetic force acting between the moving body magnets 213 and the transport body magnets 523.

<Outline of Components>

The air blowing tube 100 includes a moving route part 111 in at least a portion in the longitudinal direction, on which the moving body 200 travels along the longitudinal direction of the air blowing tube 100. The moving route part 111 is arranged in parallel and adjacently to the transport tube 400.

The moving body 200 moves inside the air blowing tube 100 while receiving an air flow flowing in a predetermined direction within the air blowing tube 100. The moving body magnets 213 mounted on the moving body 200 provide a repelling action and/or an attracting action due to a magnetic force to the transport body 500. The moving body 200 moves the moving body 200 in conjunction with its own movement due to the magnetic force.

The air-blow control unit 300 includes a blower (an air flow generating device) 310 that generates (produces) an air flow in a predetermined direction inside the air blowing tube 100 and that can change the flow volume and the flow speed of the air flow. The air-blow control unit 300 alternately generates an air flow in a first direction (a banknote collecting direction and an arrow-B direction) and an air flow in a second direction (a transport body returning direction and an arrow-C direction) being an opposite direction to the first direction inside the air blowing tube 100 to reciprocate the moving body 200 inside the air blowing tube 100.

The transport tube 400 forms a space through which banknotes and the transport body 500 move.

The transport body 500 receives the banknotes kept at the predetermined locations in the transport path 401 to retain the banknotes in an upright state, and moves inside the transport path 401 to transport the banknotes to the cashbox unit 700. The transport body magnets 523 mounted on the transport body 500 are subjected to the attracting action and/or the repelling action due to the magnetic force from the moving body magnets 213 included in the moving body 200. The transport body 500 moves inside the transport tube 400 in conjunction with the movement of the moving body 200 receiving the air flow.

When only the attracting force is to be applied between the moving body 200 and the transport body 500, both the magnetic materials mounted on the moving body 200 and the transport body 500 can be magnets, or one of the magnetic materials of the moving body 200 and the transport body 500 may be magnets and the other one may be a magnetic material such as iron. When only the repelling force is to be applied between the moving body 200 and the transport body 500, both the magnetic materials mounted on the moving body 200 and the transport body 500 are formed of magnets.

The receiving unit (the paper sheet receiving device) 600 receives banknotes inserted from the banknote inlet (a banknote inserting part) of the associated sandwiched machine 2 therein and keeps the banknotes at a predetermined location in the transport path 401. The receiving unit 600 is provided for each of the sandwiched machines 2. A plurality of the receiving units 600 are installed in the longitudinal direction of the transport tube 400 at a predetermined interval.

The cashbox unit 700 includes a banknote accommodating part that accommodates therein banknotes transported by the transport body 500, a drive mechanism that drives members related to accommodation of the banknotes in the banknote accommodating part, and the like.

The management unit (control means) 1000 controls operations of the components constituting the banknote transport system 10. The management unit 1000 is configured to include a general computer device that includes a CPU (Central Processing Unit), a ROM (Read Only Memory), a RAM (Random Access Memory), and the like and in which these units are connected via a bus. The CPU is an arithmetic unit that controls the entire banknote transport system 10. The ROM is a nonvolatile memory that has a control program to be executed by the CPU, data, and the like stored therein. The RAM is a volatile memory to be used as a work area for the CPU. The CPU reads the control program stored in the ROM to load the control program into the RAM and execute the control program, so that various functions are realized.

[Detailed Configuration of Banknote Transport System]

Detailed configurations of the components of the banknote transport system according to the embodiment of the first invention are explained.

<Air Blowing Tube>

The air blowing tube is explained with reference to FIGS. 3 and 4.

Figure 4:
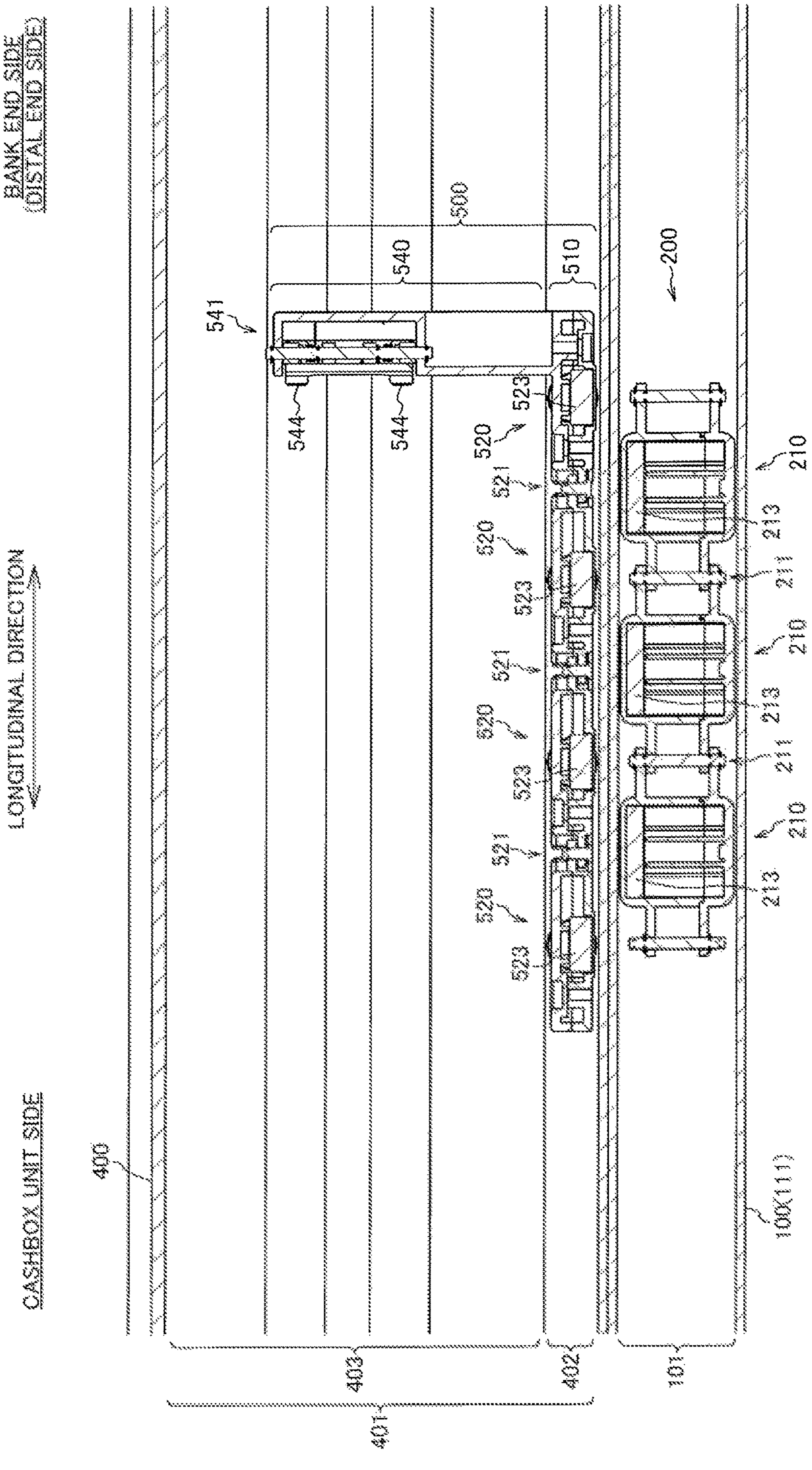
FIG. 4 is a vertical sectional view of a moving body, an air blowing tube including the moving body, a transport body, and a transport tube including the transport body in a case in which the moving body and the transport body repel each other due to a magnetic force.

FIG. 4 is a vertical sectional view of the moving body, the air blowing tube including the moving body, the transport body, and the transport tube including the transport body in a case in which the moving body and the transport body repel each other due to a magnetic force.

The air blowing tube 100 illustrated in FIG. 3 includes a first air blowing tube 110 including the moving route part 111, and a second air blowing tube 120 forming the air flow path 101 in an endless manner with the first air blowing tube 110 through a switching valve 325 (see FIG. 5), which will be described later.

Since the banknote transport system 10 moves the transport body 500 using a magnetic force, the moving route part 111 of the air blowing tube 100 includes a configuration that does not affect the travel of the moving body 200 and the travel of the transport body 500 based on the magnetic force. While it is desirable that the moving route part 111 is entirely formed of a non-magnetic material, the moving route part 111 may include a magnetic material in a portion within a range that does not affect the travel of the moving body 200 and the transport body 500.

The moving route part 111 includes a configuration (the thickness of the tube, the spacing between the tubes, the shape thereof, and the like) that can apply a magnetic force between the moving body 200 arranged inside the moving route part 111 and the transport body 500 arranged inside the transport tube 400.

With the configuration of the air blowing tube 100 separate from and independent of the transport tube 400, an airtight flow path can be formed in the air blowing tube 100. Reduction in the transport force of the moving body 200 due to air leakage to outside of the air blowing tube 100 can be prevented. Furthermore, the blower 310 being relatively inexpensive and outputting low power can be adopted as a blower to be used to generate an air flow and reduction in the cost of the banknote transport system 10 can be realized. The air flow inside the air blowing tube 100 can be reliably controlled even when the air blowing tube 100 is elongated with an increase in the banknote transport distance. Since the moving body 200 is caused to travel with the air flow, the need to arrange a mechanical configuration such as a gear or a transport belt, lines, or electrical contacts inside the air blowing tube 100 is eliminated and the durability of the air blowing tube 100 and the moving body 200 arranged therein is increased. Furthermore, external air does not flow in the air flow path 101 airtightly configured, so that grit and dust in the external air are not drawn therein and the inside of the air flow path 101 can be kept clean.

<Moving Body>

It suffices that the moving body 200 has a shape and a configuration that enable movement in the air blowing tube 100 by being subjected to an air pressure.

As illustrated in FIG. 4, the moving body 200 has a configuration in which a plurality of divided pieces 210, 210, are sequentially coupled to each other with hinge parts 211 along a travel direction of the moving body 200 (the longitudinal direction of the air blowing tube 100). The divided pieces 210 illustrated in the present example have same configurations and each of the divided pieces 210 has the moving body magnet 213.

The moving body 200 includes the moving body magnets 213 respectively arranged at locations, in attitudes, and in shapes that enable to apply a magnetic force to the transport body 500. In the present example, the moving body magnets 213 are arranged on a side of the moving body 200 nearer the transport tube 400. The moving body magnets 213 included in the moving body 200 are arranged spaced apart from each other in the travel direction of the moving body 200. In the present example, each of the moving body magnets 213 is attached to the associated divided piece 210 in such a manner that the N pole (one of the poles) faces the side of the transport tube 400 (the upper side in FIG. 4) and the S pole (the other pole) faces the lower side in FIG. 4.

The moving body 200 illustrated in the present example is constituted of three divided pieces 210. The divided pieces 210 are coupled to each other to be angularly displaceable within a predetermined range in the upper-lower direction in FIG. 4 and the depth direction of the plane of the paper centering on the hinge parts 211, respectively. With this configuration, the moving body 200 can smoothly move in the air blowing tube 100 while the divided pieces 210 displace even when the air blowing tube 100 forms the air flow path 101 curved in the upper-lower or right-left direction.

<Relation Between Air Blowing Tube and Moving Body>

The inner surface shape of the moving route part 111 and the outer surface shape (structure) of the moving body 200 are formed in such a manner that the moving body 200 does not relatively rotate on a virtual axis extending along the longitudinal direction of the moving route part 111 with respect to the moving route part 111. For example, the horizontal sectional shape (the shape on a cross section orthogonal to the longitudinal direction) of the moving route part 111 and the horizontal sectional shape of the divided pieces 210 of the moving body 200 are respectively formed into rectangular shapes. With provision of the configuration described above, the attitude of the moving body 200 in the moving route part 111 can be maintained to cause the N pole (one of the poles) of each of the moving body magnets 213 to always face the side of the transport tube 400.

<Air-Blow Control Unit>

Figure 5:
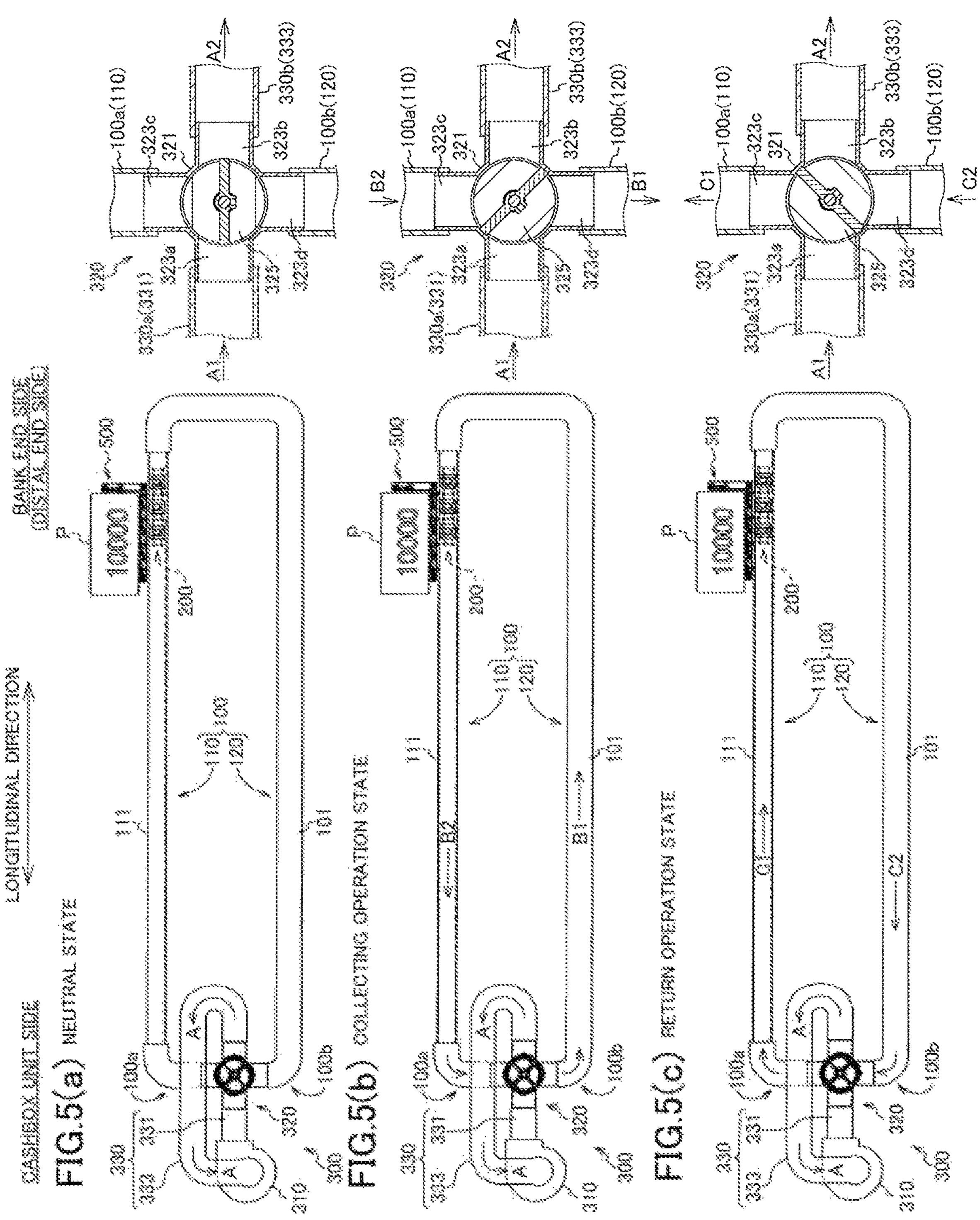
FIGS. 5(*a*) to 5(*c*) are schematic diagrams illustrating a relation between an air blowing tube and an air-blow control unit according to one embodiment of the first invention.

FIGS. 5(*a*) to 5(*c*) are schematic diagrams illustrating a relation between the air blowing tube and the air-blow control unit according to one embodiment of the first invention.

The air-blow control unit 300 according to the present embodiment includes a single blower 310 that generates an air flow flowing in a certain direction, and a switching unit 320 (the switching valve 325) that controls the direction of the air flow in the air blowing tube 100. The air-blow control unit 300 is characterized in switching the direction of the air flow in the air blowing tube 100 between the first direction (the banknote collecting direction and the arrow-B direction) and the second direction (the moving body returning direction and the arrow-C direction) opposite to the first direction using the switching unit 320.

The air-blow control unit (an air-flow control device) 300 includes the switching unit (an air flow switching unit) 320 that controls the discharge direction of the air flow, a first circulation pipe 330 that forms an endless air flow path through the switching unit 320, and the blower 310 that is arranged at an appropriate place in the first circulation pipe 330 to generate an air flow flowing in a certain direction inside the first circulation pipe.

The switching unit 320 includes a casing 321 in which four flow paths 323 (a first flow path 323*a* to a fourth flow path 323*d*: ports) respectively connecting to external pipes are formed, and the switching valve 325 that is arranged in a joint portion (an intersecting portion) of the four flow paths 323 to switch the communication state among the flow paths 323 and/or the opening degrees at the time of communication. The flow paths 323 are communicated with and connected to an air discharge tube 331, an air intake tube 333, the first air blowing tube 110, and the second air blowing tube 120 that are external pipes, respectively. In the present example, the flow paths 323 are arranged in a cross manner (a radial manner). The switching valve 325 illustrated in the present example is a rotary valve such as a ball valve and the switching valve 325 rotates in the casing 321 by a predetermined angle, whereby the communication states of the flow paths 323 and the opening degrees of the flow paths 323 are switched.

The switching valve 325 is an electric-operated valve and is driven by a motor to control the rotation angle. For example, a stepping motor can be used as the motor. The switching valve 325 is, for example, controlled to have a desired rotation angle by the management unit 1000 that controls the rotation angle of the stepping motor on the basis of a drive pulse. Of course, other methods may be used for driving means for rotating the switching valve 325 and control of the rotation angle of the switching valve 325. For example, a configuration in which a rotary encoder that rotates in conjunction with the switching valve 325, and a sensor that detects the rotation angle of the rotary encoder are mounted on the switching unit 320 and in which the management unit 1000 executes feedback control of the rotation angle of the switching valve 325 may be adopted.

The first circulation pipe 330 includes the air discharge tube 331 that has one end portion (one end portion 330*a* of the first circulating pipe 330) communicatively connected to the first flow path 323*a* of the switching unit 320 and the other end portion communicatively connected to the outlet of the blower 310, and the air intake tube 333 that has one end portion communicatively connected to the inlet of the blower 310 and the other end portion (the other end portion 330*b* of the first circulation pipe 330) communicatively connected to the second flow path 323*b* of the switching unit 320.

The air blowing tube (the second circulation pipe) 100 has one end portion 100*a* communicatively connected to the third flow path 323*c* of the switching unit 320 and the other end portion 100*b* communicatively connected to the fourth flow path 323*d* of the switching unit 320, and forms an endless air flow path through the switching unit 320. The air blowing tube 100 reciprocates the moving body 200 placed therein in the arrow-B direction and the arrow-C direction in FIG. 5 with the air flow.

The air blowing tube 100 according to the present example includes the first air blowing tube 110 forming the moving route part 111 of the moving body 200, and the second air blowing tube 120 communicatively connected to the first air blowing tube 110. The first air blowing tube 110 is communicatively connected to the third flow path 323*c* and the second air blowing tube 120 is communicatively connected to the fourth flow path 323*d*.

<<Operation of Switching Unit: Neutral State>>

FIG. 5(*a*) illustrates a neutral state.

The switching valve 325 is in a neutral position for establishing communication between the first flow path 323*a* and the second flow path 323*b* while not establishing communication between the first and second flow paths 323*a* and 323*b* and the third and fourth flow paths 323*c* and 323*d*.

Accordingly, the air flow circulates in the first circulation pipe 330 in an arrow-A (A1 and A2) direction and no air flow is generated inside the air blowing tube 100. Therefore, the moving body 200 is in a state stopped in the air blowing tube 100.

<<Operation of Switching Unit: First Communication State>>

FIG. 5(*b*) illustrates a first state in which an air flow flowing in the first direction (an arrow-B1 or B2 direction) is generated inside the air blowing tube 100. This state is, for example, a banknote collecting operation state for transporting banknotes collected by the transport body 500 to the cashbox unit 700.

The switching valve 325 is in a first communication position for establishing communication between the first flow path 323*a* and the fourth flow path 323*d* and establishing communication between the second flow path 323*b* and the third flow path 323*c*. At this time, the first flow path 323*a* and the fourth flow path 323*d* are not communicated with the second flow path 323*b* and the third flow path 323*c*.

The air circulates in an endless manner between the first circulation pipe 330 and the air blowing tube 100. That is, air (in the arrow-A1 direction) discharged from the discharge tube 331 to flow in the first flow path 323*a* flows in the second air blowing tube 120 from the fourth flow path 323*d* (in the arrow-B1 direction) due to the switching valve 325. Air flowing in the arrow-B2 direction inside the first air blowing tube 110 to flow in the third flow path 323*c* flows in the intake tube 333 from the second flow path 323*b* (in the arrow-A2 direction) due to the switching valve 325, returns to the blower 310, and is discharged again from the discharge tube 331.

<<Operation of Switching Unit: Second Communication State>>

FIG. 5(*c*) illustrates a second state in which an air flow flowing in the second direction (an arrow-C1 or C2 direction) is generated inside the air blowing tube 100. This state is, for example, a return operation state for returning the transport body 500 from the side of the cashbox unit 700 (the side of the management unit 1000) to the distal end side of the transport tube 400.

The switching valve 325 is in a second communication position for establishing communication between the first flow path 323*a* and the third flow path 323*c* and establishing communication between the second flow path 323*b* and the fourth flow path 323*d*. At this time, the first flow path 323*a* and the third flow path 323*c* are not communicated with the second flow path 323*b* and the fourth flow path 323*d*.

The air circulates in an endless manner between the first circulation pipe 330 and the air blowing tube 100. That is, air (in the arrow-A1 direction) discharged from the discharge tube 331 to flow in the first flow path 323*a* flows in the first air blowing tube 110 from the third flow path 323*c* (the arrow-C1 direction) due to the switching valve 325. Air flowing in the arrow-C2 direction inside the second air blowing tube to flow in the fourth flow path 323*d* flows in the intake tube 333 from the second flow path 323*b* (in the arrow-A2 direction) due to the switching valve 325, returns to the blower 310, and is discharged again from the discharge tube 331.

<<Operation of Switching Unit: Summary>>

By connecting two endless pipes (the first circulation pipe 330 and the air blowing tube 100) via the switching unit 320 as described above, three states including the neutral state in which no air flow is generated in the air blowing tube 100, the first communication state in which an air flow flowing in the first direction (the arrow-B direction) is generated inside the air blowing tube 100, and the second communication state in which an air flow flowing in the second direction (the arrow-C direction) is generated inside the air blowing tube 100 can be changed by changing the position of the switching valve 325 while an air flow in a certain direction (the arrow-A direction) is generated by the single blower 310.

In intermediate positions taken by the switching valve 325 among the three positions described above, the communication state changes from those in the three states. That is, since the communication relation among the flow paths and the opening degrees of the flow paths can be adjusted according to the angle of the switching valve 325 in the casing 321 in the present embodiment, an air volume of the air flow according to the opening degrees of the flow paths can be generated inside the air blowing tube 100. That is, the speed of the moving body 200 can be varied according to the wind speed in the air blowing tube 100.

The moving speed of the moving body 200 may be adjusted by control of the air volume of the blower 310. For example, the air volume of the blower 310 may be adjusted by varying the rotational speed of blades of the blower 310 by PWM (Pulse Width Modulation) control. However, since the rotation responsiveness of the switching valve 325 is higher than the variation responsiveness of the rotational speed of the blower 310, adjustment of the rotation angle of the switching valve 325 is more advantageous to rapidly adjust the speed of the moving body 200.

<Transport Tube>

The transport tube (the transport route) 400 is explained with reference to FIGS. 4 and 6.

Figure 6:
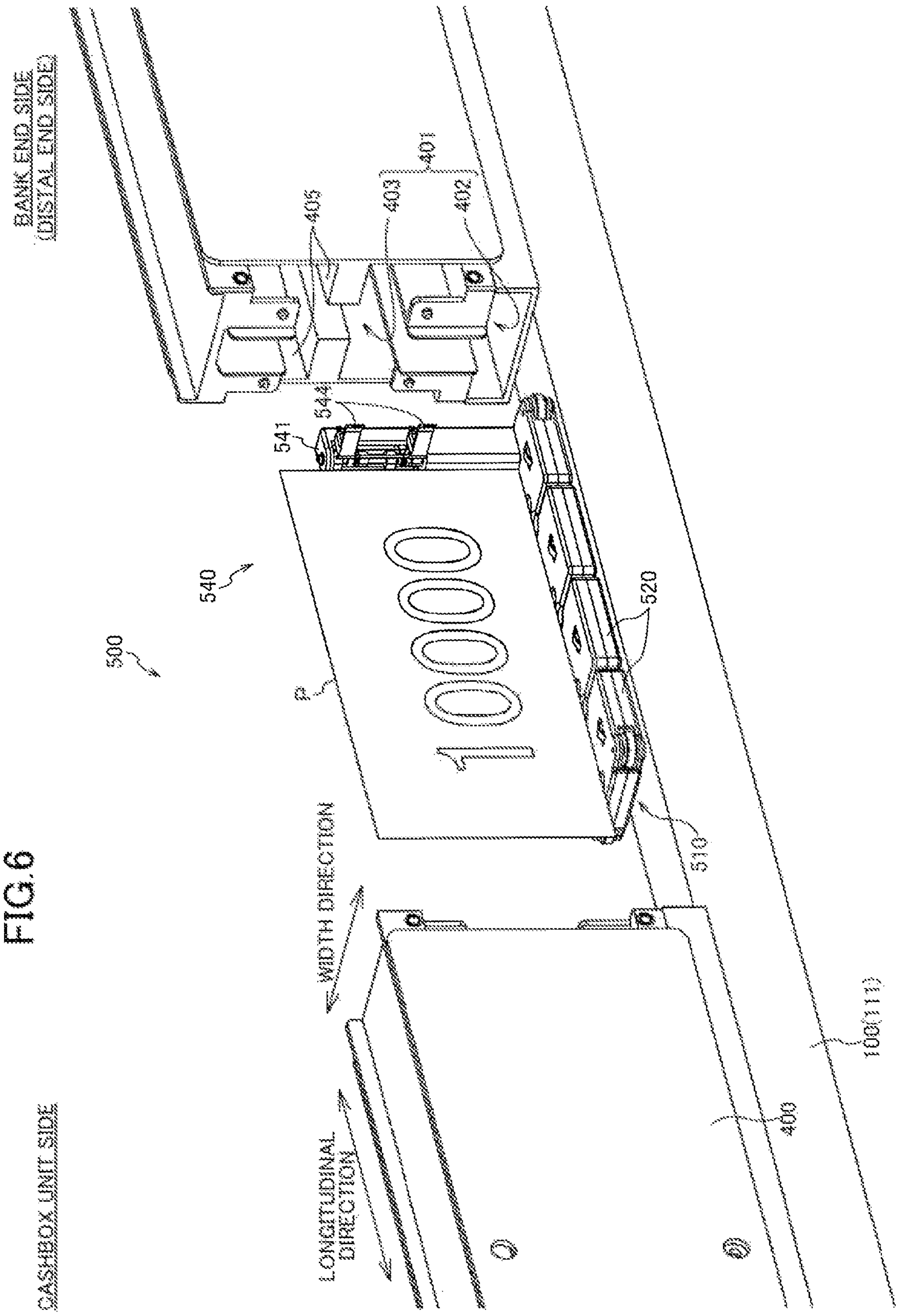
FIG. 6 is a perspective view illustrating a relation between the transport tube and the transport body.

FIG. 6 is a perspective view illustrating a relation between the transport tube and the transport body. FIG. 6 illustrates a state in which the inner part of the transport tube 400 is partially exposed.

Since the transport body 500 is transported with a magnetic force in the banknote transport system 10, the transport tube 400 is formed of a material that does not affect the travel of the transport body 500 based on the magnetic force. Although it is desirable that the transport tube 400 is entirely formed of a non-magnetic material, the transport tube 400 may include a magnetic material in a part thereof without affecting the travel of the transport body 500.

The transport tube 400 includes a configuration (the thickness of the tube, the spacing between tubes, the shape thereof, and the like) that can apply a magnetic force between the moving body 200 arranged inside the moving route part 111 and the transport body 500 arranged inside the transport tube 400.

Although the transport tube 400 is arranged above the air blowing tube 100 in the present example, the location relation between the air blowing tube 100 and the transport tube 400 is not limited thereto. The transport tube 400 may be arranged below the air blowing tube 100 or the transport tube 400 may be arranged on the lateral side of the air blowing tube 100.

While the transport tube 400 is illustrated as means that constitutes the transport path 401 in the present example, the means that constitutes the transport path 401 does not need to be tubular and the present invention can be achieved even with a configuration in which a part or the whole of the transport path 401 is open to outside. That is, the transport tube 400 can have any form when it can form an elongated space as the transport path 401 therein.

<Transport Body>

As illustrated in FIGS. 4 and 6, the transport body 500 includes a transport base 510 that is arranged on the side nearer the air blowing tube 100 in the transport path 401 and that is subjected to a magnetic force from the moving body 200, and a banknote collecting/retaining part 540 provided on the opposite side of the transport base 510 to the air blowing tube 100.

<<Transport Base>>

The transport base 510 has a configuration in which a plurality of divided pieces 520, 520, . . . are sequentially coupled to each other with hinge parts 521 along the travel direction of the transport body 500 (the longitudinal direction of the transport tube 400). Each of the divided pieces 520 illustrated in the present example includes the transport body magnet 523.

The transport base 510 includes the transport body magnets 523 arranged at locations, in attitudes, and in shapes that can be subjected to the effect of the magnetic force from the moving body 200. In the present example, the transport body magnets 523 are arranged on the side of the transport base 510 nearer the air blowing tube 100. The transport body magnets 523 included in the transport base 510 are arranged spaced apart from each other in the travel direction of the transport body 500. In the present example, each of the transport body magnets 523 is attached to the associated divided piece 520 in such a manner that the N pole (one of the poles) faces the side of the air blowing tube 100 (the lower side in FIGS. 4 and 6) and the S pole (the other pole) faces the upper side in FIGS. 4 and 6. The transport base 510 magnetically levitates in the transport tube 400 under a repelling force due to the magnetic force from the moving body 200.

The transport base 510 illustrated in the present example is constituted of four divided pieces 520. The divided pieces 520 are coupled to each other to be angularly displaceable within a predetermined range in the upper-lower direction in FIGS. 4 and 6 and the depth direction of the plane of paper centering on the hinge parts 521, respectively. With the configuration described above, the transport body 500 can smoothly move in the transport tube 400 even when the transport tube 400 forms the transport path 401 curved in the upper-lower or right-left direction.

<<Banknote Collecting/Retaining Part>>

The banknote collecting/retaining part 540 is arranged on the transport base 510. The banknote collecting/retaining part 540 includes a support member 541 that is upright in a direction away from the air blowing tube 100, and collecting members (collecting pawls) 544 that are protruded from the support member 541 in the width direction at an end portion on the bank end side in the longitudinal direction of the transport tube 400 (on the distal end side with respect to the cashbox unit 700). The support member 541 is protruded upward from a middle portion of the transport base 510 in the width direction.

The banknote collecting/retaining part 540 retains banknotes P to cause the long edge direction of the banknotes P to follow the longitudinal direction of the transport tube 400 and in an upright attitude. One of long sides (a long side positioned on the lower side in FIG. 6) of the banknote P is supported by the transport base 510. The rear end edge (one of short sides) of the banknote is supported by the support member 541 or the collecting members 544.

<Relation Between Transport Tube and Transport Body>

The transport tube 400 includes therein a base transport path 402 arranged on the side nearer the air blowing tube 100, and a banknote transport path 403 arranged on the opposite side to the air blowing tube 100. The base transport path 402 is a horizontally-long space where the transport base 510 of the transport body 500 travels, and the banknote transport path 403 is a vertically-long space where the banknote collecting/retaining part 540 of the transport body 500 and banknotes retained by the banknote collecting/retaining part 540 travel.

Since the transport body 500 illustrated in the present example travels while being subjected to a repelling force due to a magnetic force from the moving body 200, the base transport path 402 and the transport base 510 are configured to inhibit separation (movement toward the banknote transport path 403) of the transport base 510 from the base transport path 402 and to maintain the transport base 510 at a location where the effect of the magnetic force can be received from the moving body 200.

The inner surface shape of the base transport path 402 and the outer surface shape of the transport base 510 are formed in such a manner that the transport base 510 does not relatively rotate on a virtual axis extending along the longitudinal direction of the base transport path 402 with respect to the base transport path 402. For example, the horizontal sectional shape of the base transport path 402 and the horizontal sectional shape of the transport base 510 are formed in rectangular shapes. With provision of the configuration described above, the attitude of the moving body 200 in the base transport path 402 is maintained to cause the N pole (one of the poles) of each of the transport body magnets 523 to always face the side of the air blowing tube 100.

<Relation Between Moving Body and Transport Body>

A relation between the moving body magnetic material and the transport body magnetic material is explained.

<<Only Repulsion>>

As illustrated in FIG. 4, one or more magnets can be arranged in both the moving body 200 and the transport body 500 in directions repelling each other to apply only the repelling force between the moving body 200 and the transport body 500. When only the repelling force is to be applied between the moving body 200 and the transport body 500, it is desirable that a plurality of magnets are arranged on at least one of the moving body 200 and the transport body 500 at a predetermined interval in the travel direction. With arrangement of the magnets in the travel direction on at least one of the moving body 200 and the transport body 500, the moving body magnets 213 and the transport body magnets 523 are alternately arrayed when the moving body 500 travels while being subjected to the repelling force from the moving body 200. That is, when the transport body 500 travels, the transport body 500 is relatively positioned with respect to the moving body 200. In this case, it is particularly preferable that the difference between the number of magnets included in the moving body 200 and the number of magnets included in the transport body 500 is one. In other words, when n is a natural number, it is preferable that n magnets are arranged on one of the moving body 200 and the transport body 500 and that n+1 magnets are arranged on the other one.

When the transport tube 400 is placed above the air blowing tube 100 and a repelling force is applied between the transport body 500 and the moving body 200, the transport body 500 levitates in the transport tube 400 and therefore the transport body 500 is less likely to be in contact with the transport tube 400. Accordingly, it is possible to prevent reduction in the transport force of the transport body 500 due to friction with the transport tube 400 and smoothly move the transport body 500. Since the contact between the transport body 500 and the transport tube 400 is suppressed, generation of fine dust (powdery dust) due to contact between members can be prevented.

When the repelling force is applied between the moving body 200 and the transport body 500, the transport force can be increased by increasing the number of magnets included in the moving body 200 and the transport body 500.

<<Only Attraction>>

Figure 7:
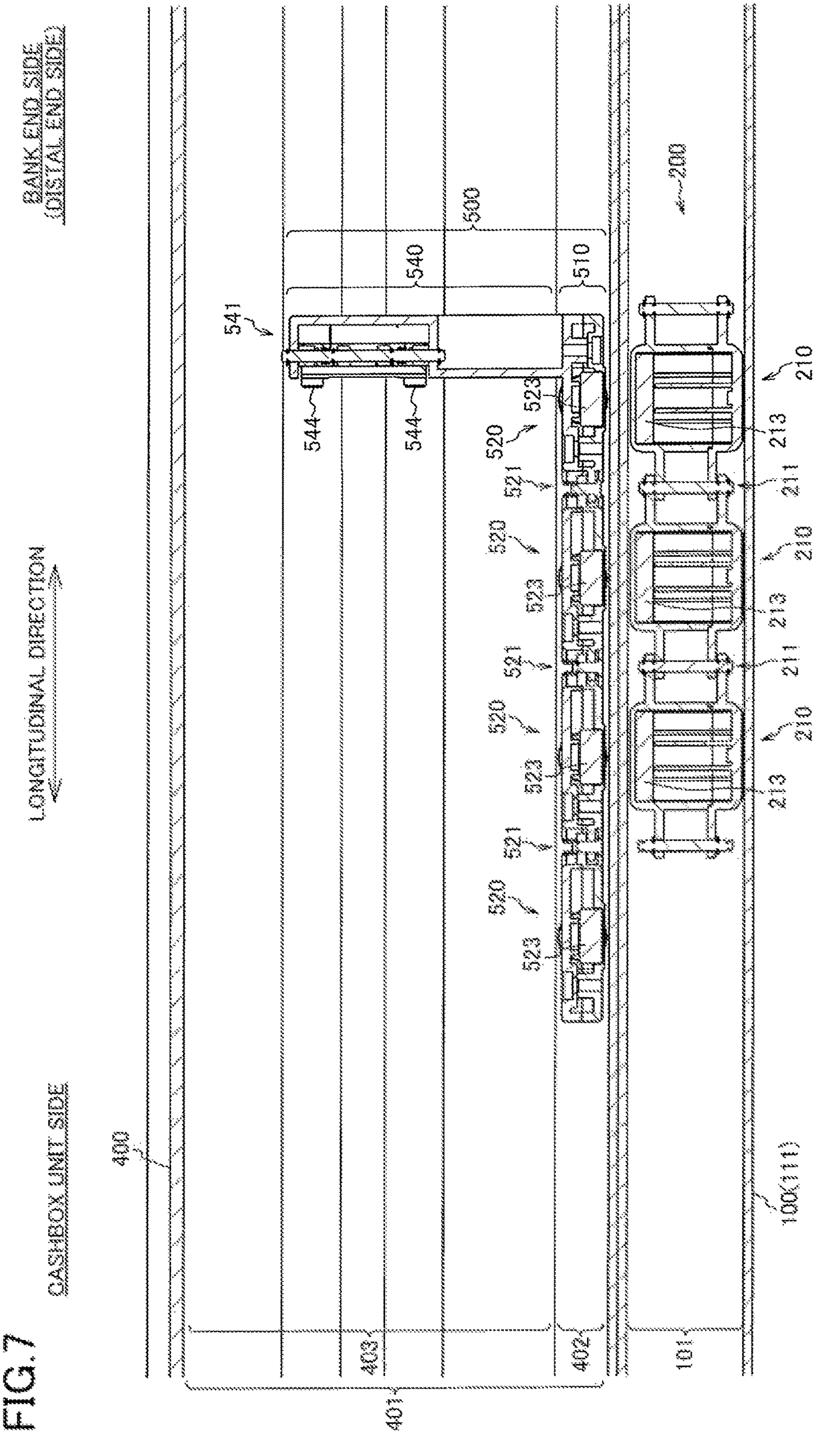
FIG. 7 is a vertical sectional view of the moving body, the air blowing tube including the moving body, the transport body, and the transport tube including the transport body in a case in which the moving body and the transport body attract each other due to a magnetic force.

FIG. 7 is a vertical sectional view of the air blowing tube and the transport tube including the moving body and the transport body in a case in which the moving body and the transport body attract each other due to a magnetic force.

In an illustrated example, the moving body magnets 213 and the transport body magnets 523 are respectively attached to the moving body 200 and the transport body 500 in attitudes attracting each other. Since the locations in the longitudinal direction of the moving body magnets 213 and the transport body magnets 523 match each other with walls of the air blowing tube 100 and the transport tube 400 interposed therebetween, positioning of the transport body 500 with respect to the moving body 200 is easy.

When only the attracting force based on the magnetic force is to be applied between the moving body 200 and the transport body 500, it suffices that at least either the magnetic material mounted on the moving body 200 or the magnetic material mounted on the transport body 500 is a magnet. For example, magnets may be arranged on one of the transport body 500 and the moving body 200 and a magnetic material (for example, iron plates), other than magnets, that is attracted by magnets may be arranged on the other one.

When only the attracting force based on the magnetic force is to be applied between the moving body 200 and the transport body 500, it suffices that at least one set of magnetic materials (for example, a set of a magnet and a magnet or a set of a magnet and an iron plate) is arranged on the transport body 500 and the moving body 200.

<<Repulsion and Attraction>>

Both the repelling force and the attracting force may be applied between the moving body 200 and the transport body 500. That is, a set of magnets that apply a repelling force to each other, and a set of magnets that apply an attracting force to each other may be mixed on the moving body 200 and the transport body 500. An example in which both the repelling force and the attracting force are applied will be described later with reference to FIG. 8.

<<Orientation of Magnets>>

While the poles of each of the magnets are arranged to face in the upper-lower direction (a staking direction of the air blowing tube 100 and the transport tube 400) in the embodiment described above, the poles of each of the magnets may be arranged to face in the travel direction (for example, to cause the N pole to face toward the cashbox unit and the S pole to face toward the bank end side/the distal end side). Alternatively, the poles of each of the magnets may be arranged diagonally to the travel direction. The action of the magnetic force can be appropriately adjusted according to the orientation of the magnets.

<<Orientation of Magnets: Arrangement in Tandem>>

Figure 8:
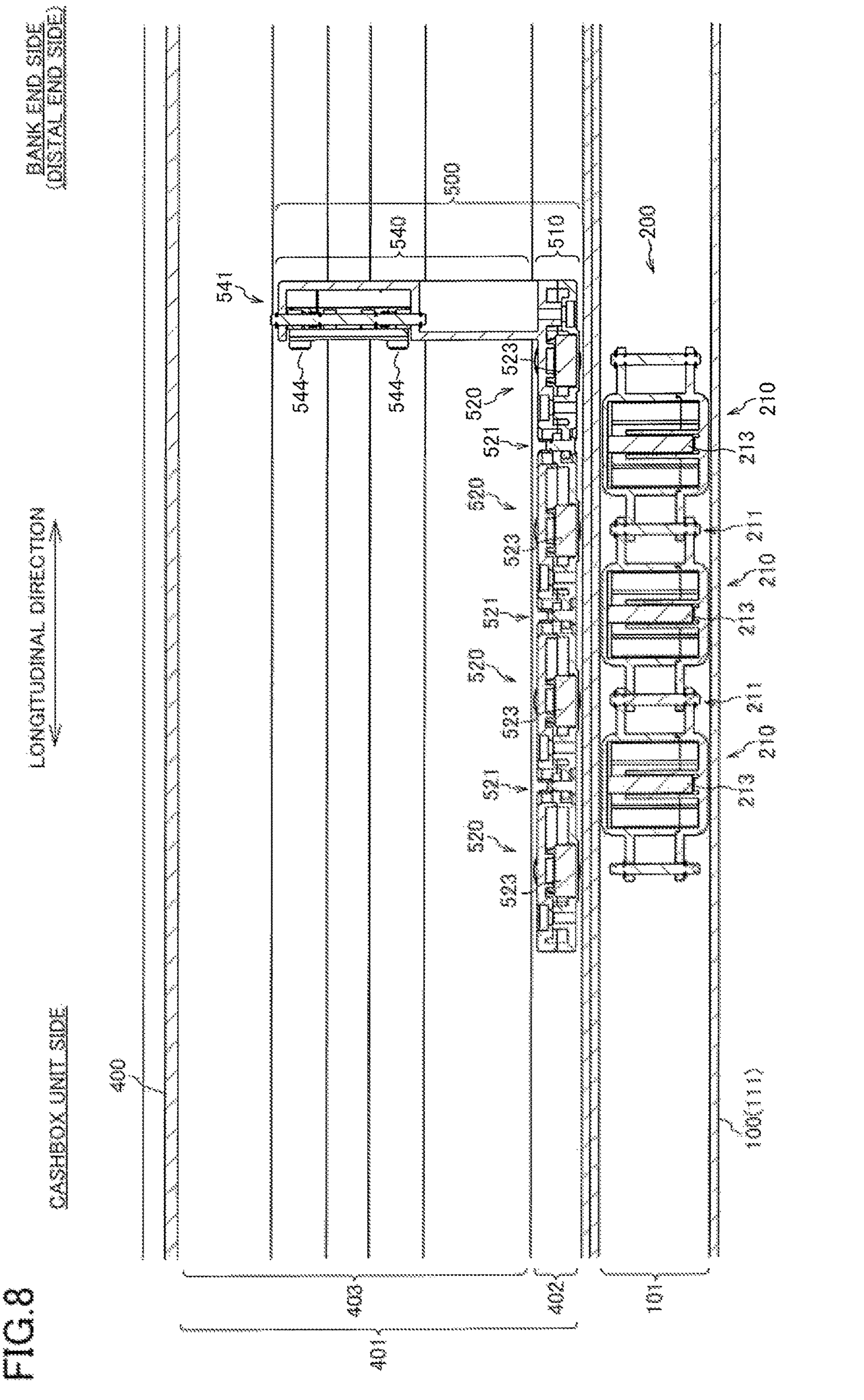
FIG. 8 is a vertical sectional view of the air blowing tube and the transport tube including the moving body and the transport body in a case in which the poles of each of moving body magnets are arranged to face in a travel direction.

FIG. 8 is a vertical sectional view of the air blowing tube and the transport tube including the moving body and the transport body in a case in which the poles of each of the moving body magnets are arranged to face in the travel direction.

In an illustrated example, each of the moving body magnets 213 is attached to the associated divided piece 210 in such a manner that the N pole (one of the poles) faces the side of the cashbox unit (the left side in FIG. 8) and the S pole (the other pole) faces the distal end side (the right side in FIG. 8). Each of the transport body magnets 523 is attached to the associated divided piece 520 in such a manner that the N pole faces the side of the air blowing tube 100 and the S pole faces the upper side in FIG. 8. Since surfaces (the N poles) on the cashbox unit side of the moving body magnets 213 respectively repel the transport body magnets 523 (the N poles), and the surfaces (the S poles) on the distal end side of the moving body magnets 213 respectively attract the transport body magnets 523 (the N poles), both the repelling force and the attracting force can be applied between the moving body 200 and the transport body 500.

[First Modified Embodiment Related to Air Blow Control]

Figure 9:
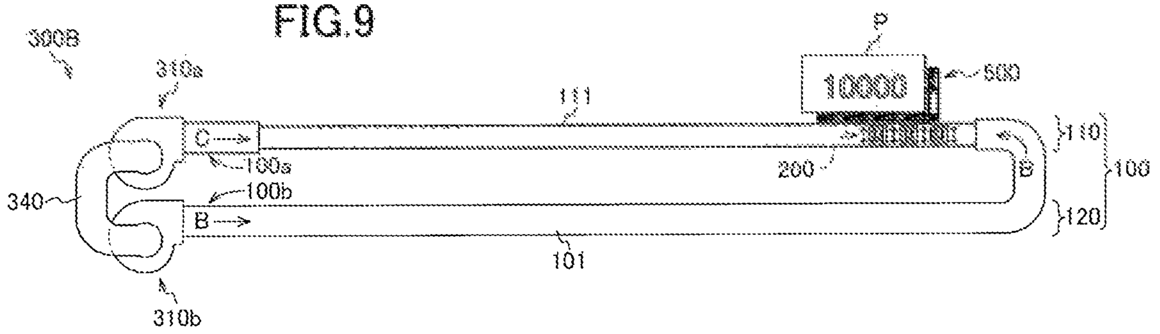
FIG. 9 is a diagram illustrating a first modification of the air-blow control unit.

FIG. 9 is a diagram illustrating a first modification of the air-blow control unit.

An air-blow control unit 300B may have a configuration including a blower 310*a* having an outlet connected to one end portion 100*a* of the air blowing tube 100, a blower 310*b* having an outlet connected to the other end portion 100*b* of the air blowing tube 100, and a connection pipe 340 that connects inlets of the blowers 310*a* and 310*b* to each other. The air blowing tube 100 (the first air blowing tube 110 and the second air blowing tube 120) is configured in an endless manner through the two blowers 310*a* and 310*b* and the connection pipe 340.

Turning on/off of the blowers 310*a* and 310*b* and the air volume thereof are controlled by the management unit 1000.

When an air flow flowing in a first direction (an arrow-B direction) is to be generated inside the air blowing tube 100 (the first state and the banknote collecting operation state), one blower 310*b* is turned on to generate an air flow and the other blower 310*a* is turned off. Air flowing inside the air blowing tube 100 flows in the outlet of the blower 310*a* and is discharged from the inlet of the blower 310*a*. The air further passes through the connection pipe 340 to return to the inlet of the blower 310*b* and is discharged from the outlet of the blower 310*b*.

When an air flow flowing in a second direction (an arrow-C direction) is to be generated inside the air blowing tube 100 (the second state and the transport body returning state), it suffices to turn one blower 310*b* off and turn the other blower 310*a* on to generate the air flow.

In this manner, the use of two blowers also enables the air flow in the first direction and the air flow in the second direction to be generated inside the air blowing tube 100.

Since the inlets of the two blowers 310*a* and 310*b* are connected with the connection pipe 340 in the present example, air can be efficiently circulated inside the air flow path 101 airtightly configured.

[Second Modified Embodiment Related to Air Blow Control]

Figure 10:
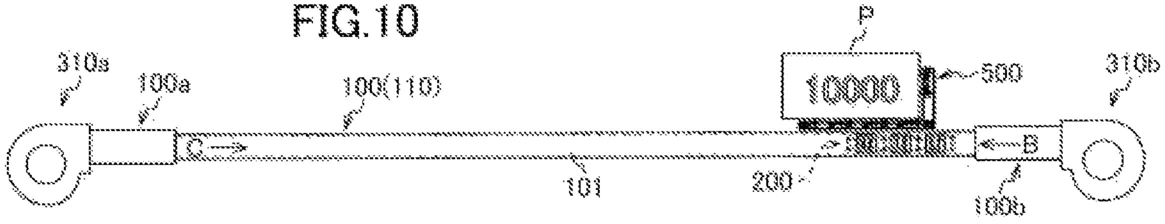
FIG. 10 is a diagram illustrating a second modification of the air-blow control unit.

FIG. 10 is a diagram illustrating a second modification of the air-blow control unit.

An air-blow control unit 300C may have a configuration including the blowers 310*a* and 310*b* at one end portion 100*a* and the other end portion 100*b* of the air blowing tube 100, respectively. Turning-on/off of the blowers 310*a* and 310*b* and the air volume thereof are controlled by the management unit 1000.

When an air flow flowing in a first direction (an arrow-B direction) is to be generated inside the air blowing tube 100 (the first state and the banknote collecting operation state), one blower 310*b* is turned on to generate an air flow and the other blower 310*a* is turned off. The blower 310*b* takes external air to the inside from the inlet and discharges the air, thereby generating the air flow in the arrow-B direction inside the air blowing tube 100. This air flow is taken into the blower 310*a* from the outlet of the blower 310*a* and is discharged from the inlet.

When an air flow flowing in a second direction (an arrow-C direction) is to be generated inside the air blowing tube 100 (the second state and the transport body returning state), it suffices to turn one blower 310*b* off and turn the other blower 310*a* on to generate the air flow.

Since the present example does not require pipes for causing the air flow path 101 to be a circulation path, the configuration is simplified.

B. Paper Sheet Transport System According to Second Invention

<<Basic Configuration of Paper Sheet Transport System>>

A paper sheet transport system according to a second invention is explained next.

The second invention includes further embodied details of the receiving units (the paper sheet receiving devices) 600, the transport tube 400, the transport body 500, and the like in the paper sheet transport system 10 according to the first invention, and is explained with reference to FIGS. 1 to 10 where like parts are denoted by like reference signs.

Figure 11:
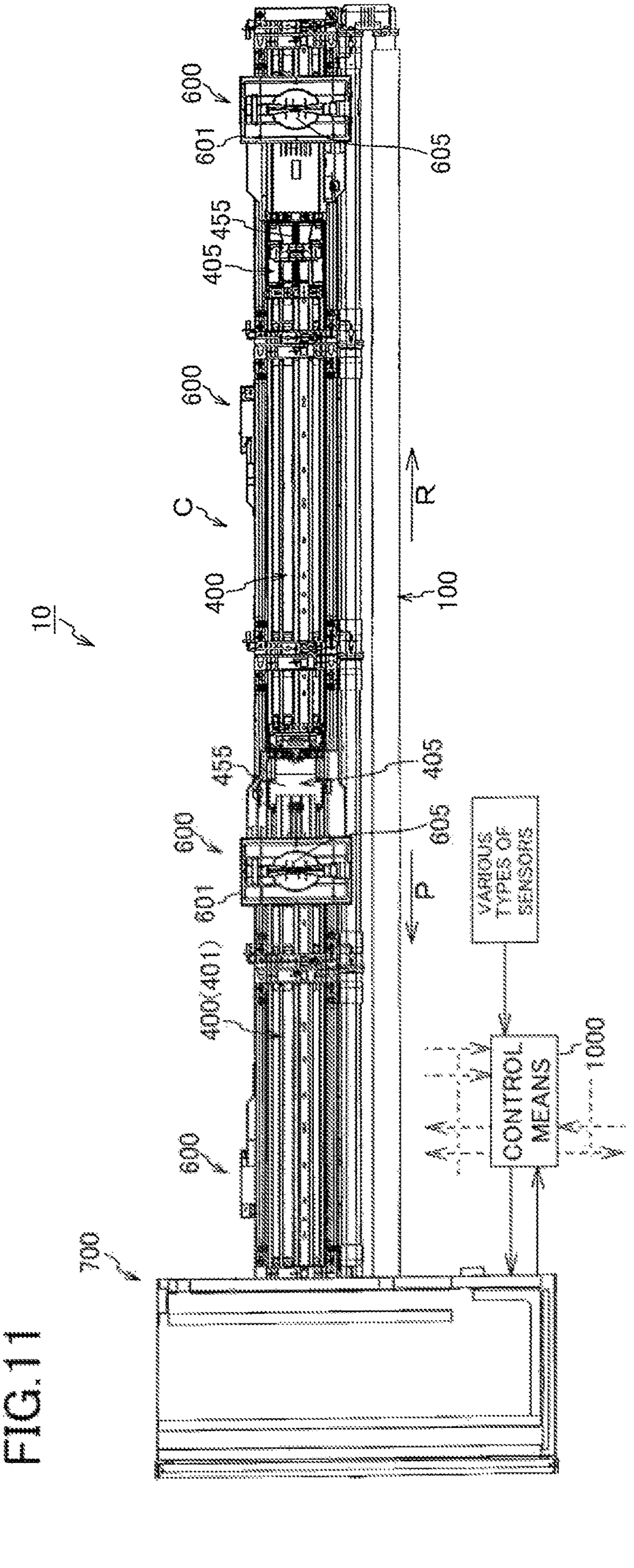
FIG. 11 is a front view of a banknote transport system 10 including receiving units (paper sheet receiving devices) 600.
Figure 12:
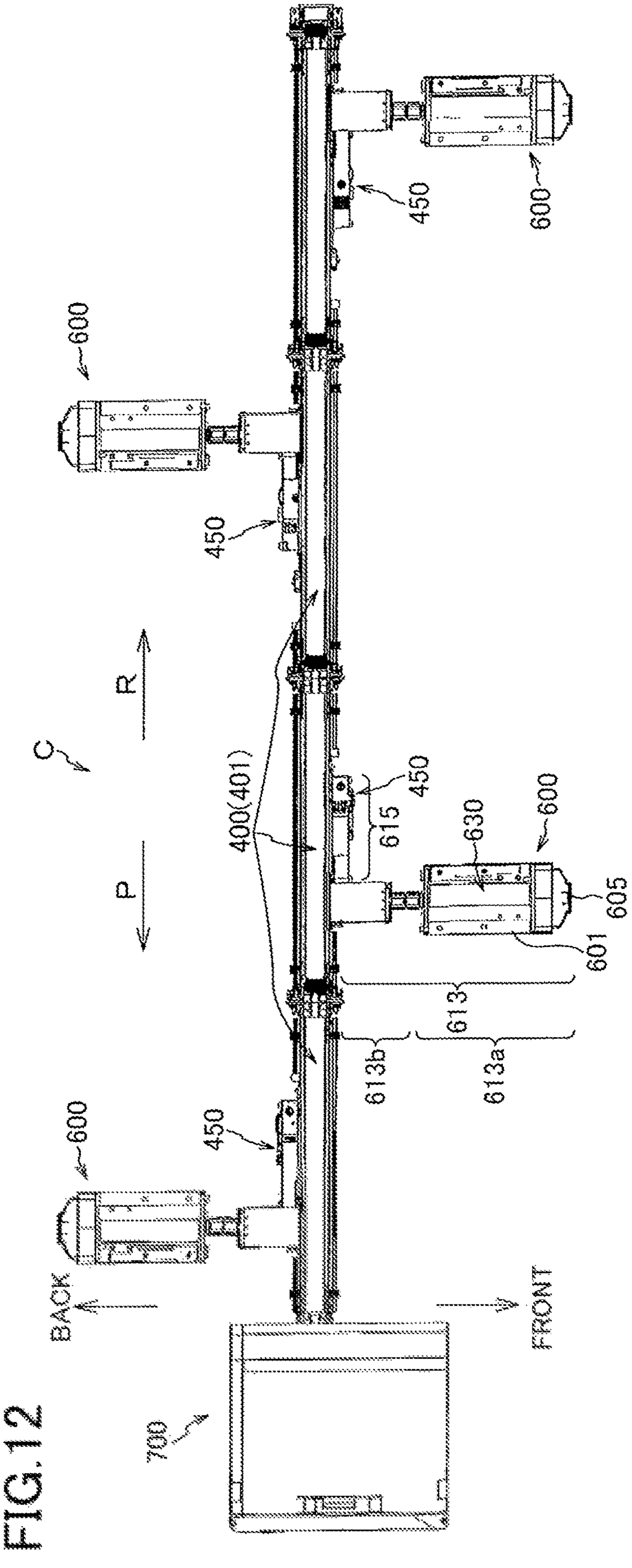
FIG. 12 is a plan view of the banknote transport system.
Figure 13:
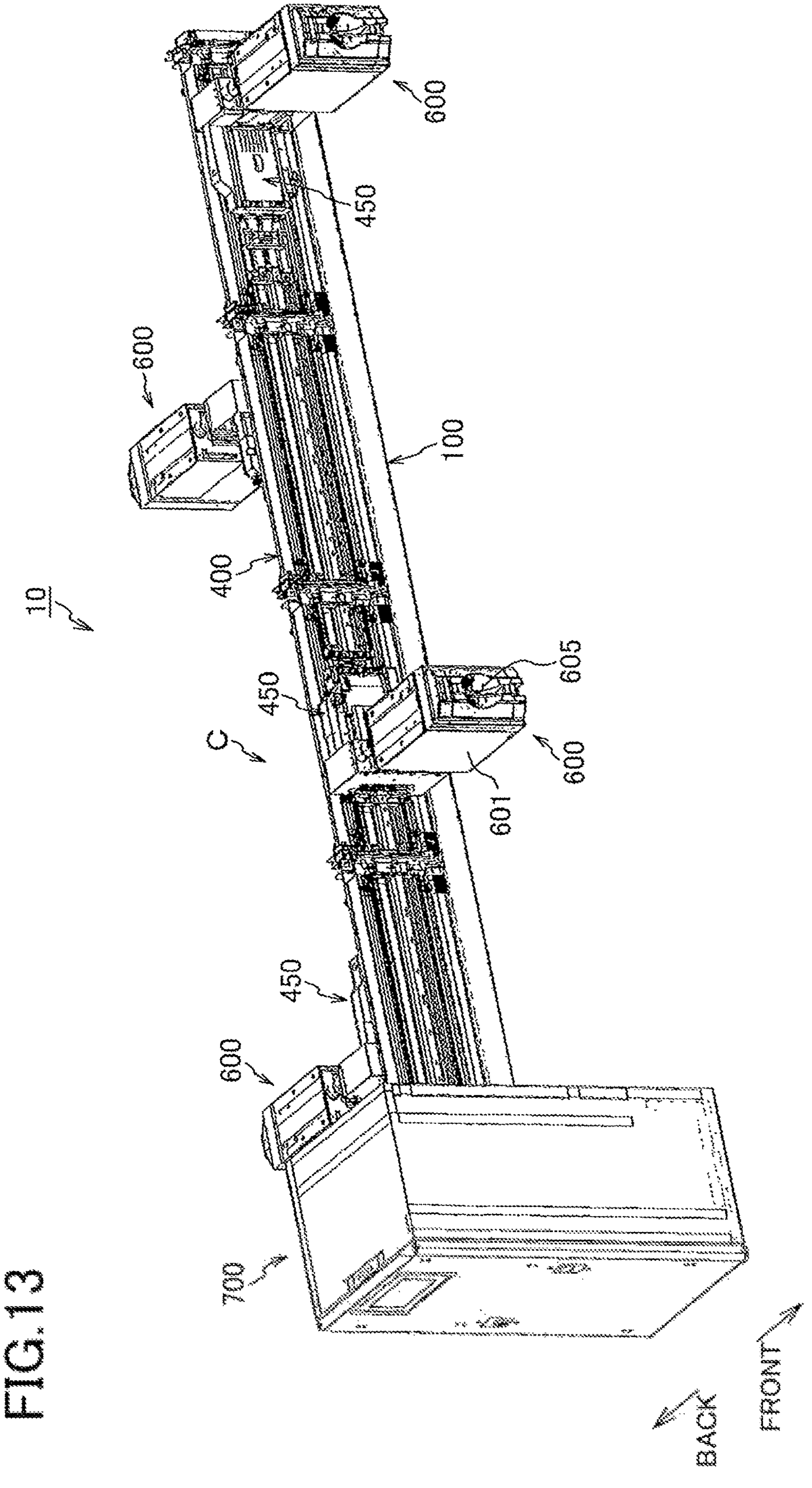
FIG. 13 is a front left perspective view of the banknote transport system.
Figure 14:
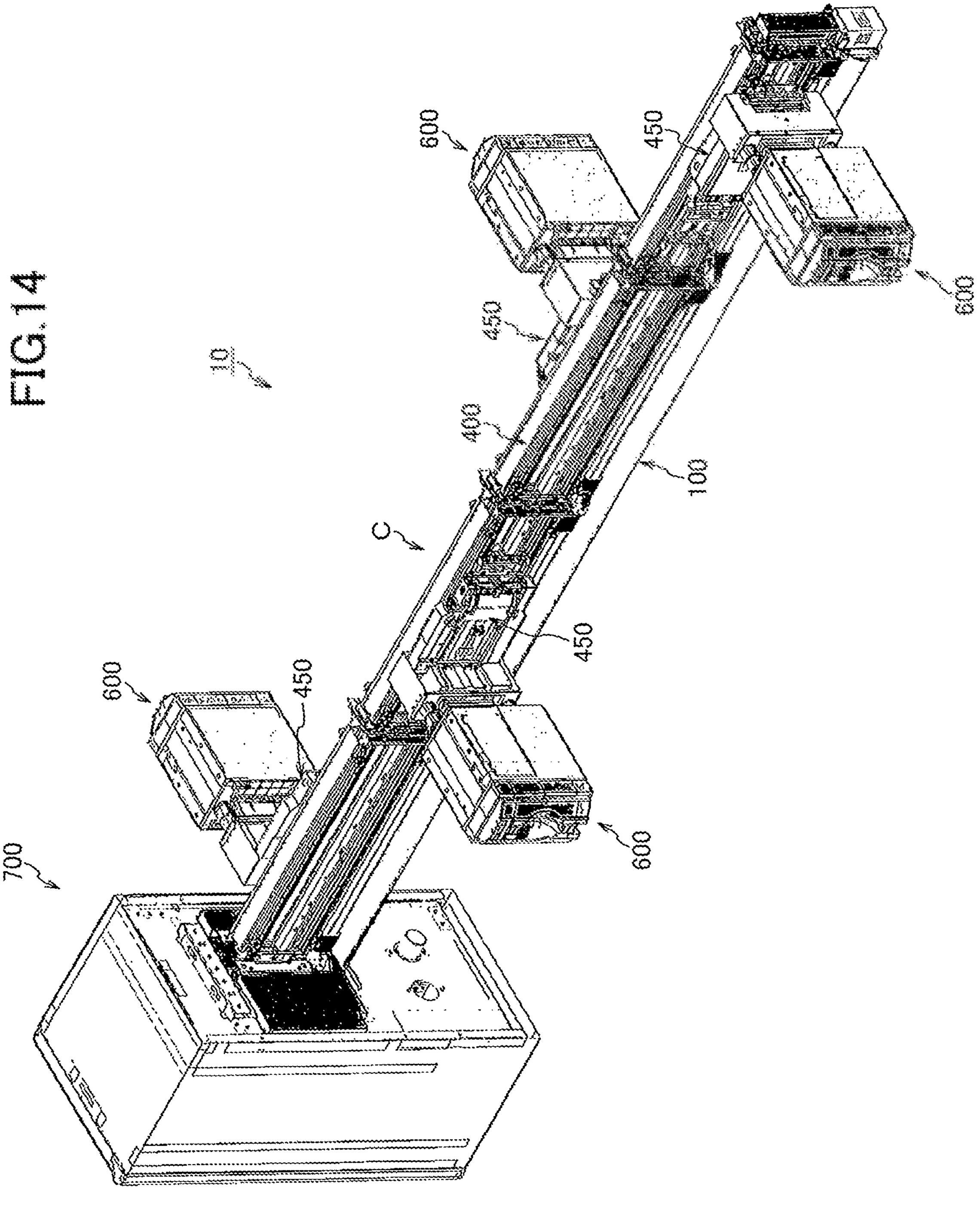
FIG. 14 is a front right perspective view of the banknote transport system.

FIG. 11 is a front view of the banknote transport system 10 including the receiving units (the paper sheet receiving devices) 600, FIG. 12 is a plan view of the banknote transport system, FIG. 13 is a front left perspective view of the banknote transport system, and FIG. 14 is a front right perspective view of the banknote transport system.

Figure 15:
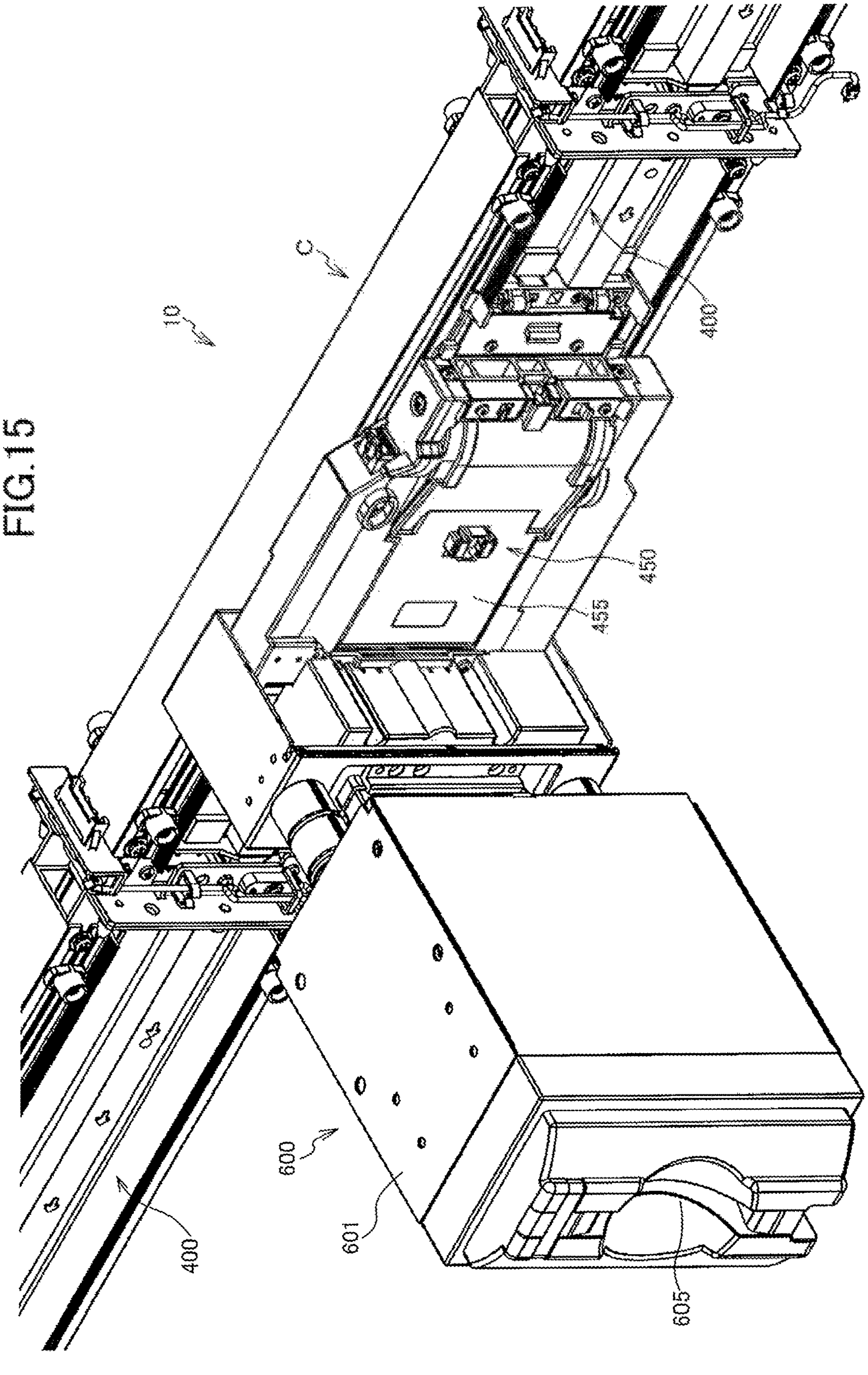
FIG. 15 is a perspective view illustrating a configuration of a coupling portion between the receiving unit and a transport tube 400.
Figure 16:
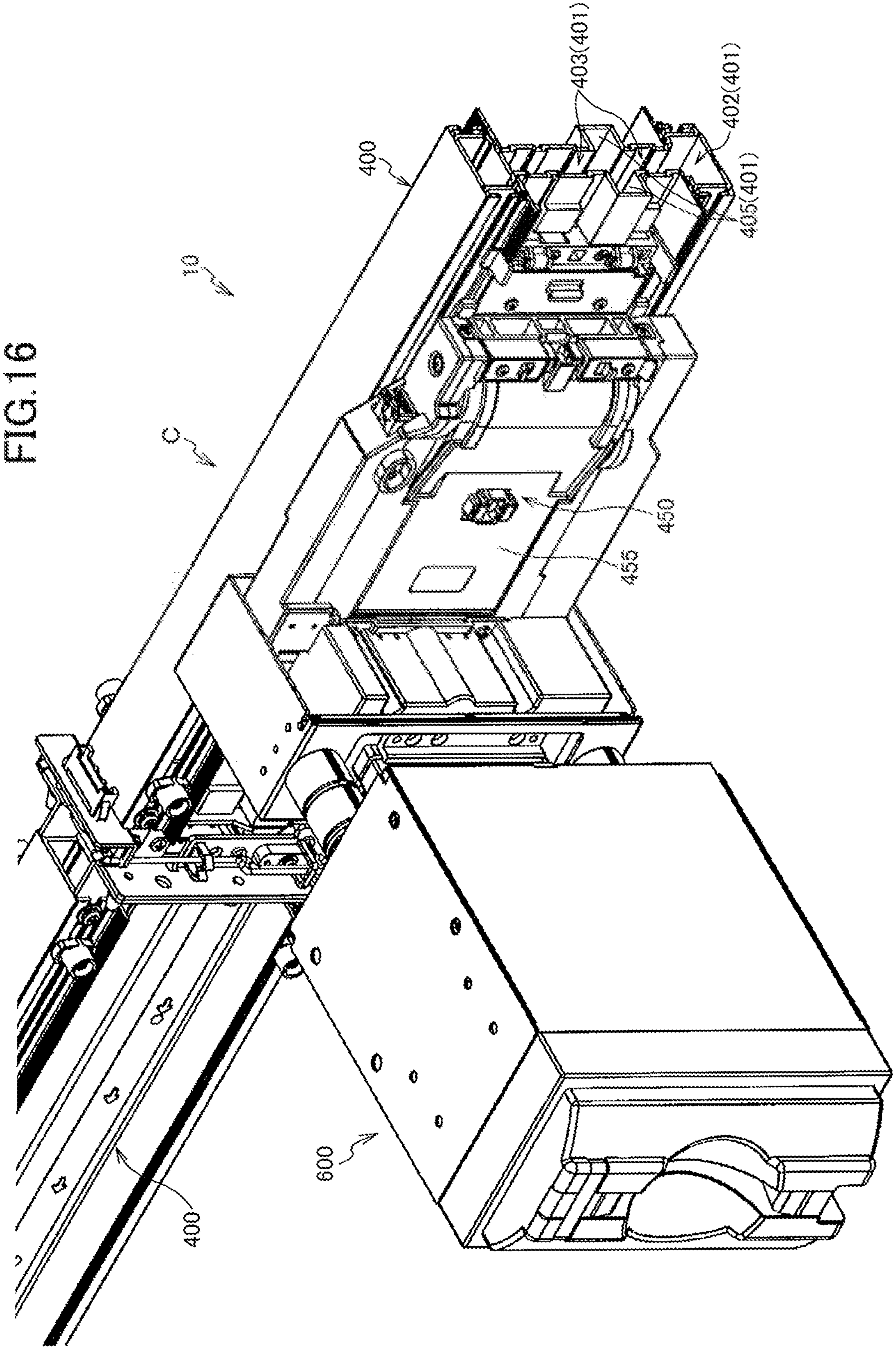
FIG. 16 is a perspective view illustrating a part of the transport tube in FIG. 15 in a vertical section.
Figure 17:
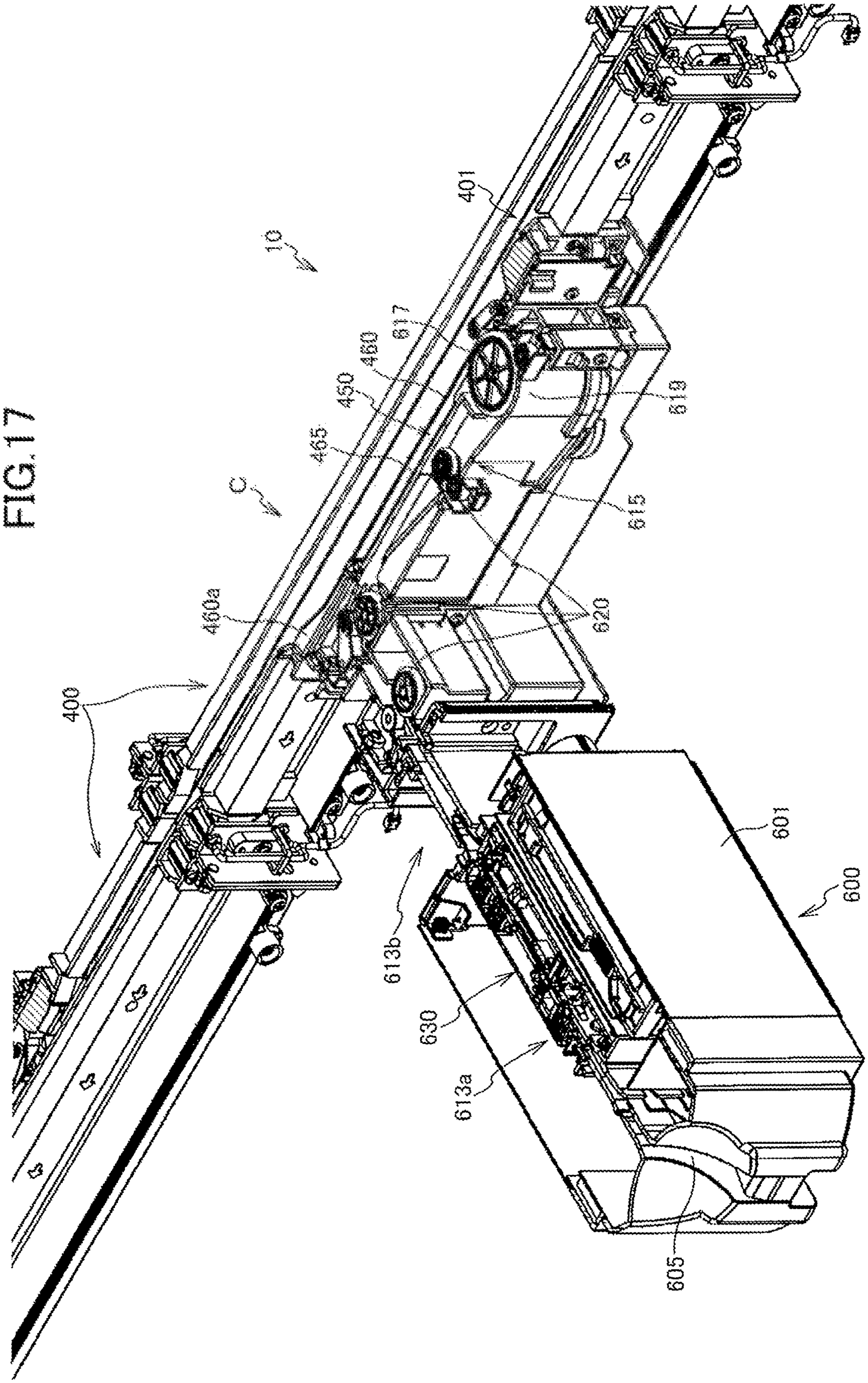
FIG. 17 is a horizontal sectional perspective view illustrating the configuration of the coupling portion between the receiving unit and the transport tube 400.
Figure 18:
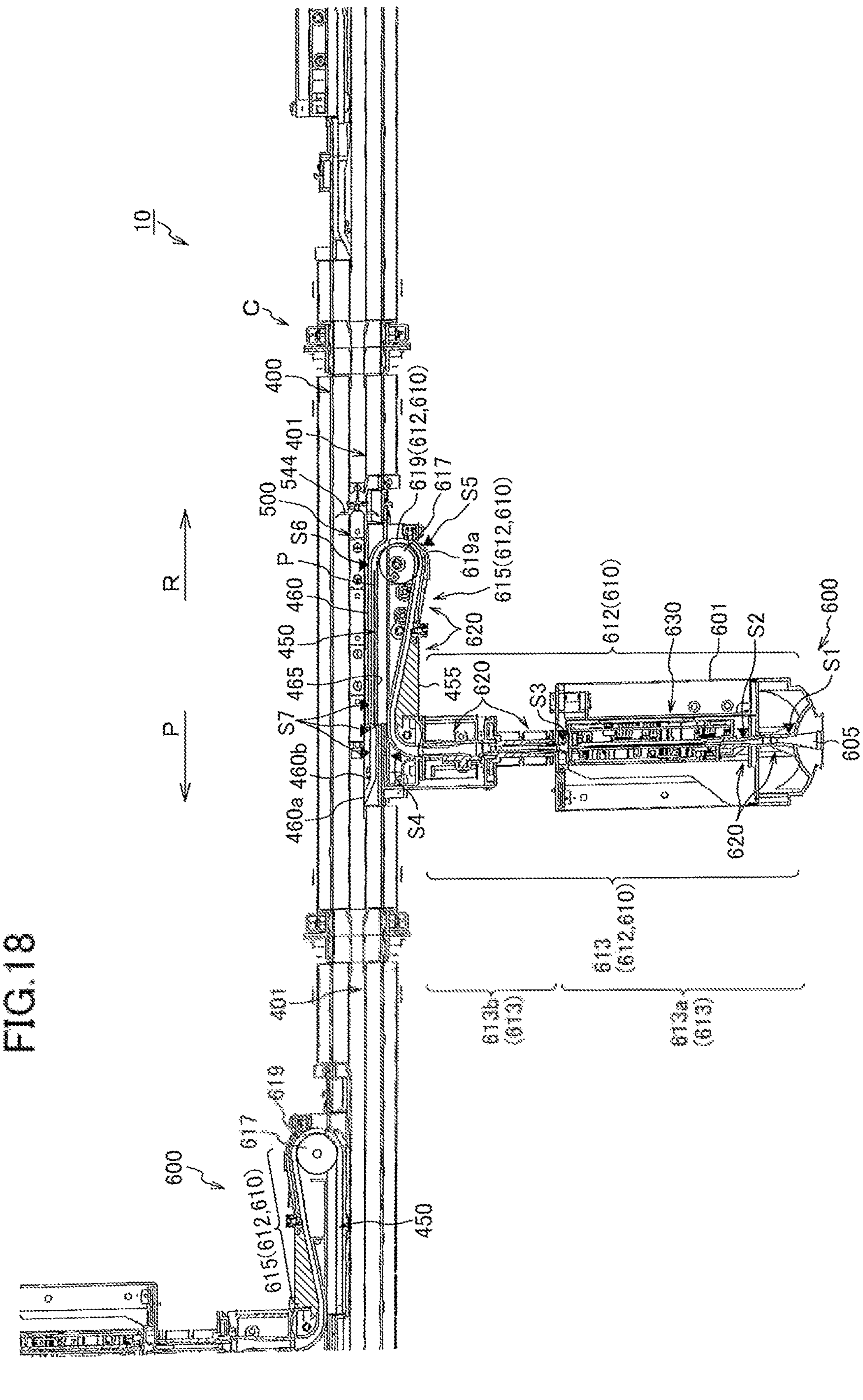
FIG. 18 is a horizontal sectional view of a part of a banknote transport device C.

FIG. 15 is a perspective view illustrating a configuration of a coupling portion between the receiving unit and the transport tube 400, FIG. 16 is a perspective view illustrating a part of the transport tube in FIG. 15 in a vertical section, FIG. 17 is a horizontal sectional perspective view illustrating the configuration of the coupling portion between the receiving unit and the transport tube 400, and FIG. 18 is a horizontal sectional view of a part of a banknote transport device C.

The banknote transport system 10 according to the second invention schematically includes the banknote transport device C including the transport tube 400 (the transport path 401) as a mainstream that has at least a portion arranged along the air blowing tube 100 to be adjacent to the air blowing tube 100, the transport body (a banknote transport shuttle) 500 for transporting banknotes that move inside the transport tube 400, and keeping parts 450 as tributaries that are provided at a plurality of places along the transport path 401 and that keep banknotes to be transferred onto the transport body 500, respectively, the receiving units 600 that are each arranged at each of the keeping parts to receive a banknote P input one by one from outside and to move the received banknote P to the associated keeping part 450, driving devices (such as a transport mechanism 620) that drive driving targets such as the banknote transport device C and the receiving units 600, the cashbox unit 700, and the control means (the management unit) 1000 that controls these components, in addition to the air blowing tube 100 that forms the flow path of a gas, the moving body 200, the air-blow control unit 300, the blower 310, and the like.

Furthermore, the moving body 200 includes the moving body magnetic material 213, and the transport body 500 includes the transport body magnetic material 523. At least one of the moving body magnetic material and the transport body magnetic material is a magnet, and the transport body is moved in conjunction with movement of the moving body receiving the air flow due to attraction and/or repulsion based on a magnetic force acting between the moving body magnetic material and the transport body magnetic material.

Although the transport path 401 being the transport body route extends as a linear route in the present embodiment, this is an example and the transport path 401 may be configured to form a loop including curved routes.

While each of the receiving units 600 is included in the associated sandwiched machine 2 illustrated in FIG. 1 and the game machine 1 is arranged at a location adjacent to each of the sandwiched machines 2 on the bank facilities L in an actual game hall, explanations of the game machines are omitted in the present embodiment.

Each of the receiving units 600 includes a banknote receiving part (a banknote receiving part) 605 that receives an input banknote, an introducing part 610 that sequentially transfers (guides) the banknote input to the banknote receiving part 605 to the associated keeping part 450, the transport mechanism 620 (details are not illustrated) such as a roller, a belt, and a motor constituting the introducing part 610, and the like.

The transport body 500 moving on the transport path 401 includes the banknote collecting/retaining part (transfer means) 540 that sequentially collects a banknote stopped at each of the keeping parts 450 on the process of passing the keeping parts with which the receiving units 600 are respectively communicated, and that transfers the banknote onto the transport body in an upright state to retain the banknotes in a stacked manner. The banknote collecting/retaining part has a configuration to retain banknotes with one face (a side surface) of the following banknote stacked on one face (a side surface) of precedent banknotes that have already been transferred thereon.

The transport path 401 extends between a right end portion (an initial position) in FIGS. 11 to 14 and a banknote discharge position inside the cashbox unit 700, and transport body sensors (photosensors, not illustrated) are arranged at places in the transport path 401, respectively, to check in real time the current position of the transport body 500 in the transport path, whether the transport body has passed the places, and the timing of the passage. For example, transport body detecting sensors are arranged at appropriate places including the initial position, each of the keeping parts 450, the cashbox system 700, and other places, respectively. Also at places in the longitudinal direction of the air blowing tube 100, moving body sensors for detecting the position of the moving body 200, whether the moving body has passed the places, and the timing of the passage are arranged, respectively.

When the sensor in the keeping part 450 of a certain receiving unit 600 detects that there is no banknote in the keeping part, the control means 1000 drives the transport mechanism 620 of the introducing part 610 to transfer the following banknote input to the banknote receiving part to the keeping part, and stops the transport mechanism at a time when movement of the banknote to the keeping part is detected and confirmed. When input of the following banknote to the banknote receiving part 605 is detected while a banknote kept in the keeping part 450 is detected, the control means 1000 drives the transport mechanism 620 of the introducing part 610 to receive the banknote and stop the banknote in the introducing part. Therefore, users of the game machine can uninterruptedly input two banknotes such as banknotes and the waiting time can be shortened.

<<Receiving Unit 600>>

As illustrated in FIGS. 15 to 18, each of the receiving units (the paper sheet receiving devices) 600 includes the banknote receiving part (banknote receiving port) 605 that is provided at the front of a housing 601 of the receiving unit and that receives a banknote input one by one, and the introducing part 610 that is arranged from the banknote receiving part 605 to the inside of the housing 601 and that introduces the received banknote into the associated keeping part 450. The introducing part 610 schematically includes an introducing route 612 that is a space for sequentially transferring (guiding) a banknote input into the banknote receiving part 605 to the keeping part 450, and the transport mechanism 620 constituted of a roller, a belt, a pulley, a gear, a motor, and the like arranged along the introducing route.

The introducing part 610 is provided with a recognition unit 630 that recognizes and judges the authenticity of an input banknote, the denomination thereof, and the like, and the control means 1000 reversely rotates the transport mechanism 620 to discharge the banknote from the banknote receiving part 605 when the banknote is judged not to be received. A banknote that is judged to be receivable by the recognition unit 630 is transported inside the introducing part 610 to the associated keeping part 450 by the transport mechanism 620.

The introducing route 612 includes a first introducing route part 613 that extends from the banknote receiving part 605 to the transport path 401 to be orthogonal thereto, a second introducing route part 615 that is communicatively connected to the first introducing route part 613 to extend in a retraction direction R that is a direction substantially parallel to the transport path 401 and away from the cashbox unit 700, and an inversion path (an inversion part) 619 that is formed on an outer periphery side of an inversion roller 617 arranged at a termination portion of the second introducing route part 615 and that causes the second introducing route part 615 to be communicated with the keeping part 450 as illustrated in FIGS. 17 and 18. The inversion path 619 is directly communicated with the keeping part 450 and a banknote having passed through the inversion path enters the keeping part 450 and stops in the keeping part 450. The inversion path 619 is latched between the outer periphery of the inversion roller 617 and a transport guide plate 619*a* that is arranged to be opposed to the outer periphery with a predetermined transport space away therefrom.

The keeping part 450 is a space formed in a housing 455 to transport and keep a banknote, and is formed of a guide plate 460 on the side of the transport path 401 and another guide plate 465 arranged with a predetermined transport space away from the guide plate 460. The keeping part 450 is designed to have a length and a shape that enable a longest banknote in the long edge direction to be kept therein while the extended attitude parallel to the transport path 401 is maintained in a state where the rear end edge of the longest banknote has passed through the inversion path 619. A banknote kept in the keeping part needs to be positioned in such a manner that the banknote can be transferred from the keeping part onto the transport body (banknote carrier) 500 while the collecting pawls 544 press the rear end edge of the banknote in a forward direction P in contact therewith when the transport body passes the keeping part. The rear end of a banknote kept in the keeping part is configured to be sufficiently separated from inversion driving means such as the inversion roller 617, so that the banknote can be continuously kept without influences of the inversion roller or the like even when the inversion roller or the like is driven.

As illustrated in FIG. 18, a tracking sensor S1 that detects entry of a banknote is installed in the banknote receiving part 605, and other tracking sensors S2 to S5 are installed at appropriate places on the downstream side, for example, the entrance and the exit of the recognition unit 630, the connection portion between the first introducing route part 613 and the second introducing route part 615, and the inversion path 619, respectively.

A sensor S6 that detects entry of a banknote from the inversion path 619 and sensors S7 that detect collection of a banknote from the keeping part 450 are arranged in the keeping part.

The first introducing route part 613 includes an entrance route part 613*a* including the recognition unit 630, and a keeping route part 613*b* for the following banknote on the downstream side. A banknote that is judged to be receivable on the basis of recognition information obtained when the banknote passes the recognition unit 630 moves to the keeping route part 613*b* and is transported into the keeping part 450 through the second introducing route part 615 and the inversion path 619 when the sensors S6, S7, and the like detect no precedent banknote kept in the keeping part 450. The range of the keeping position for the following banknote may reach the inversion path 619 beyond the keeping route part 613*b*.

At a time when the sensors S6, S7, and the like detect that the banknote front end or the banknote rear end has reached the adequate keeping position after passage of the banknote rear end through the inversion path 619 is detected, the transport is stopped and the banknote shifts to a standby state. The location of the banknote rear end at the time when the banknote has shifted to the standby state is set to a location where the rear end is not in contact with transport means on the side of the introducing part 610, such as the inversion roller 617 constituting the inversion path, so that the banknote can maintain the stopped state without interference even when the transport mechanism on the upstream side, including the inversion roller, is driven to transport the following banknote. For example, even when the following banknote is judged not to be received by the recognition unit 630 and the transport mechanisms of the first introducing route part 613 and the second introducing route part 615 are accordingly reversely driven, the location of the banknote stopped in the keeping part, and the operation thereof are not affected.

When it is detected that a banknote P1 in the keeping part is collected by the transport body 500 and is not in the keeping part, a following banknote P2 having been kept in the route part 613*b* or 615 on the upstream side of the inversion path 619 is sent into the keeping part 450 through the inversion path by redriving of the transport mechanism including the inversion roller 617.

<<Transport Body (Banknote Collecting Shuttle)>>

Figure 20A:
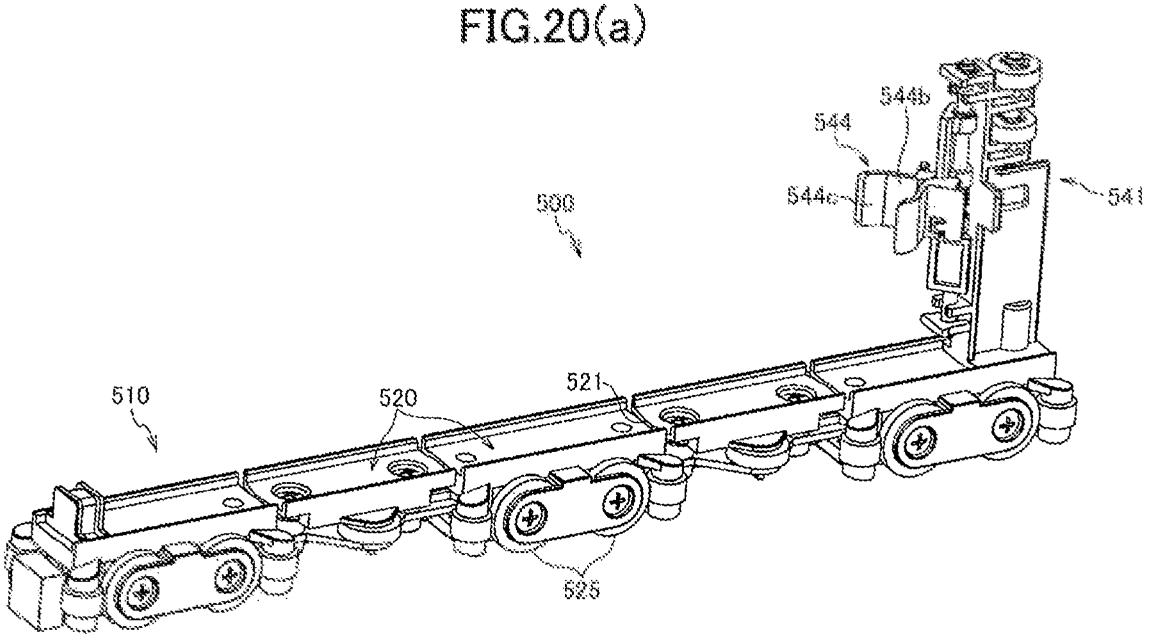
FIGS. 20(*a*) and 20(*b*) are an exterior perspective view and a plan view of the transport body 500 in a state where the collecting members (the collecting pawls) are closed.
Figure 20B:
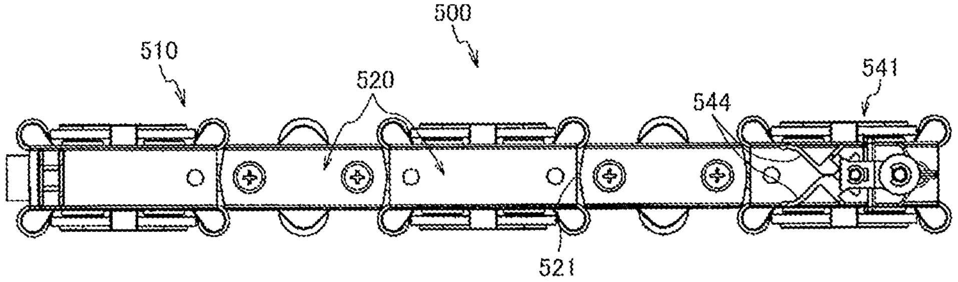
Figure 21:
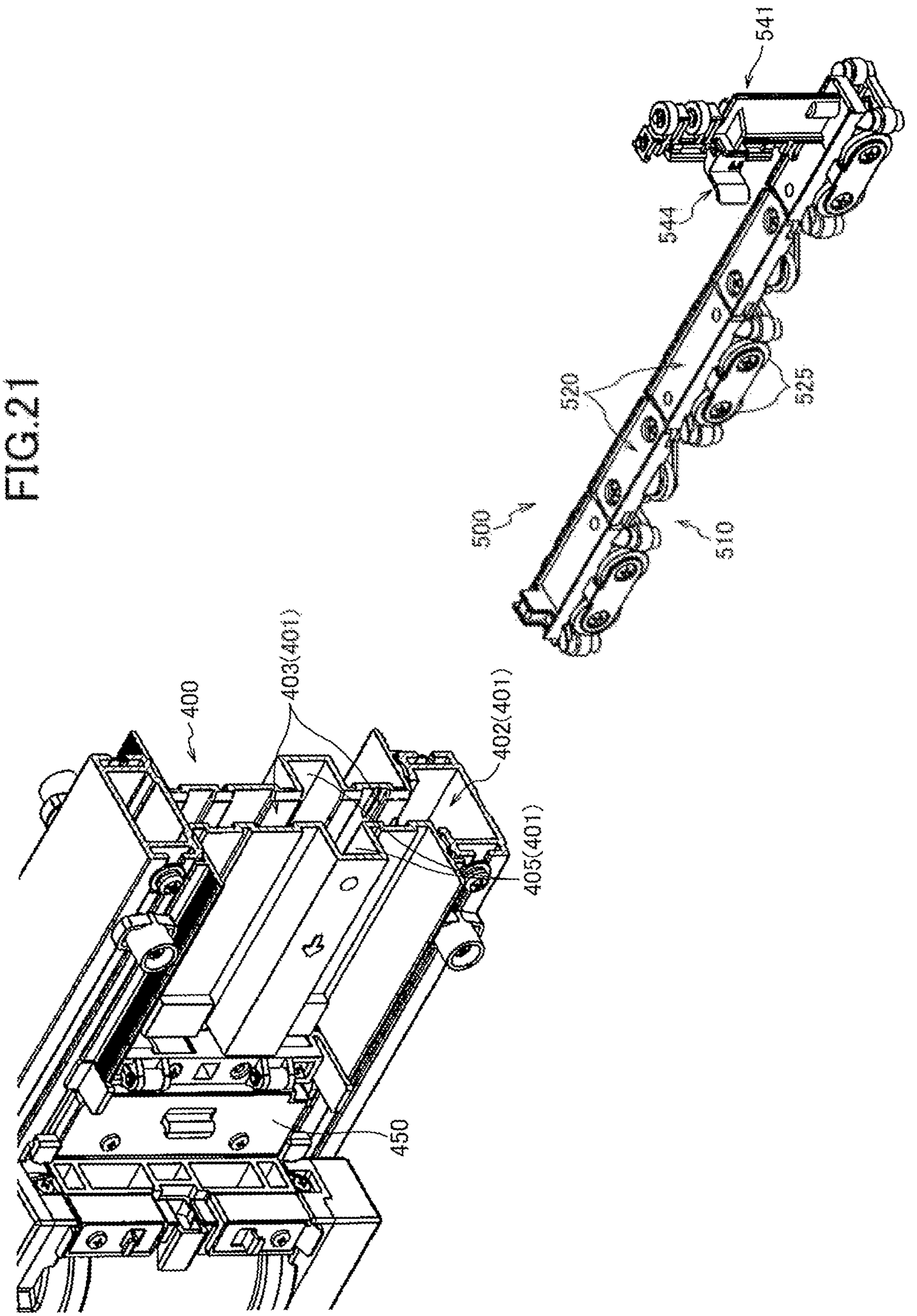
FIG. 21 is a partial sectional view illustrating a location relation between the transport tube 400 and the transport body 500.
Figure 22A:
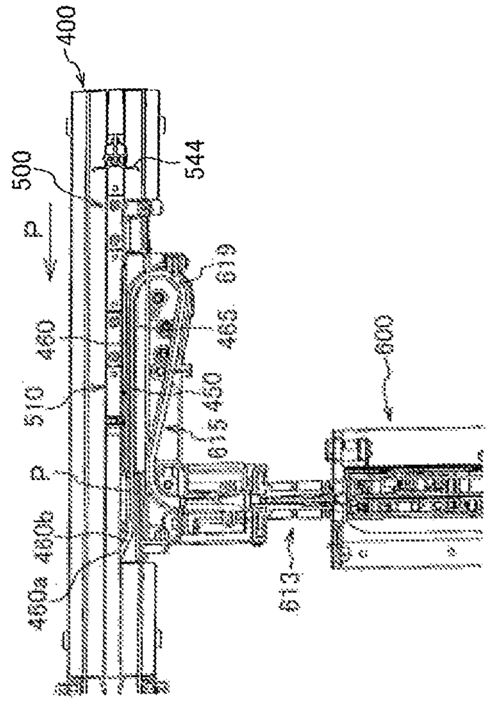
FIGS. 22(*a*), 22(*b*), 22(*c*), and 22(*d*) are plan horizontal sectional views illustrating a procedure in which the collecting members enter a keeping part to collect a kept banknote in the process of forward movement of the transport body 500.
Figure 22B:
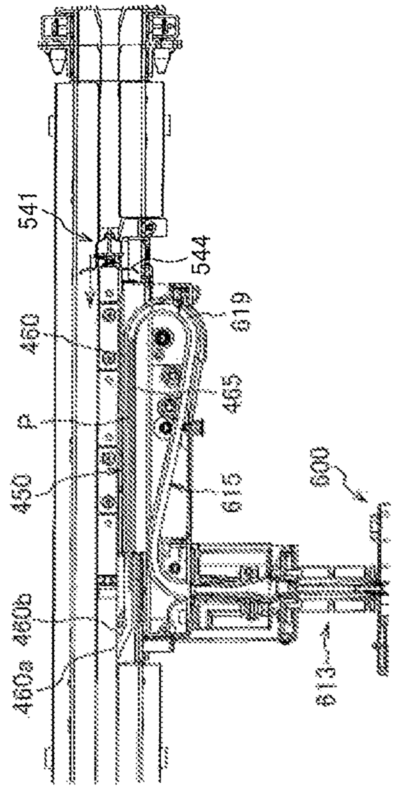
Figure 22C:
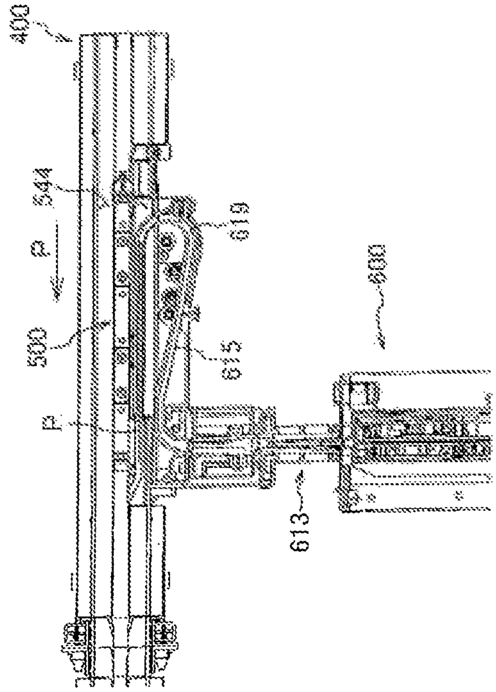
Figure 22D:
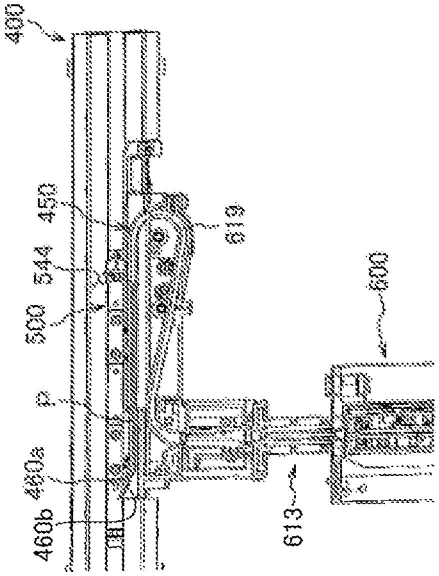
Figure 23:
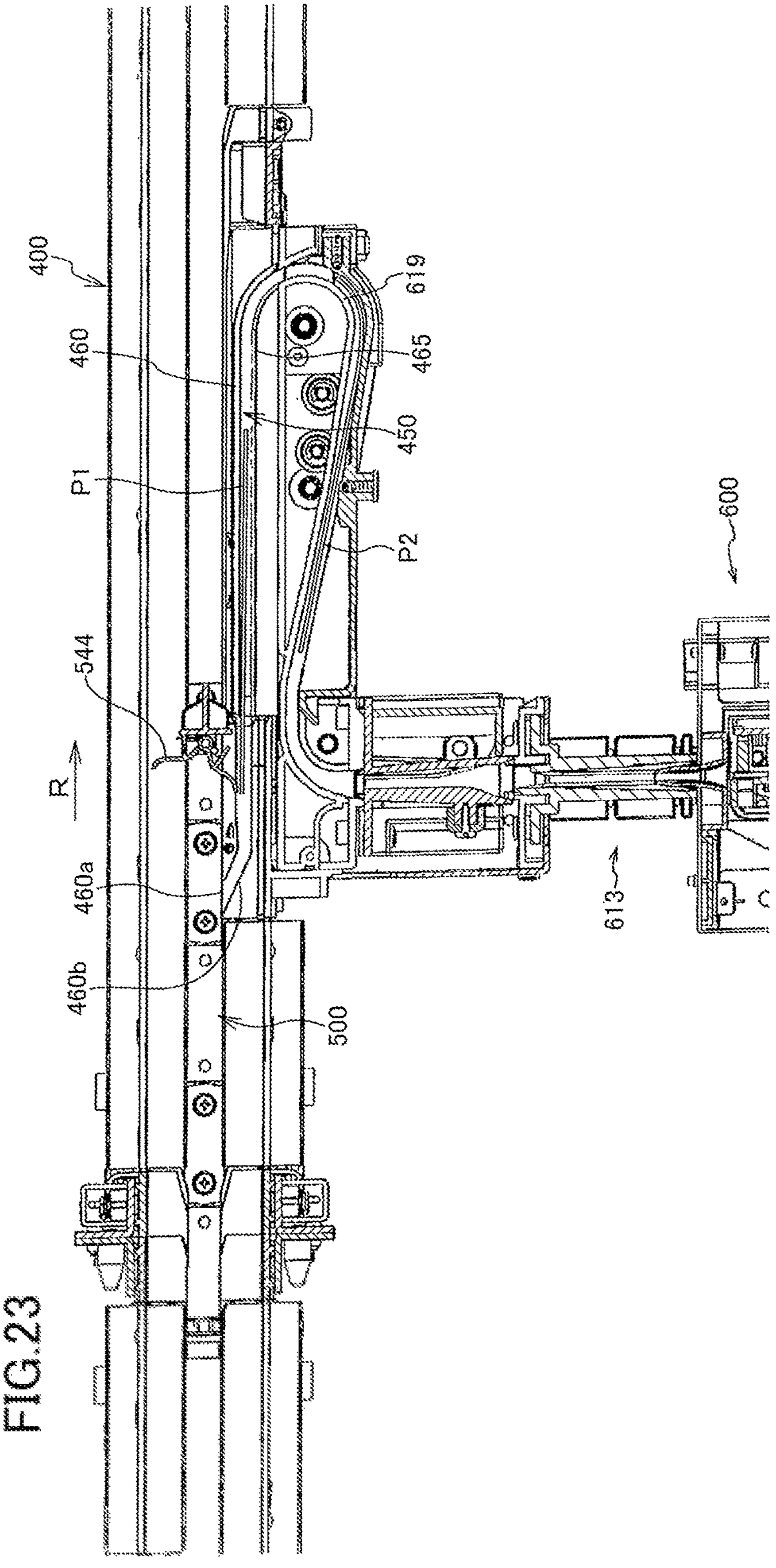
FIG. 23 is a plan horizontal sectional view illustrating a state where one of the collecting pawls deforms in the process of backward movement of the transport body.

FIGS. 19(*a*), 19(*b*), 19(*c*), and 19(*d*) are an exterior perspective view, a front view, a plan view, and a sectional view along A-A in FIG. 19(*a*) of the transport body 500 in a state where the collecting members (the collecting pawls) are opened. FIGS. 20(*a*) and 20(*b*) are an exterior perspective view and a plan view of the transport body 500 in a state where the collecting members (the collecting pawls) are closed. FIG. 21 is a partial sectional view illustrating a location relation between the transport tube 400 and the transport body 500. FIGS. 22(*a*), 22(*b*), 22(*c*), and 22(*d*) are plan horizontal sectional views illustrating a procedure in which the collecting members enter the keeping part to collect a kept banknote in the process of forward movement of the transport body 500. FIG. 23 is a plan horizontal sectional view illustrating a state where one of the collecting pawls deforms in the process of backward movement of the transport body.

The transport body 500 illustrated in FIGS. 19 to 21 is slightly different from the transport body illustrated in FIG. 6 in the configurations of the transport base 510 and the collecting members 544.

Figure 19C:
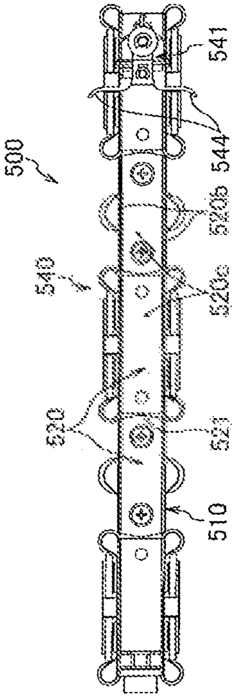
FIGS. 19(*a*), 19(*b*), 19(*c*), and 19(*d*) are an exterior perspective view, a front view, a plan view, and a sectional view along A-A in FIG. 19(*a*) of a transport body 500 in a state where collecting members (collecting pawls) are opened.
Figure 19D:
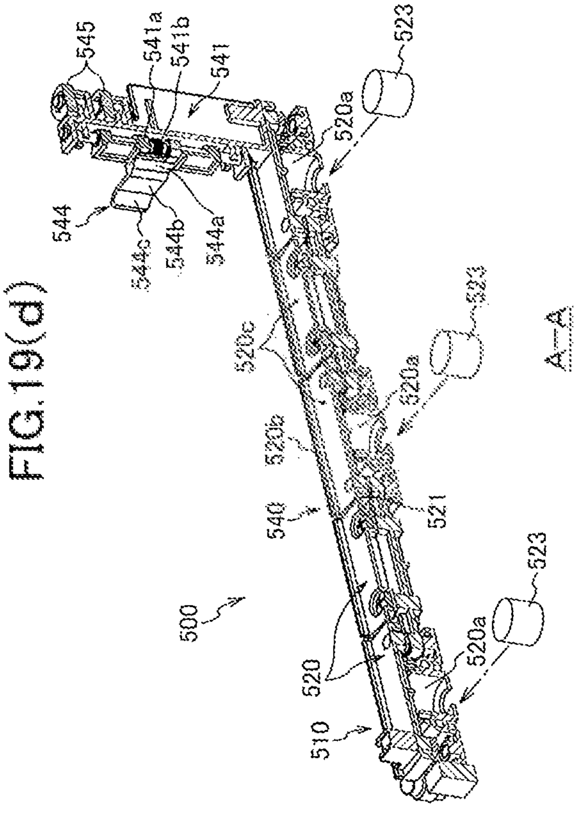
Figure 19A:
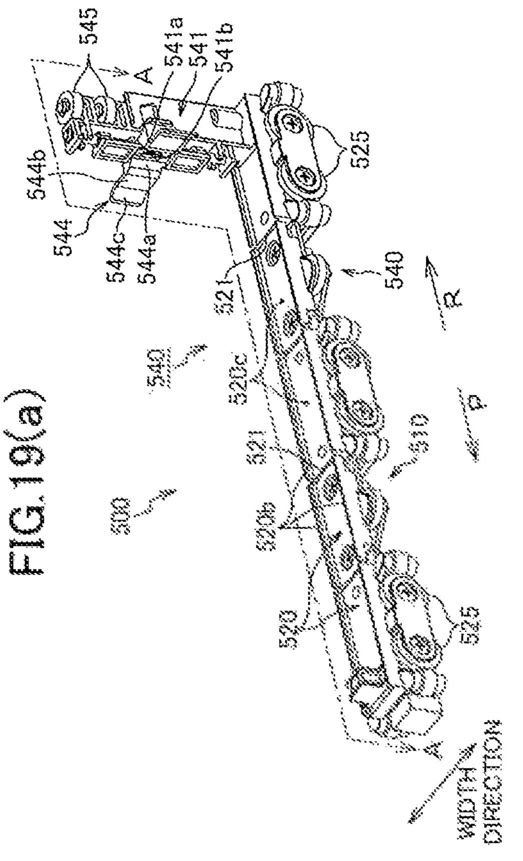
Figure 19B:
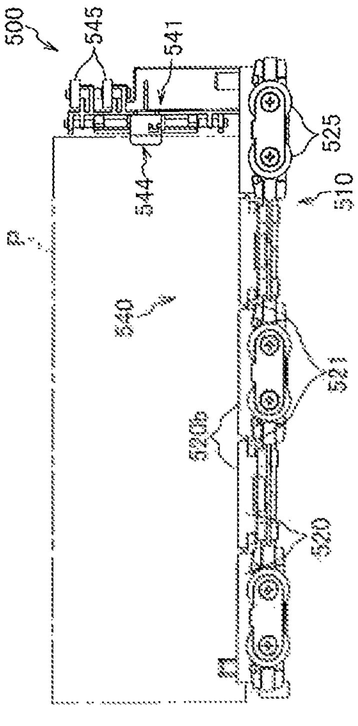

That is, the transport base 510 has a configuration in which the divided pieces 520 are coupled to each other with the hinge parts 521 to be displaceable in the upper-lower or right-left direction (or also in oblique directions) and the transport body magnet (transport body magnetic material) 523 is arranged in an internal space 520*a* of each of the divided pieces illustrated in FIG. 19D. Rotatable rollers 525 are also arranged on both side surfaces of each of the divided pieces 520 to enable smooth movement inside the transport tube 400. Rollers 545 are rotatably arranged on an upper portion of the support member 541 to reduce resistance with the inner wall of the transport tube.

The banknote collecting/retaining part (transfer means) 540 retains banknotes P to cause the long edge direction of the banknotes P to be in parallel to the longitudinal direction of the transport tube 400 and in an upright attitude. A long side on the lower side of the banknote P horizontally long and in the upright attitude is supported by the upper surface (the flat surface) of the transport base 510 (the divided pieces 520). The rear end edge (one of short sides) of the banknote is supported by the support member 541 and the collecting members 544.

While protrusions 520*b* preventing dropping of banknotes are provided on each of the divided pieces 520 on both end edges in the width direction, respectively, a region 520*c* on the inner side of the protrusions 520*b* is a flat surface and can stably support the long side on the lower side of each banknote. Since the regions 520*c* on the inner sides of the divided pieces 520 are communicated with each other in the longitudinal direction, banknotes can be placed across the inner regions 520*c* of plural divided pieces.

The banknote collecting/retaining part 540 erected on the transport base 510 includes, at an end portion of the transport tube 400 on the bank end side in the longitudinal direction (on the distal end side with respect to the cashbox unit 700), the support member 541 that is upright in a direction away from the air blowing tube 100, and the collecting members 544 including the two collecting pawls 544 that are protruded (spread) in the width direction from the support member 541 in a wing-like manner (at an acute angle or an obtuse angle) in plan view and that are pivotally supported by a pivotally support part 541*a* on the side of the support member 541 to be openable/closable in the horizontal direction. Since the illustrated pivotally support part 541*a* is in parallel to the support member 541, that is, in a vertical attitude, the collecting pawls 544 rotationally moving on the pivotally support part open and close in the horizontal direction. The rotational movement direction of the collecting pawls may be other directions.

Unlike the configuration example of FIG. 6 in which upper and lower two pairs of the collecting members are arranged, a pair of the collecting members 544 is arranged at a predetermined height location of the support member 541. The two collecting pawls 544 constituting the collecting members 544 are at the maximum open angle in the spread state illustrated in FIG. 19 and cannot rotationally move any more in the opening direction while they can rotationally move in the closing direction from the spread state. FIG. 20 illustrate a state (closed state) in which the two collecting pawls 544 are at the minimum open angle. Each of the collecting pawls 544 is always elastically biased in the opening direction by a spring (elastic member) 541*b* provided on the pivotally support part 541*a*. When the transport body 500 moves on the transport path 401 in the forward direction P toward the cashbox unit 700, each of the collecting pawls 544 maintains the spread position due to the spring 541*b* and the collecting pawls can therefore catch the rear end edge of a banknote stopping in the upright state in each of the keeping parts 450 to transfer the banknote onto the transport base 510 while moving the banknote in the forward direction P in the keeping part. Concave portions 405 (FIGS. 16 and 21) serving as collecting pawl passages are formed at places that are both inner walls of the transport tube 400 and that are passed by the collecting pawls 544 to enable the collecting pawls to maintain the spread position in the process of movement of the transport base 510 in the transport path 401 in the forward direction P toward the cashbox unit 700, respectively. The concave portions 405 in each of the keeping parts 450 are laid out to enable the associated collecting pawls to be brought into contact with the rear end edge of a banknote in the keeping part. It is preferable that the collecting pawls 544 are configured to independently perform the opening/closing operation. In such a case, each of the collecting pawls may be constituted to be individually rotationally moved by one coil spring (or a torsion spring), or the spring 541*b* may be provided for each of the collecting pawls.

Each of the collecting pawls 544 in the spread state illustrated in FIG. 19 includes a base end piece 544*a* on the inner side, which is pivotally supported by the pivotally support part 541*a* to be rotationally movable, an intermediate piece 544*b* extending outward in the width direction of the transport body from the base end piece 544*a*, and an end portion piece 544*c* bent or curved to be protruded in a diagonally forward direction from the intermediate piece 544*b*. When the collecting pawl 544 passes through in a keeping part 450, the intermediate piece 544*b* and the end portion piece 544*c* mainly enter the keeping part 450 and push the whole banknote in the forward direction while being in contact with the rear end edge of the kept banknote. If the banknote rear end edge being in contact with the intermediate piece 544*b* is about to be deviated outward in the width direction along a face of the intermediate piece, the end portion piece 544*c* can reliably block the deviation because the end portion piece 544*c* is protruded obliquely from an end portion of the intermediate piece 544*b*. After the kept banknote is transferred onto the transport base 510, the end portion piece 544*c* prevents the loaded banknotes from being deviated in the width direction or dropping.

With the configuration of the intermediate piece 544*b* to have an attitude parallel to the width direction of the transport path 401 or oblique to the forward direction P in the spread position of the collecting pawls 544 as illustrated in FIGS. 19, the intermediate piece can reliably catch and press the banknote rear end edge in the forward direction when brought into contact with the rear end edge in each of the keeping parts.

As described above, the collecting members 544 include a pair of the collecting pawls pivotally supported by the support member to be openable and closable in a substantially horizontal direction, and each of the collecting pawls opens and closes between the spread position protruded outward in the width direction and the retracted position retracted inward in the width direction and is biased toward the spread position by the elastic member.

Since each of the collecting pawls 544 has the configuration described above, merely linearly moving the transport body at the time of collecting banknotes in the keeping parts that are alternately positioned at different locations in the longitudinal direction across the transport path 401 enables the banknotes to be reliably collected by the associated collecting pawl and to be accumulated in a central portion of the transport body in the width direction.

When the transport body 500 moves in the retraction direction R in the transport path, the collecting pawls interfere with banknotes in the keeping parts. However, the collecting pawls switch the direction in the closing direction against the biasing of the elastic member in the process of continuing to move in contact with the banknotes. Accordingly, the transport body 500 can smoothly continue to move in the returning direction without providing impact such as damages on the kept banknotes.

Since the method of sequentially loading a collected following banknote with one face of the following banknote stacked on one face (one side surface) of already loaded banknotes in a state where the banknotes are already loaded on the transport base 510 in the upright state is adopted, the front end edge of the following banknote does not hit the rear end edge of the already loaded banknotes to become unloadable.

As illustrated in FIGS. 18, 22, 23, and the like, the guide plate 460 is provided between each of the keeping parts 450 and the transport path 401 as a partition that separates these parts from each other, and an opening part 460*a* for extracting a banknote to the transport path 401 is provided at an end portion of the guide plate 460 in the forward direction. A slit (not illustrated) through which the associated collecting pawl 544 can pass is formed on the guide plate 460 in parallel to the banknote transport direction, thereby preventing the guide plate 460 from blocking the collecting pawl during passage in the keeping part. A slit (not illustrated) through which the associated collecting pawl 544 can pass is also formed on the other guide plate 465 in parallel to the banknote transport direction, thereby preventing the guide plate 465 from blocking the collecting pawl during passage in the keeping part.

In the process of a banknote in the keeping part being pushed at the rear end edge by the collecting pawl to move in the forward direction P, the front end of the banknote protrudes from the opening part 460*a* toward the transport path 401 and leaves the keeping part. An inclined surface 460*b* that guides the banknote toward the transport route At this time to enable the banknote front end edge to be reliably guided to the side of the transport path is provided on the opening part (FIGS. 19, 22, and 23).

As described above, in the process of a banknote in each of the keeping parts 450 being pushed by the associated collecting pawl to move inside the keeping part toward the transport path 401, the movement is always from the front end portion of the banknote along the longitudinal direction. That is, due to the guide plate 460, the banknote kept in each of the keeping parts cannot move in a direction orthogonal to (approaching) the transport path 401 and moves from the opening part 460*a* onto the transport body while moving in the forward direction P along the longitudinal direction of the keeping part. Furthermore, banknotes already loaded on the transport body and banknotes kept in the keeping parts are previously set in the location relation to be at the same height location and in the same attitude with the guide plate 460 interposed therebetween, and are arranged to reliably cause the respective locations in the banknote thickness direction (the width direction of the transport path) to differ from each other (to prevent the banknotes from interfering with each other). Accordingly, when transfer of a banknote pushed out of the opening part 460*a* onto the transport body is completed, the banknote is smoothly loaded on one side surface of the already loaded banknotes to be stacked thereon. Therefore, a failure in the loading such as deviation, or dropping due to hit of the end edges of the banknotes never occurs.

As described above, while banknotes kept in the keeping parts and the loaded banknotes on the transport body are in the location relation not interfering with each other, only the collecting pawls 544 on the transport body are in the location relation being able to interfere with the kept banknotes. Therefore, when the collecting pawls enter the space of each of the keeping parts, the collecting pawls can catch the banknote rear end in the keeping part, push the banknote in the forward direction from the kept location to cause the front end edge of the banknote to be protruded from the opening part 460*a*, and finally transfer the entire banknote onto the transport body.

The collecting pawls 544 are configured to be able to individually rotationally move (retract) in the closing direction against the spring 541*b* when the collecting pawls 544 are brought into contact with an obstacle (banknotes in the keeping parts 450) in the process of the transport base 510 moving inside the transport path 401 in the retraction direction R away from the cashbox unit 700, and to return to the original spread position after passing the obstacle. Accordingly, even when one of the collecting pawls 544 is brought into contact with a banknote P1 in one keeping part 450 located on the passage route in the process of movement of the transport base 510 in the retraction direction R, this collecting pawl passes the banknote while retracting in the closing direction during movement in contact with the banknote. Therefore, the transport base 510 can smoothly move (see FIG. 23).

As illustrated in FIG. 16, the concave portions 405 are formed on two opposing inner walls of the transport path 401, respectively, to enable the two collecting pawls 544 to smoothly pass through. The concave portions 405 are convex portions as viewed from outside. While the concave portions 405 are formed on almost the entire length of the transport path 401 (almost the whole of the moving route of the transport body 500), the concave portions 405 are not provided at places where the receiving units 600 are arranged, that is, in the range interfering with the keeping parts 450. That is, convex wall portions of the transport path constituting the concave portions 405 are eliminated in each of the exterior bodies 455 (FIGS. 16 and 18) including the associated keeping part 450 therein. A banknote in the standby state is arranged in the space inside the exterior body 455 forming each of the keeping parts 450. Therefore, if the convex wall portion constituting each of the concave portions 405 extends to the inside of each of the keeping parts, the wall portion interferes with the space for keeping a banknote. In the exterior body 455 of the keeping part, the slits for avoiding the collecting pawls are formed on the guide plates 460 and 465 forming the keeping part, respectively. Accordingly, the collecting pawls entering the exterior body can be brought into contact with the kept banknote to transport the banknote.

A procedure in which the transport body (the banknote collecting/retaining part 540) collects banknotes stopped in the keeping parts 450 in the process of moving on the transport path 401 in the forward direction P toward the cashbox unit is explained next with reference to FIGS. 22(*a*) to 22(*d*).

In a state illustrated in FIG. 22(*a*), while a portion of about two-thirds of the transport body 500 from the head of the transport base 510 reaches a location overlapping with the keeping part 450, the support member 541 is positioned behind the keeping part and accordingly the collecting pawls 544 are also behind the keeping part. In FIGS. 22(*b*) and 22(*c*), the support member 541 approaches more the keeping part 450 than in FIG. 22(*a*) while the collecting pawls 544 are still outside the keeping part. Subsequently, in FIG. 22(*d*), the support member 541 enters the keeping part and, when there is a banknote in the keeping part, the collecting pawl 544 on the side of the keeping part is brought into contact with the rear end edge of the banknote and moves the banknote in the width direction of the transport path 401 while pushing and moving the banknote in the forward direction P. Therefore, the banknote P is transferred (collected) onto the transport base 510 while keeping the upright attitude. When there are banknotes already transferred on the transport base, the banknote P is loaded to be stacked on a lateral side of the already loaded banknotes.

When the transport body 500 passes this keeping part 450 to collect a banknote in the next keeping part located downstream in the moving direction, the collecting pawl 544 located on the side of the next keeping part collects the banknote.

FIG. 23 illustrates a state where one of the collecting pawls 544 rotationally moves in the closing direction to avoid a banknote P stopped in the keeping part 450 in the process of movement of the transport body 500 on the transport path 401 in the retraction direction R away from the cashbox.

With the banknote transport system according to the present invention, even when the transport body is moved at a high speed, a banknote retained by each of the game media dispensing devices (the receiving units) can be reliably and promptly collected and transferred onto the transport body and a plurality of banknotes can be stably transported without jam while retained in an aligned manner.

<<Procedure of Paper Sheet Collection by Transport Body>>

In the banknote transport system 10 having the configuration described above, various types of processing described below can be performed depending on whether there is a banknote in the keeping parts 450 and the introducing parts 610.

Figure 24:
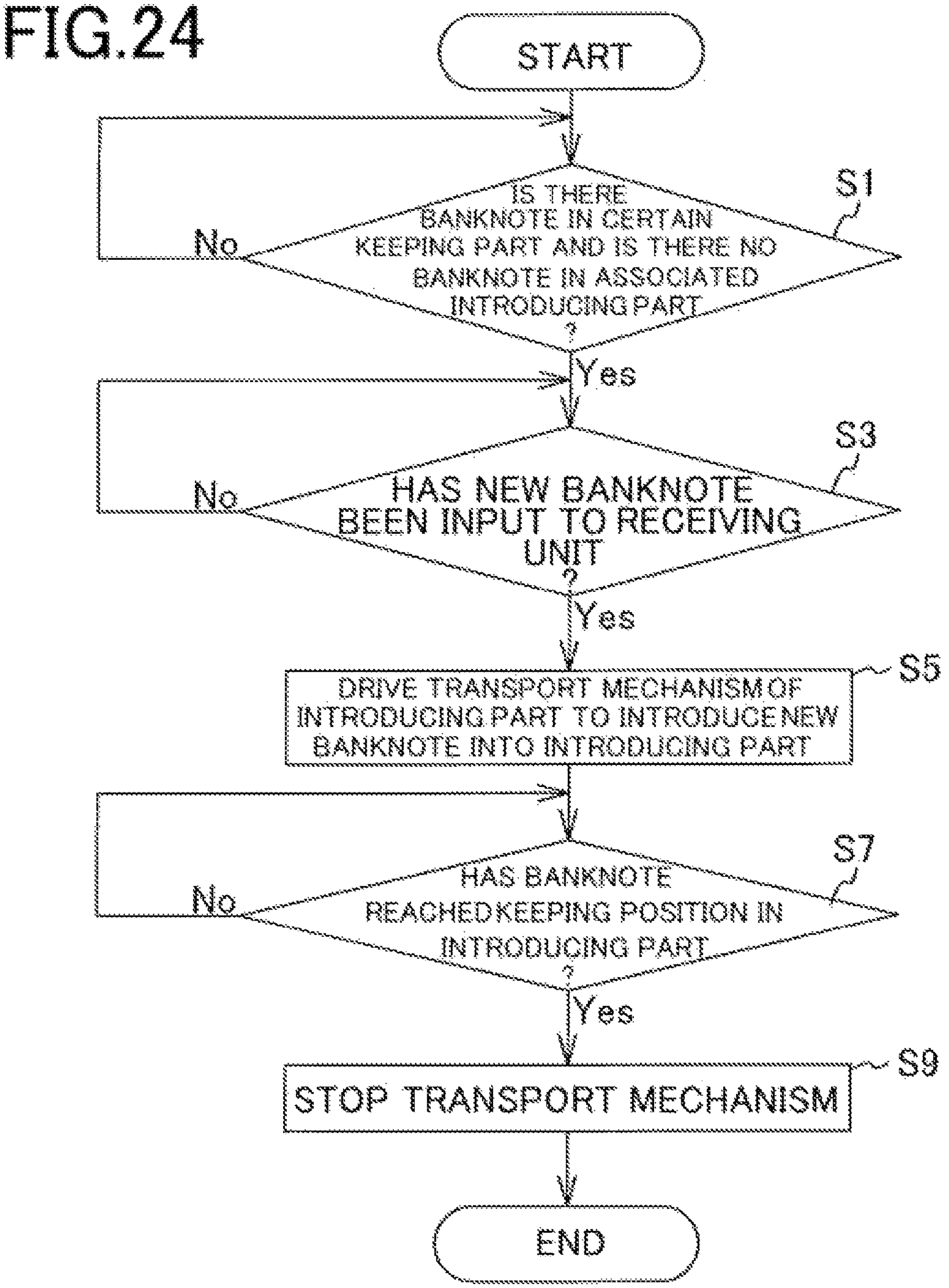
FIG. 24 is a flowchart illustrating an example of a collecting procedure and an introducing procedure for banknotes by the transport body.

FIG. 24 is a flowchart illustrating an example of a collecting procedure and an introducing procedure for banknotes by the transport body.

When it is detected that a banknote is stopped in a certain keeping part 450 and that there is no banknote in the associated introducing part 610 (YES at Step S1), and when it is detected that the following banknote has been newly input to the receiving unit (the paper sheet receiving device) 600 corresponding to the keeping part (YES at Step S3), the control means 1000 controls relevant components to receive the following banknote in the introducing part 610 and stop (keep) the banknote in the introducing part (Steps S5, S7, and S9).

This enables any place in the introducing part 610 on the upstream side of the keeping part 450 to be used as a keeping part for the following banknote, and the second banknote can be therefore input in a state where no banknote is in the keeping part.

Figure 25:
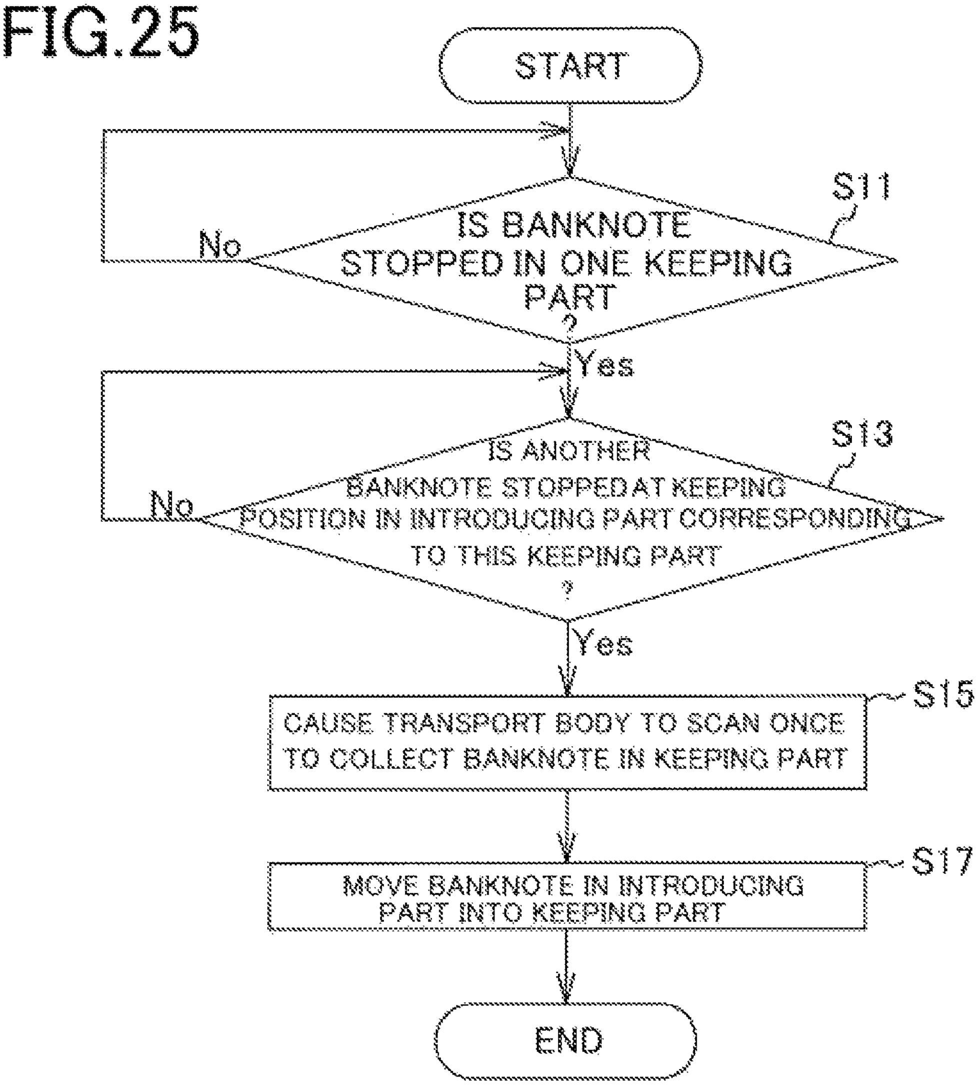
FIG. 25 is a flowchart illustrating another example of the collecting procedure and the introducing procedure for banknotes by the transport body.

FIG. 25 is a flowchart illustrating another example of the collecting procedure and the introducing procedure for paper sheets by the transport body.

When it is detected that different banknotes are simultaneously in the standby state in any one of the keeping parts 450 and in the introducing part 610 on the upstream side of this keeping part, respectively (YES at Steps S11 and S13), the control means 1000 controls relevant components to cause the banknote in the keeping part 450 to be collected by causing the transport body 500 to scan once from the initial position to the location of the cashbox unit 700 using the moving body 200 (Step S15) and to cause the banknote in the introducing part 610 to move into the keeping part 450 (Step S17).

When banknotes are in a state kept in the keeping part 450 and the introducing part 610, respectively, the third banknote cannot be input. However, the control described above enables the introducing part 610 to be emptied and enables the third banknote to be input therein.

Figure 26:
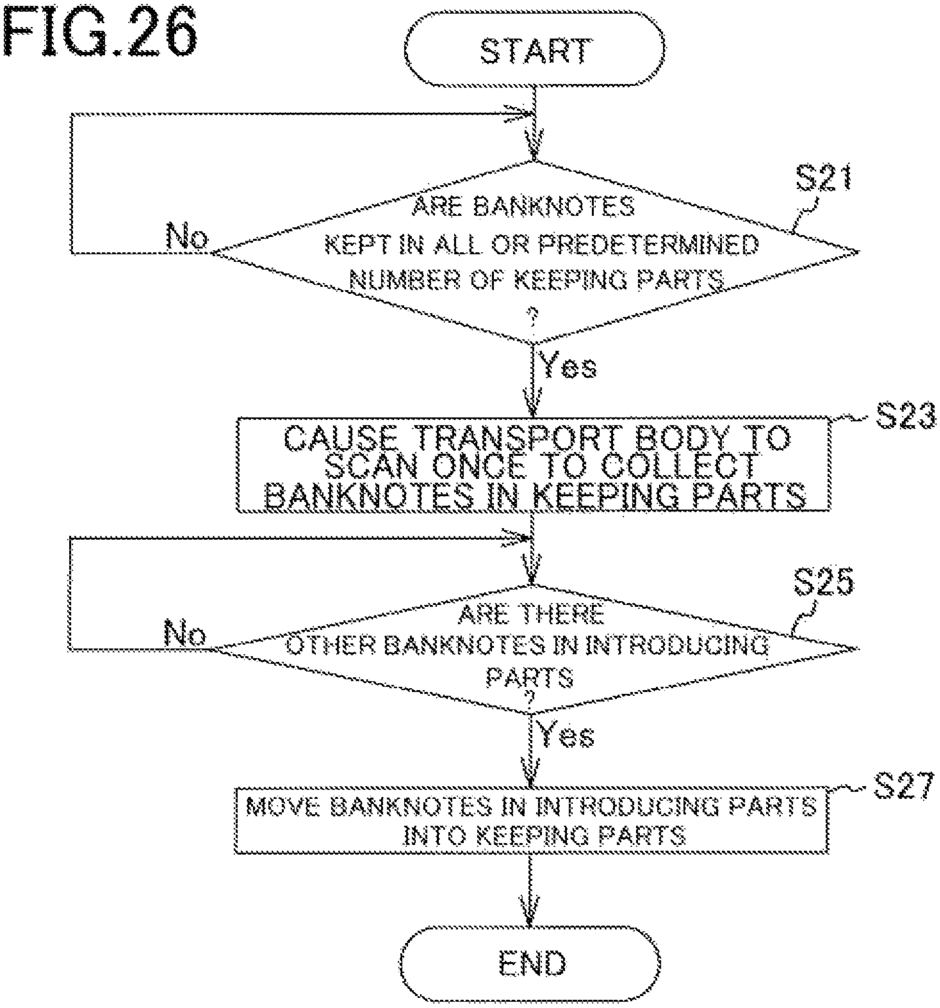
FIG. 26 is a flowchart illustrating another example of the collecting procedure and the introducing procedure for banknotes by the transport body.

FIG. 26 is a flowchart illustrating another example of the collecting procedure and the introducing procedure for paper sheets by the transport body.

When it is detected that banknotes are in a standby state in all the keeping parts 450 or when it is detected that banknotes are kept in a predetermined number of or more (for example, ten or more) keeping parts, respectively (YES at Step S21), the control means 1000 causes the transport body 500 to scan once from the initial position to a location near the cashbox unit 700 using the moving body 200 (Step S23). Accordingly, the control means 1000 controls relevant components to collect the banknotes in the keeping parts 450 and, when there are banknotes in the introducing parts 610, move these banknotes into the associated keeping parts, respectively (Steps S25 and S27).

This can reduce the waiting time in which banknotes cannot be input, and can increase the convenience of users.

C. Direction Switching and Transferring Device of Paper Sheets in Paper Sheet (Banknote) Transport System According to Third Invention A banknote direction switching and transferring device H (a swivel stacker device) in the banknote transport system 10 according to a third invention is explained next.

Figure 27:
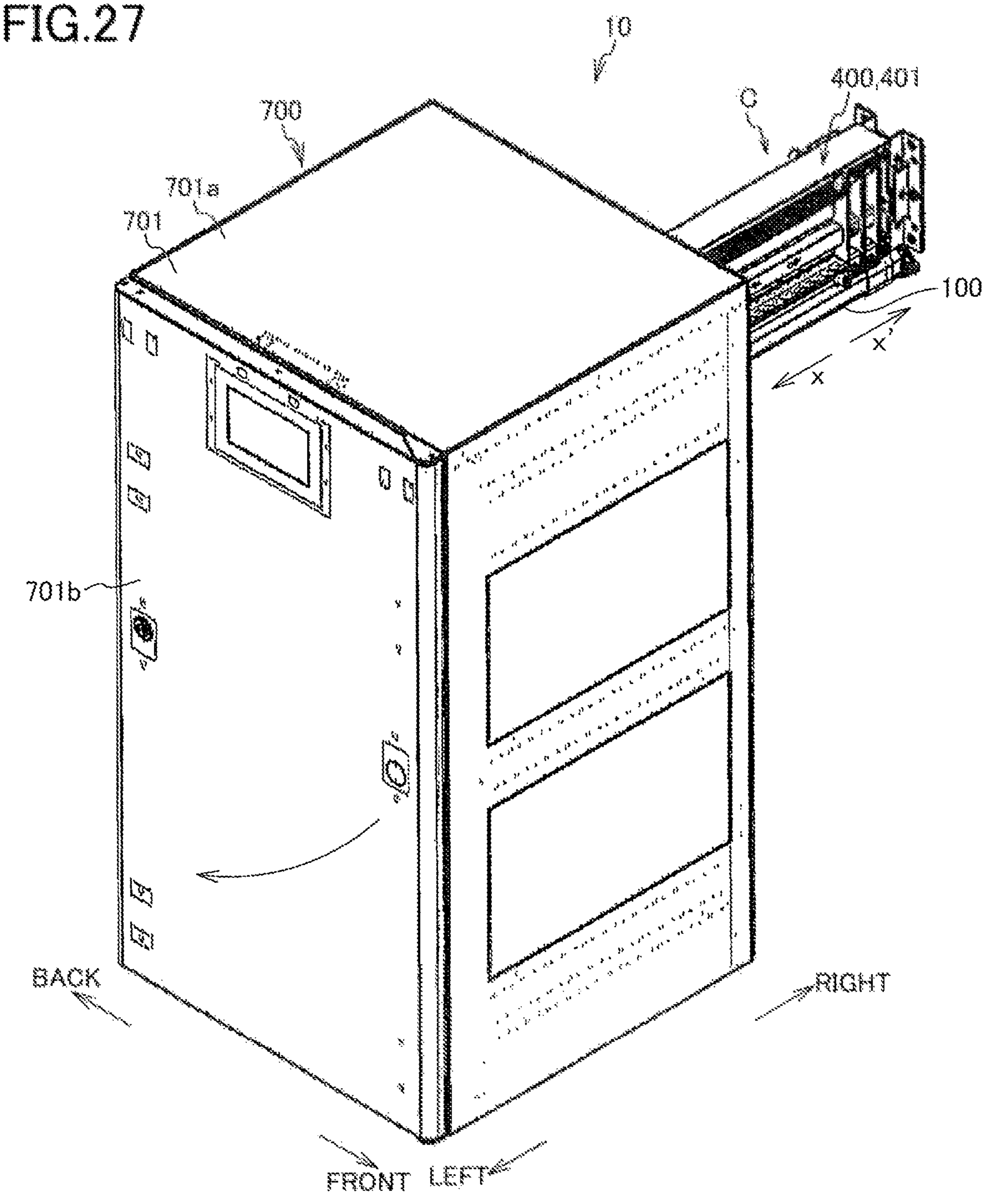
FIG. 27 is a front perspective view of a cashbox unit to which a portion of the transport route is assembled.
Figure 28:
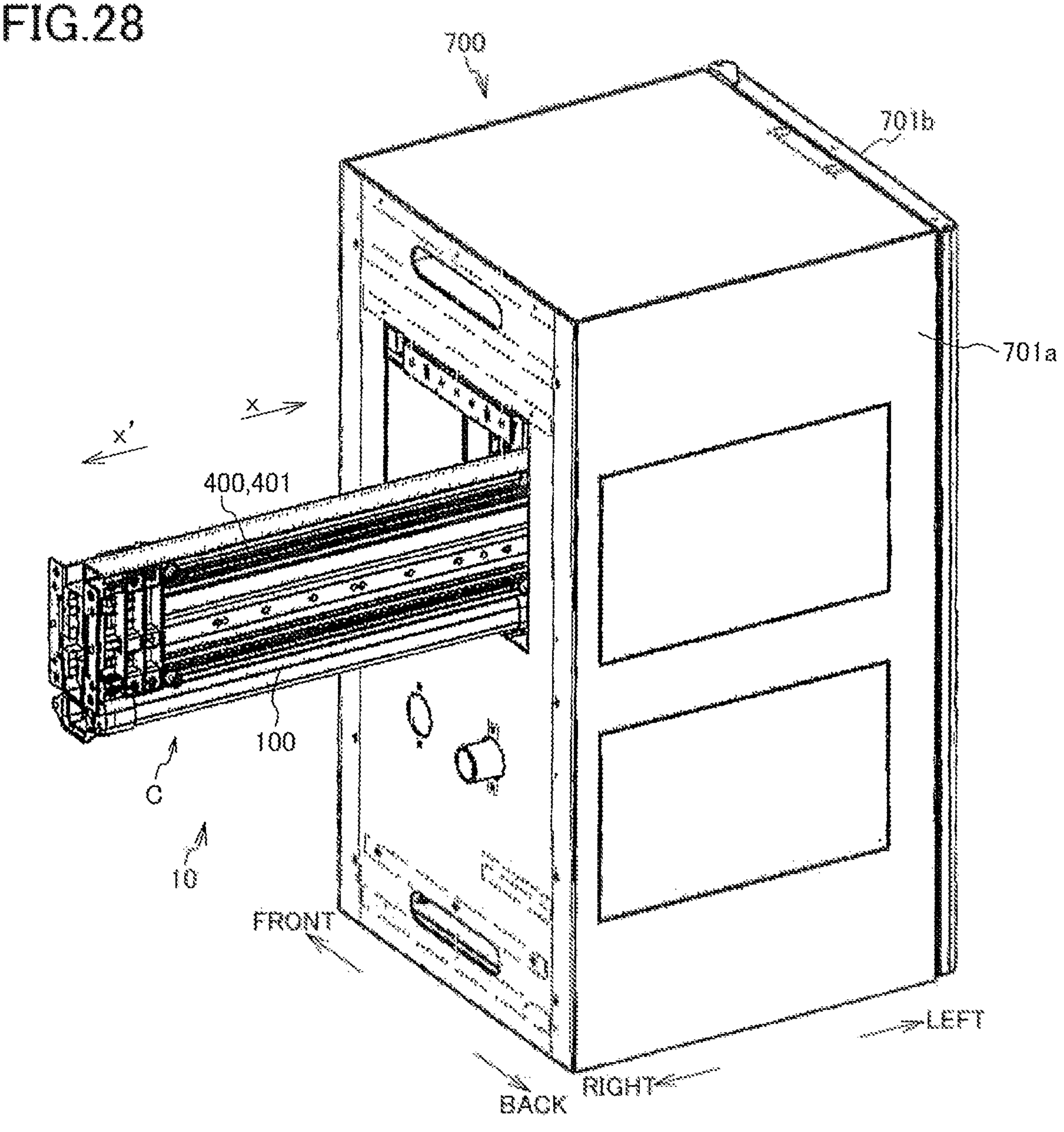
FIG. 28 is a back perspective view of the cashbox unit to which a portion of the transport route is assembled.
Figure 29:
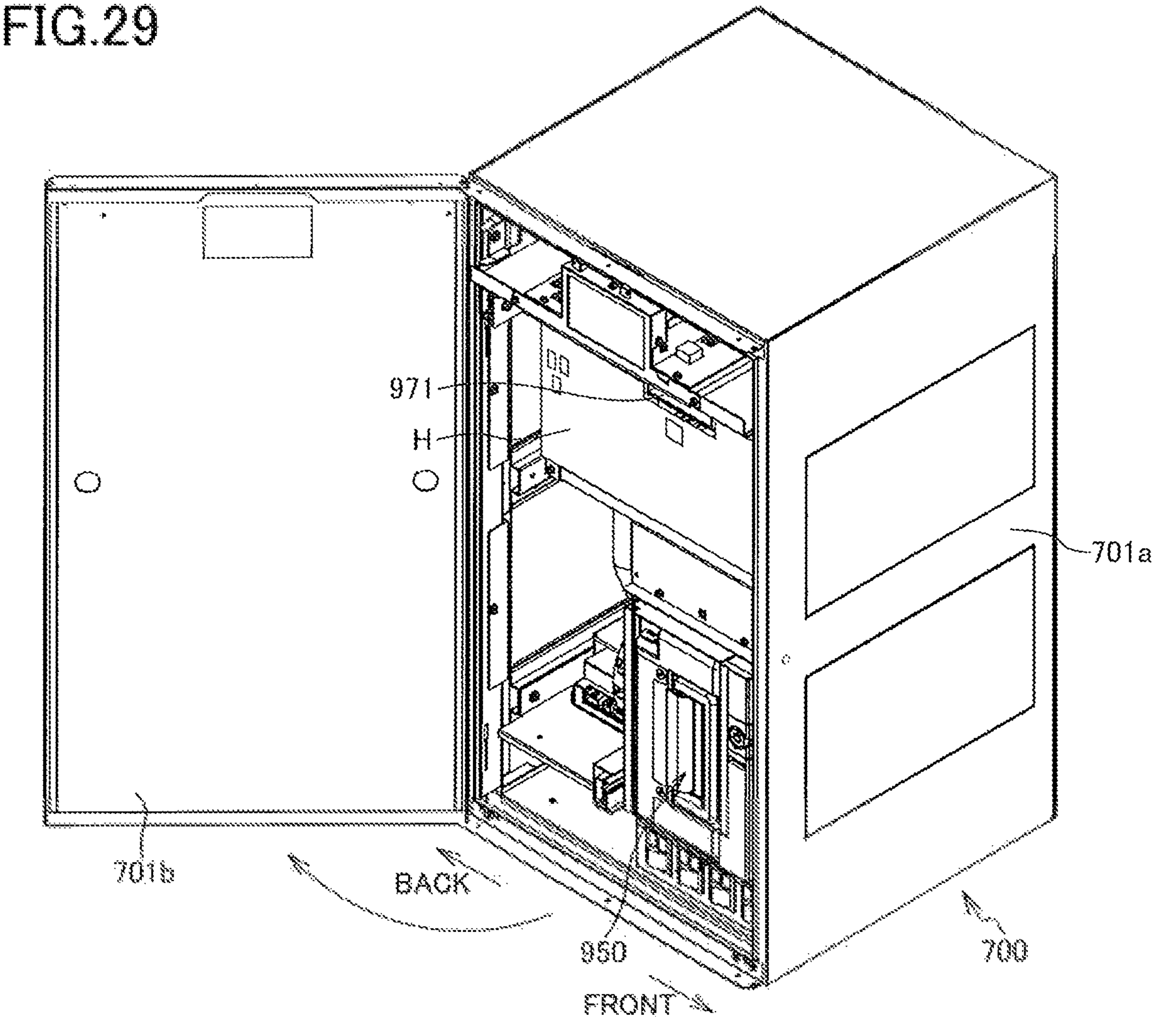
FIG. 29 is a perspective view of the cashbox unit where a door is opened to illustrate an internal state.
Figure 30:
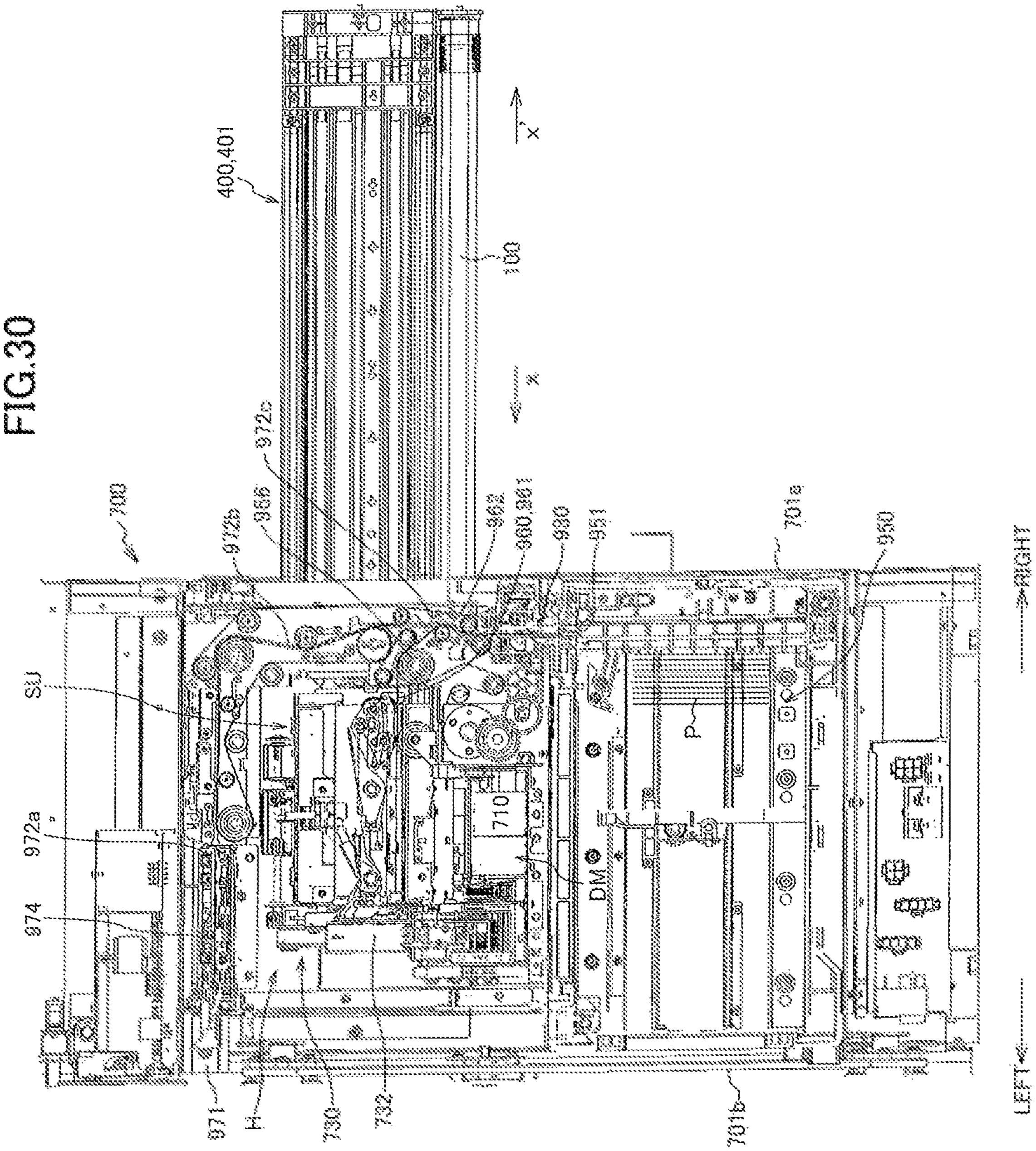
FIG. 30 is a front vertical sectional view of the cashbox.
Figure 31:
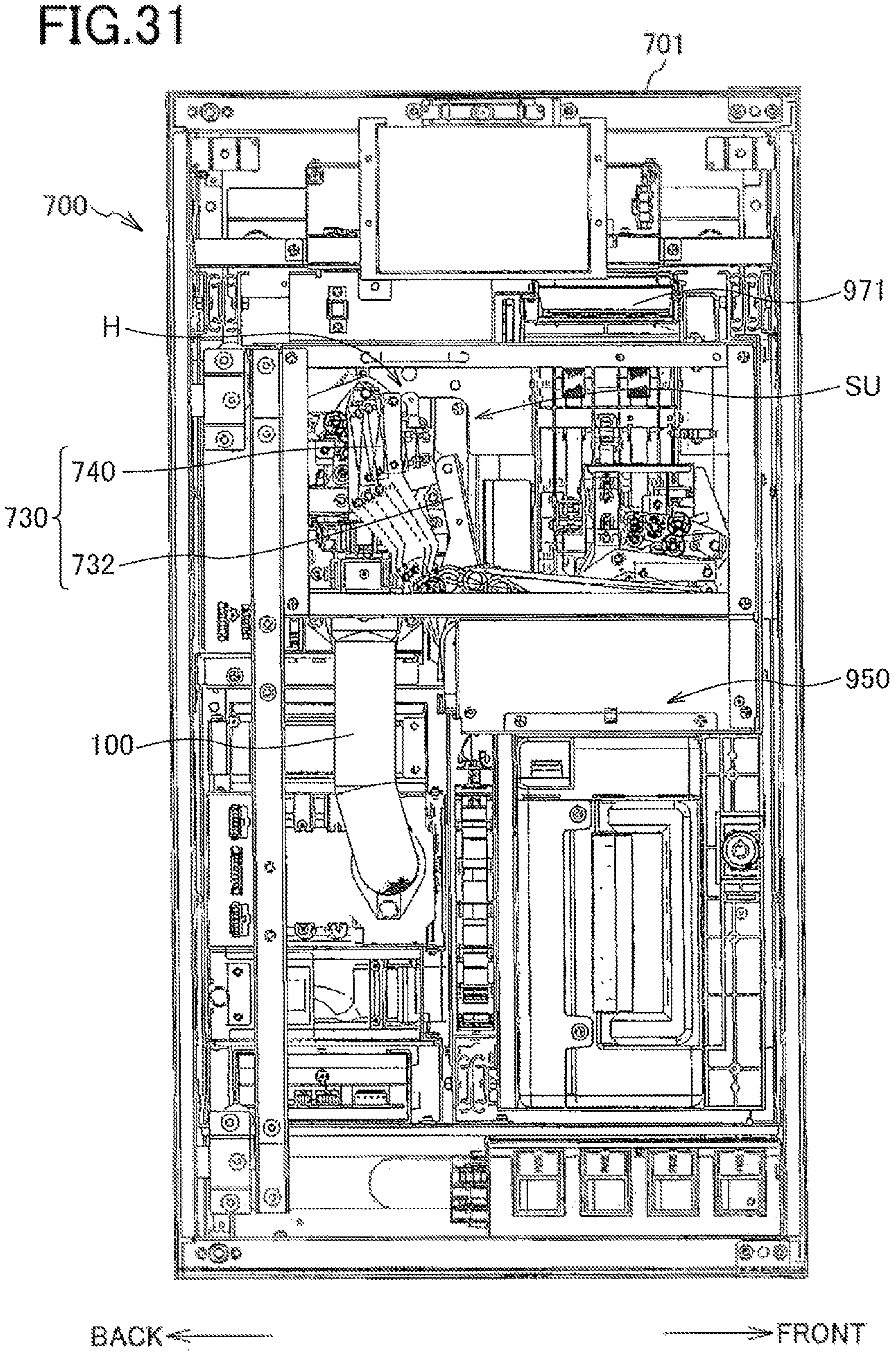
FIG. 31 is a diagram illustrating a state of the inner portion of a housing of the cashbox where the door is opened.

FIG. 27 is a front perspective view of the cashbox unit to which a portion of the transport route is assembled, FIG. 28 is a back perspective view of the cashbox unit, FIG. 29 is a perspective view of the cashbox unit where a door is opened to illustrate the internal state, FIG. 30 is a front vertical sectional view of the cashbox, and FIG. 31 is a diagram illustrating a state of the inner portion of the housing of the cashbox where the door is opened.

Figure 32:
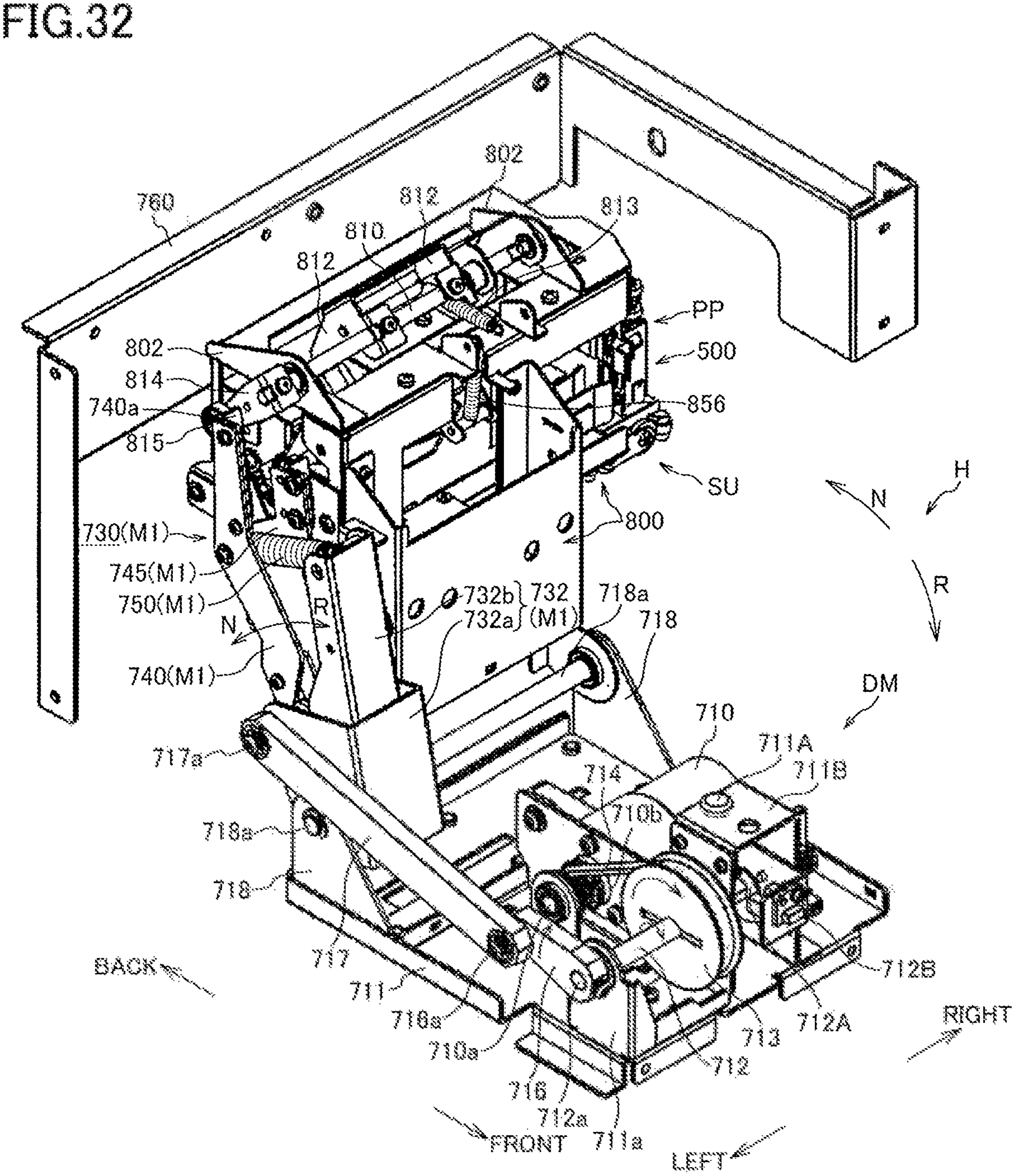
FIG. 32 is a front perspective view illustrating an upper limit position (an upright state) of a stacker unit in a direction switching and transferring device H (a swivel stacker device) according to one embodiment of the present invention.
Figure 33:
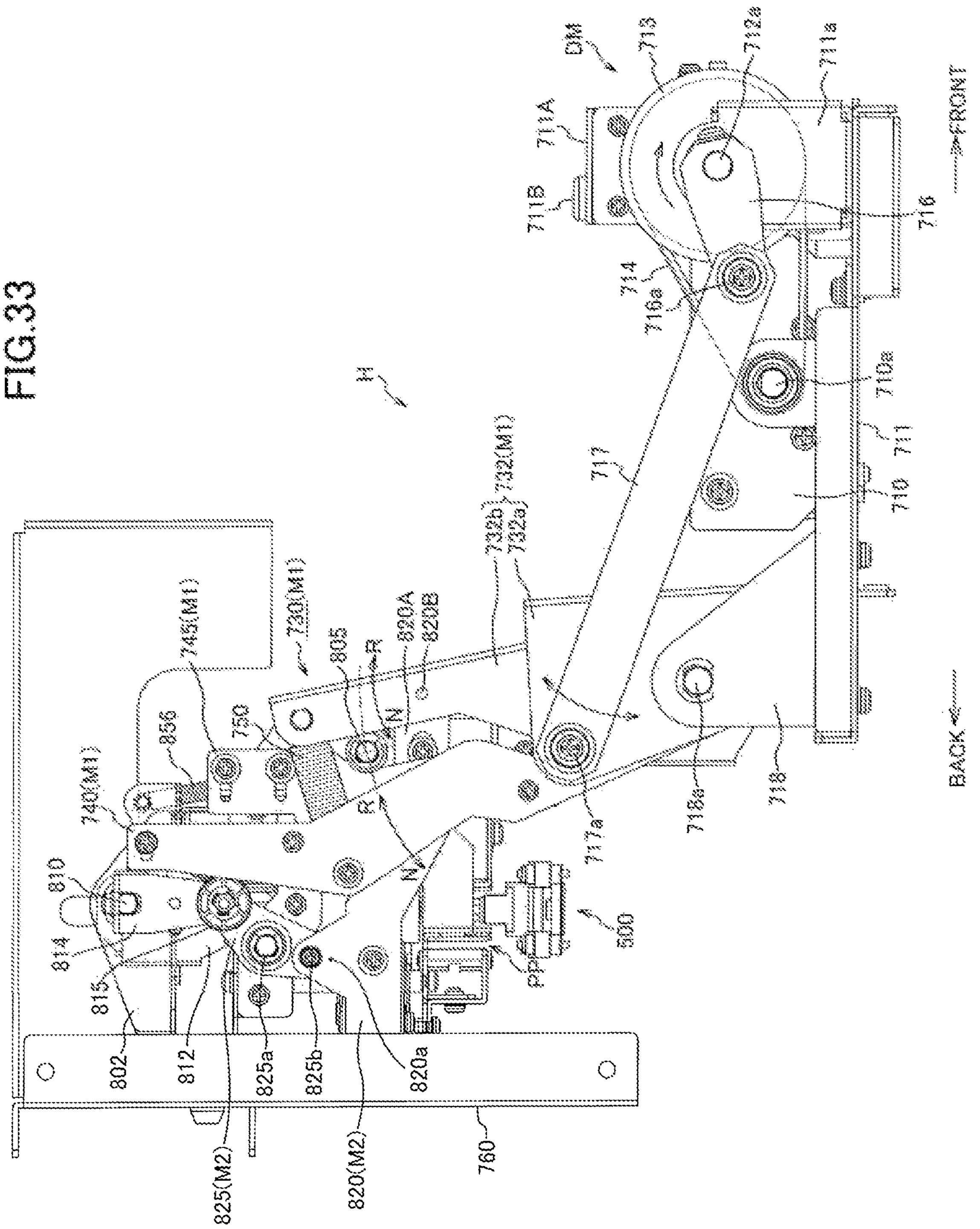
FIG. 33 is a left side view illustrating a state of the direction switching and transferring device H when the stacker unit is at the upper limit position.
Figure 34:
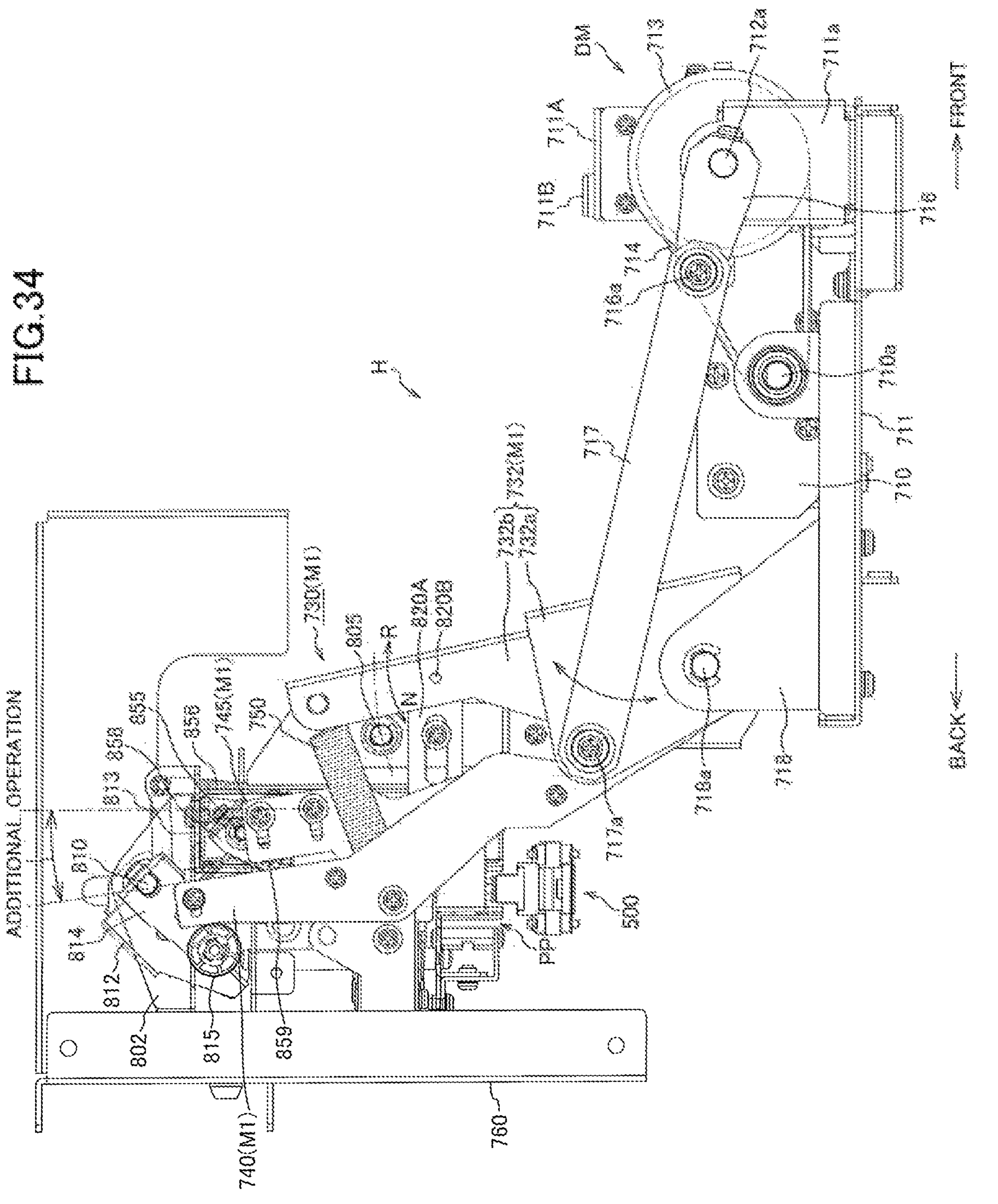
FIG. 34 is a left side view illustrating a state in which an operating mechanism reaches an additionally operated position when the stacker unit is at the upper limit position.
Figure 35A:
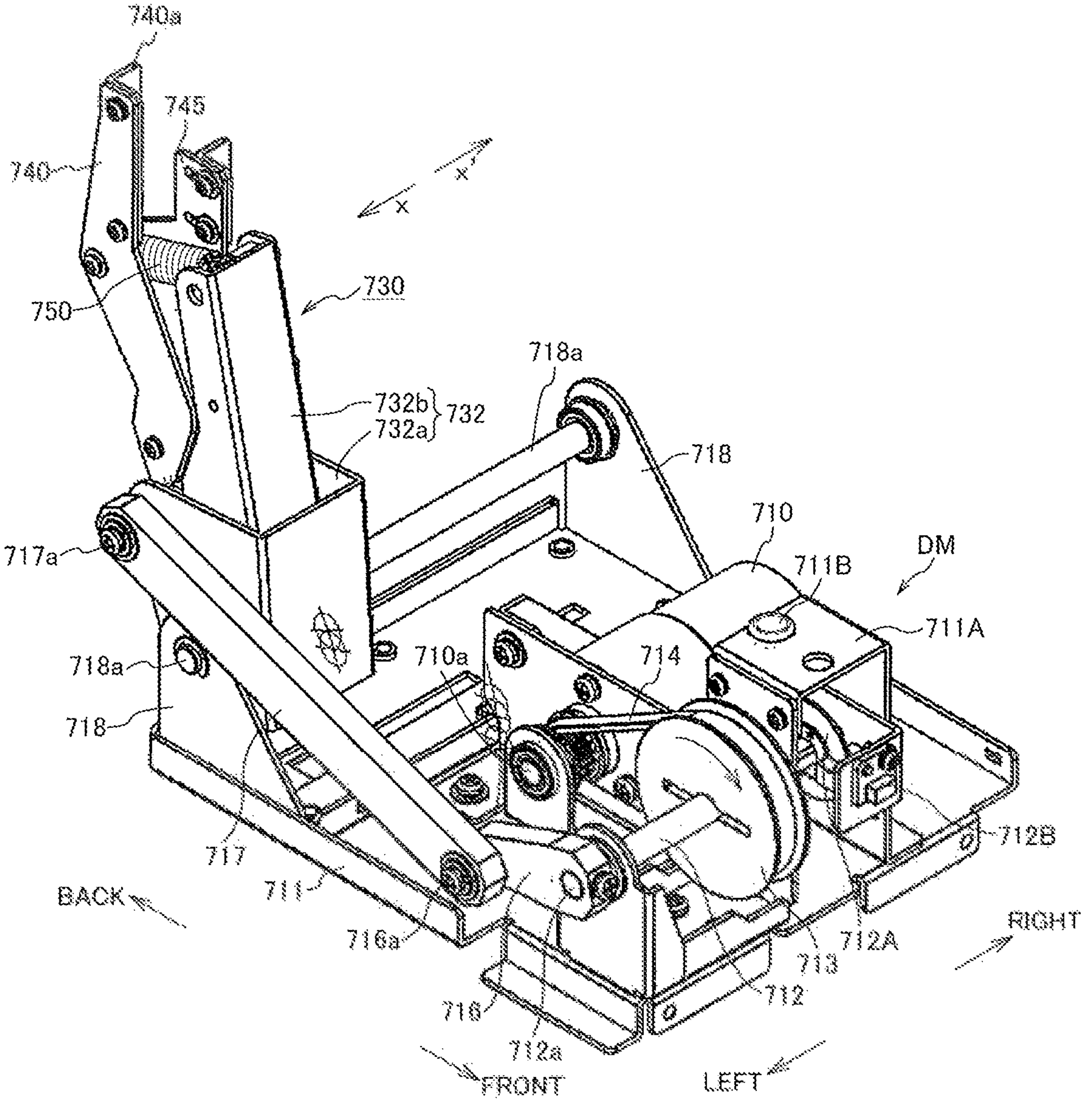
FIG. 35(*a*) is a perspective view of relevant parts of the direction switching and transferring device H in the state illustrated in FIG. 33, FIG. 35(*b*) is a relevant part perspective view illustrating an operating lever and a bearing that presses an operation piece, and FIG. 35(*c*) is an explanatory diagram illustrating a location relation between an actuated part (a bearing) provided on a stacker base and peripheral members.
Figure 35B:
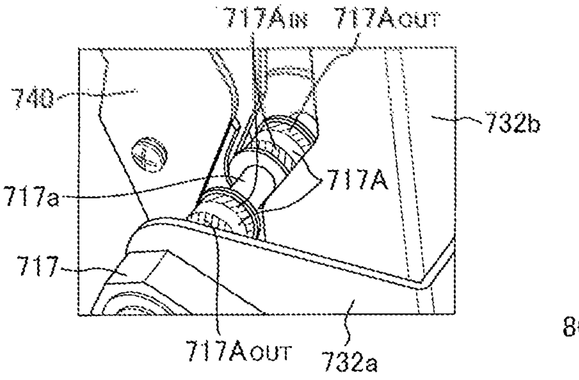
Figure 35C:
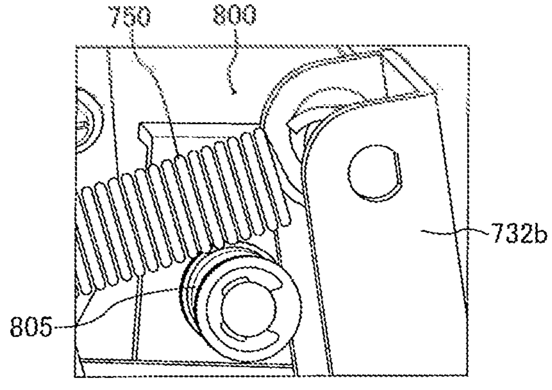

FIG. 32 is a front perspective view illustrating an upper limit position (an upright state) of a stacker unit in the direction switching and transferring device H (the swivel stacker device) according to one embodiment of the present invention, FIG. 33 is a left side view illustrating a state of the direction switching and transferring device H when the stacker unit is at the upper limit position, FIG. 34 is a left side view illustrating a state in which an operating mechanism reaches an additionally operated position when the stacker unit is at the upper limit position, FIG. 35(*a*) is a perspective view of relevant parts of the direction switching and transferring device H in the state illustrated in FIG. 33, FIG. 35(*b*) is a relevant part perspective view illustrating an operating lever and a bearing that presses an operation piece, and FIG. 35(*c*) is an explanatory diagram illustrating a location relation between an actuated part (a bearing) provided on a stacker base and peripheral members.

Figure 36:
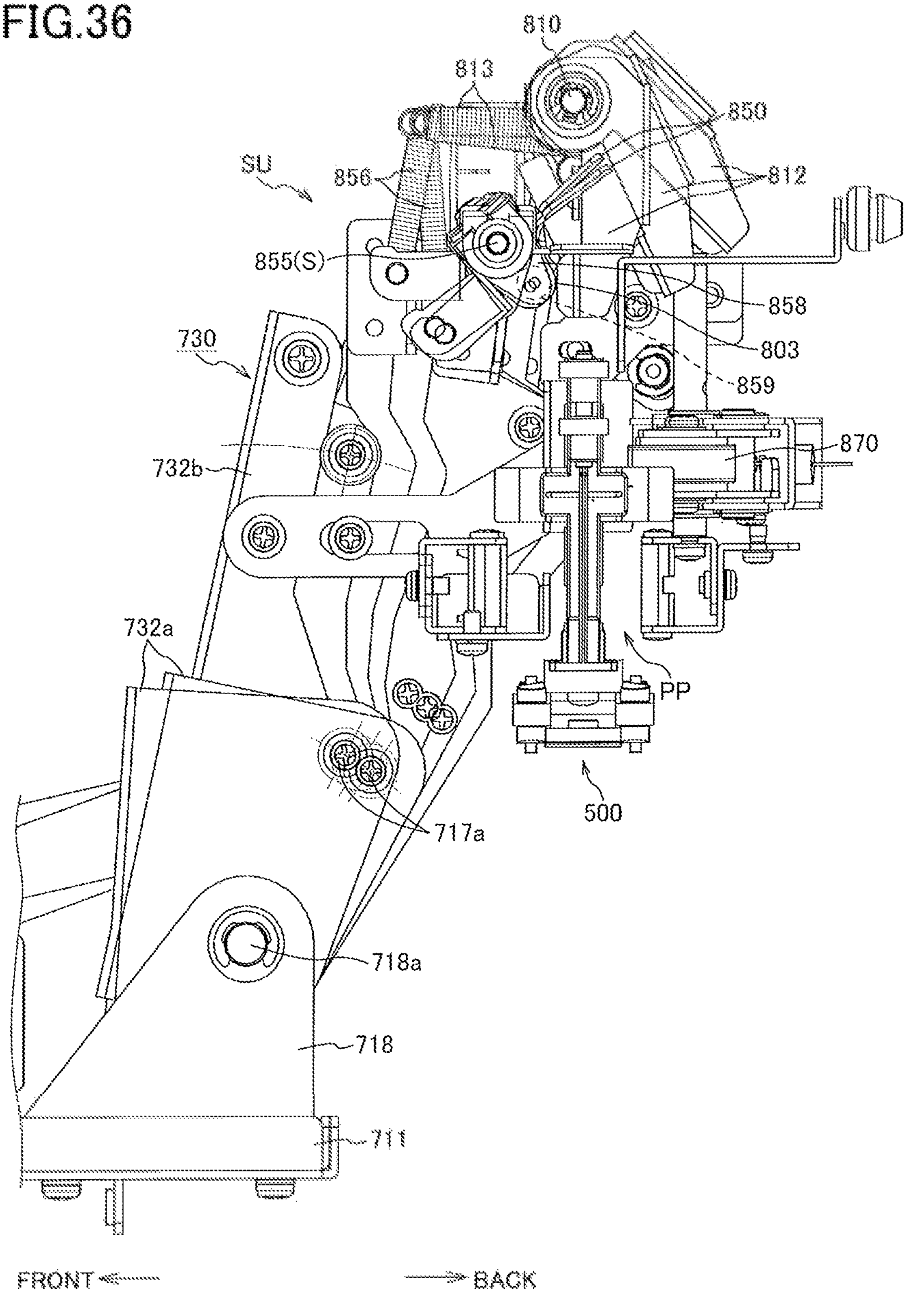
FIG. 36 is a relevant part configuration explanatory diagram illustrating configurations and operations of clamping means and a first clamping-means actuating mechanism.
Figure 37:
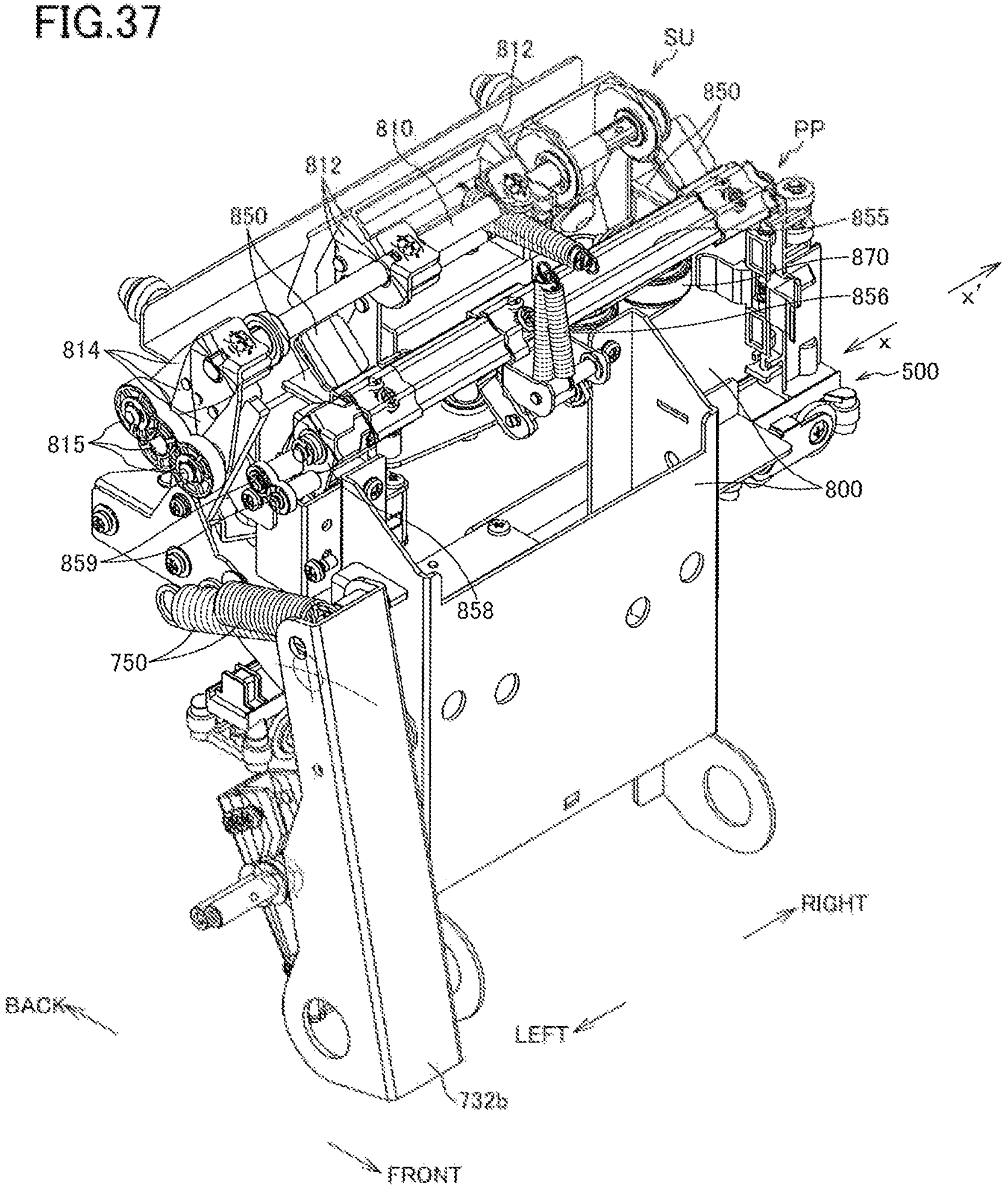
FIG. 37 is a front relevant part perspective view illustrating the configurations and the operations of the clamping means and the first clamping-means actuating mechanism.

FIG. 36 is a relevant part configuration explanatory diagram illustrating configurations and operations of clamping means (a clamping member) and a first clamping-means actuating mechanism M1, and FIG. 37 is a front relevant part perspective view illustrating the configurations and the operations of the clamping means and the first clamping-means actuating mechanism.

Figure 38:
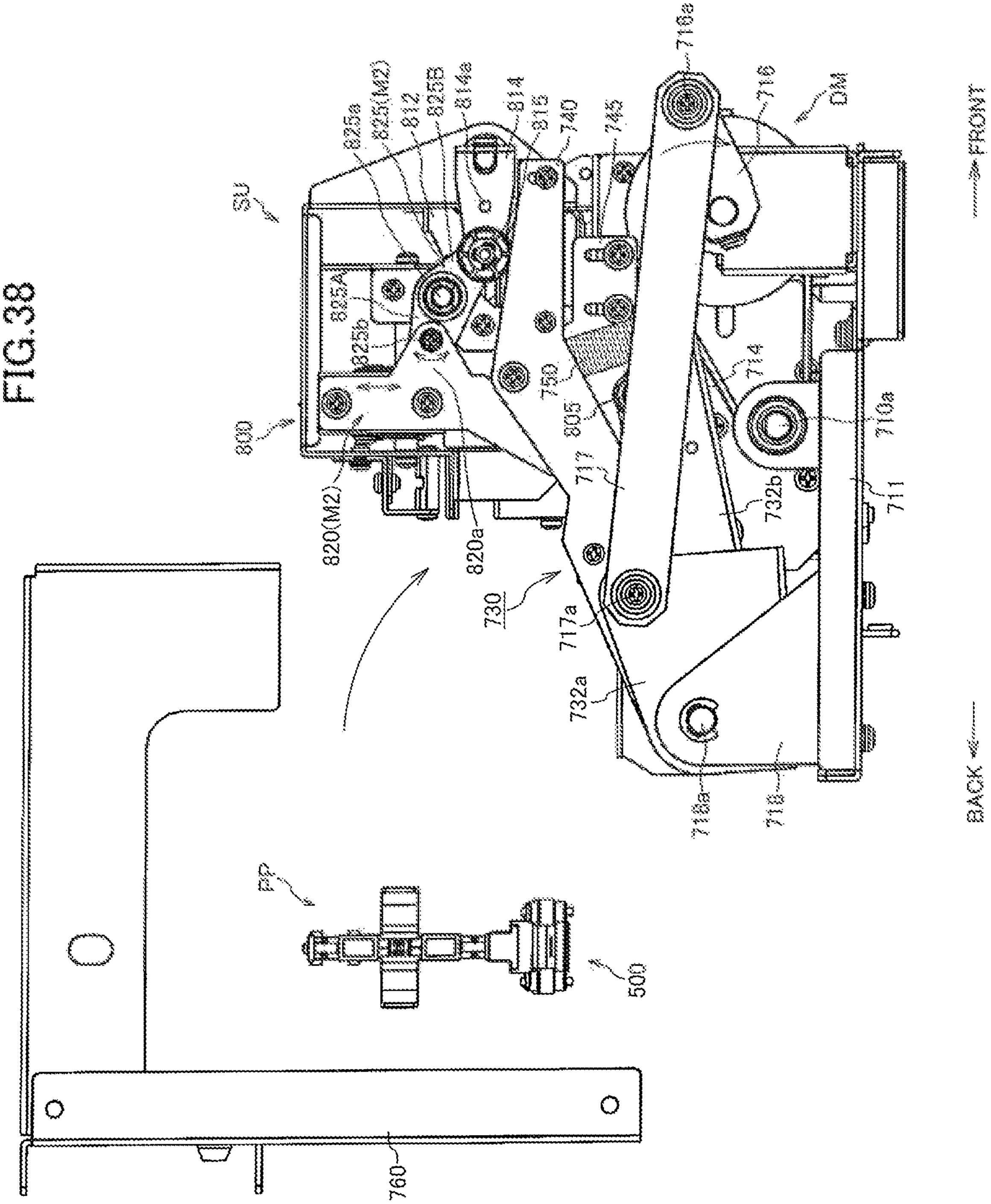
FIG. 38 is a front perspective view illustrating a lower limit position of the stacker unit in the direction switching and transferring device H (the swivel stacker device) according to one embodiment of the present invention.
Figure 39:
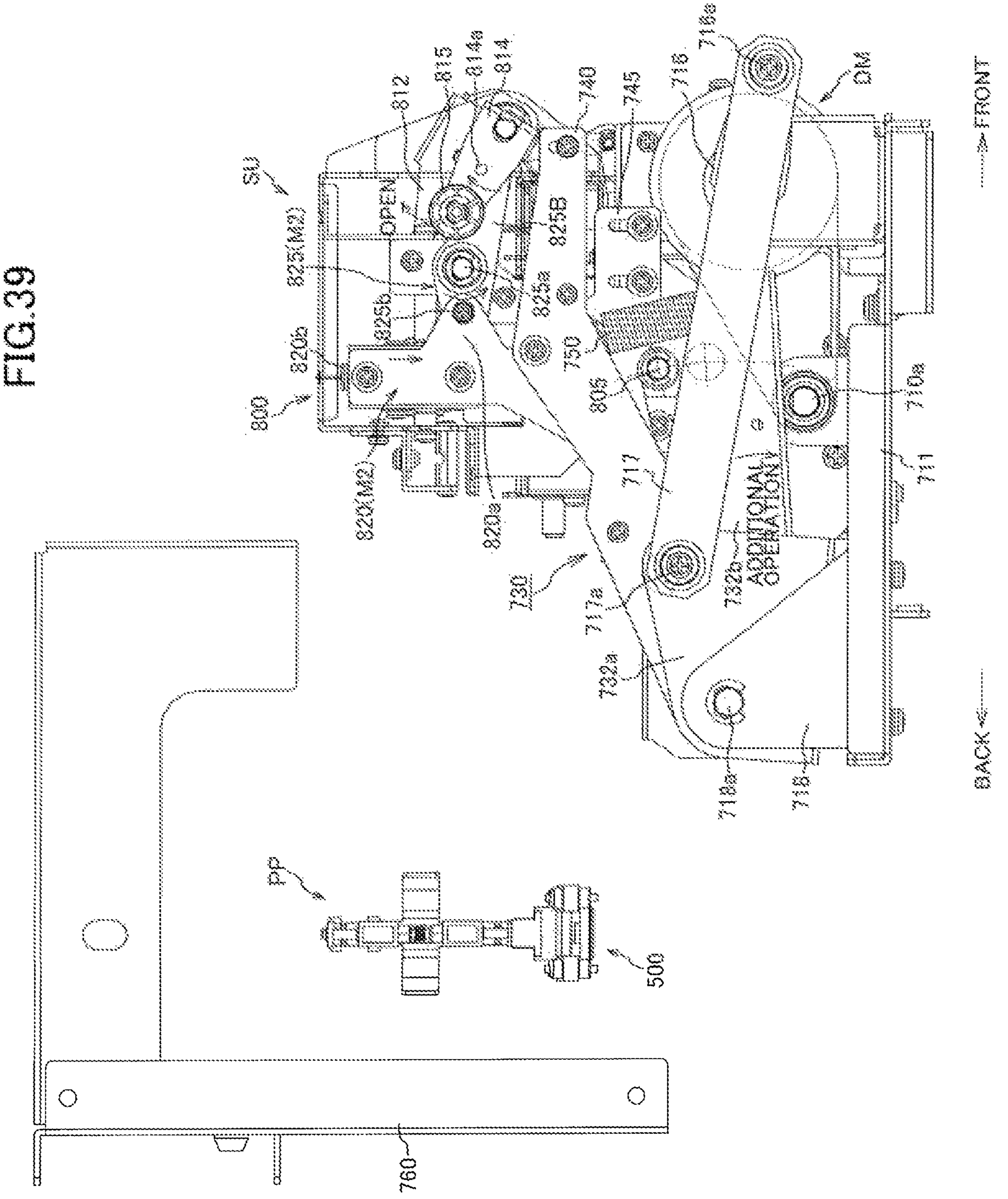
FIG. 39 is a left side view illustrating a state in which the operating mechanism reaches an additionally operated position when the stacker unit is at the lower limit position.
Figure 40:
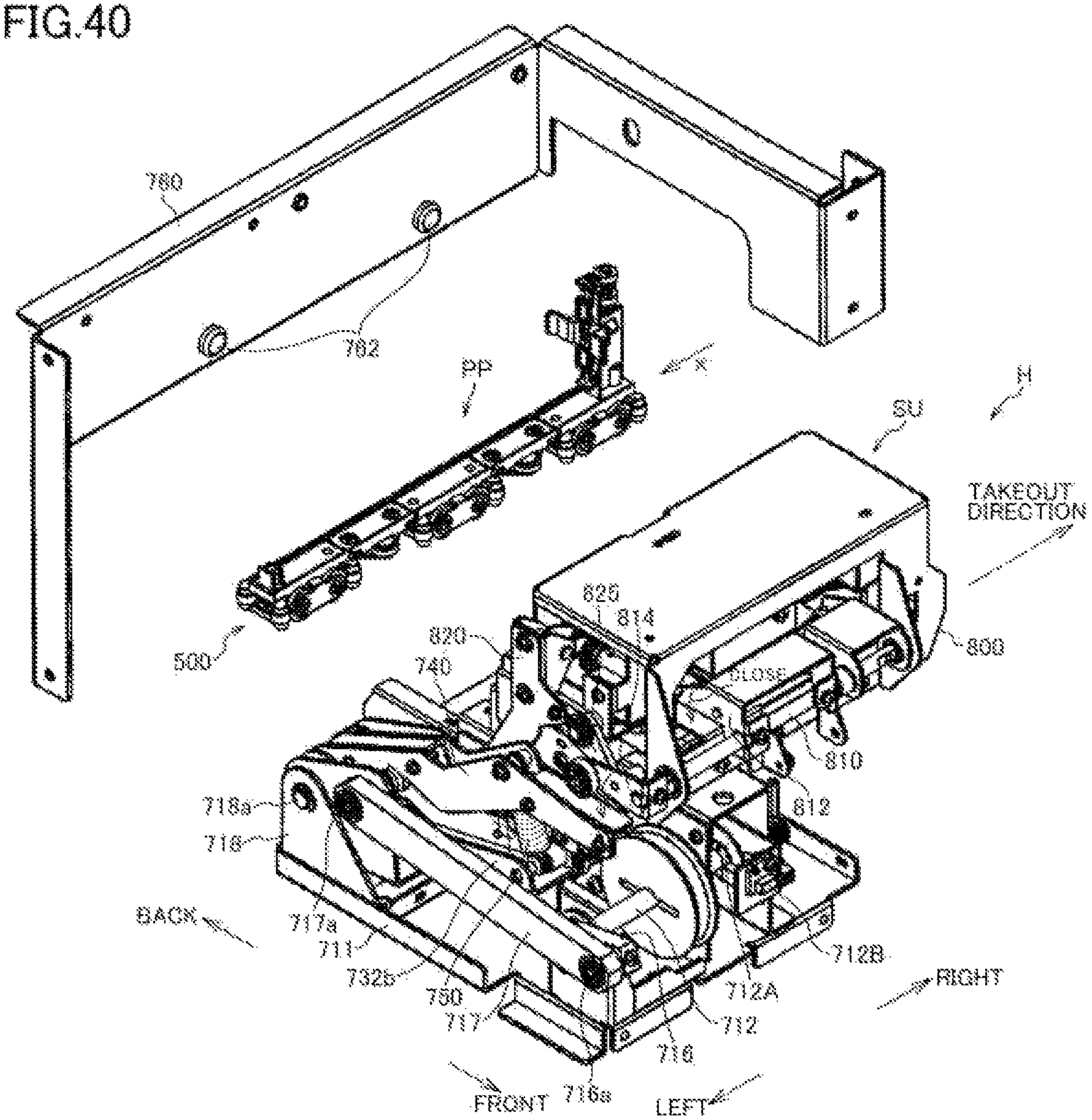
FIG. 40 is a perspective view of the direction switching and transferring device H in the state illustrated in FIG. 38.

FIG. 38 is a front perspective view illustrating a lower limit position of the stacker unit in the direction switching and transferring device H (the swivel stacker device) according to one embodiment of the present invention, FIG. 39 is a left side view illustrating a state in which the operating mechanism reaches an additionally operated position when the stacker unit is at the lower limit position, and FIG. 40 is a perspective view of the direction switching and transferring device H in the state illustrated in FIG. 38.

In each of the drawings, arrows x and x' both indicate the movement direction of the transport body through the transport route (the transport direction of banknotes), where the arrow x indicates an outward path toward the cashbox unit and the arrow x' indicates a return path away from the cashbox unit.

In the following explanations, the drawings and the explanations related to the banknote transport system 10 according to the first invention and the second invention are also referred to, and like parts are denoted by like reference signs.

<Cashbox Unit>

The banknote direction switching and transferring device H (the swivel stacker device) according to the third invention is included in the cashbox unit 700 in the banknote transport system 10 explained in the first and second inventions.

The banknote transport system 10 schematically includes the banknote transport device C, the receiving units 600, the cashbox unit 700, and the control means (the management unit) 1000 that controls these components.

As illustrated in FIGS. 29 to 31, the cashbox unit 700 includes the direction switching and transferring device H that is arranged in the inner part of a housing 701 (a housing body 701*a* and a door 701*b*), a cashbox (a security box) 950, a cashbox control board (a security box control board) 952 that controls various control targets such as a processing device 970 described later, and other constituent elements, housed therein, and enables the cashbox 950 to be exposed and be pulled out to the front side to be detached from the housing 701 in a state in which the door 701*b* is opened. The cashbox 950 is housed in a space immediately below the direction switching and transferring device H in an attitude parallel to the direction switching and transferring device H. Banknotes retained in the upright state on the transport body 500 and transported in the direction x toward the cashbox unit along the banknote transport device C, that is, the banknote transport route (400 and 401) stop at a banknote extraction position PP in the cashbox unit. After being stopped, the banknotes are retained by the clamping means of the stacker unit SU constituting the direction switching and transferring device H, are transferred onto a takeout member 960 for the cashbox while the attitude of the banknotes is switched by about 90 degrees into a lateral direction (the horizontal direction) by a swivel operation of the stacker unit SU, and are housed in the cashbox by the takeout member. The banknotes are loaded in the cashbox 950 in a state being stacked in the right-left direction in FIG. 30 (a direction parallel to the transport direction x of the banknote transport route) with an attitude in which the long sides thereof face in the upper-lower direction.

Since the cashbox 950 is housed in the space immediately below the direction switching and transferring device H and in the attitude parallel to the direction switching and transferring device H, the length of the cashbox unit in the right-left direction (the length in the banknote transport directions x and x') and the length thereof in the front-back direction can be shortened and the capacity of the cashbox can be increased to enlarge the amount of stored banknotes to a maximum value. Furthermore, opportunities for banknotes to be exposed to human including involved persons in the process of transport of the banknotes from the direction switching and transferring device H to the cashbox can be greatly decreased and fraudulent acts can therefore be prevented.

The cashbox unit 700 includes the banknote direction switching and transferring device H (a drive mechanism DM, an operating mechanism 730, the stacker unit SU, and the like) that receives and stops (a batch of) banknotes P transported in the upright state by the transport body 500 on the banknote transport route (400 and 401) at the banknote extraction position PP, then clamps the banknotes with clamping means (a clipper) 812, switches the attitude and the direction to be adapted for storage in the cashbox 950 in a state in which the clamping means clamps the banknote (batch), and loads the banknotes on the takeout member 960 for transport to the cashbox, the takeout member 960 for transport to the cashbox 950, the cashbox 950, and the like.

<Outline of Banknote Direction Switching and Transferring Device H>

The banknote direction switching and transferring device (hereinafter, referred to as "direction switching and transferring device") H according to the present embodiment includes the stacker unit SU that includes the transport body 500 moving along the banknote transport route (400 and 401) while retaining one banknote or two or more banknotes P in a stacked state in the upright state and stopped at the banknote extraction position PP on the side of the cashbox unit 700, and the clamping means (a clamping member and a clamping piece) 812 clamping the banknotes (batch) on the transport body having moved to the banknote extraction position PP and being in the stopped state, and that reciprocally rotationally moves (reciprocally swivels or swings) between the upper limit position (an initial position and a first position) and the lower limit position (a termination position and a second position) where the stacker unit has rotationally moved downward by a predetermined angle (about 90 degrees) from the upper limit position. The direction switching and transferring device further includes the operating mechanism 730 (an operating base piece 732, operating levers 740 and 745, and a tension spring 750) that reciprocally rotationally moves the stacker unit in a forward rotation direction toward the upper limit position and a reverse rotation direction toward the lower limit position, the first clamping-means actuating mechanism M1 that is actuated in conjunction with the rotationally moving operation (an additional operation) of the operating mechanism in the forward rotation direction to cause the clamping means to perform an opening operation and that is actuated in conjunction with the rotationally moving operation of the operating mechanism in the reverse rotation direction to cause the clamping means to perform a closing operation, a second clamping-means actuating mechanism M2 that is actuated by the additional operation of the operating mechanism after a time when the stacker unit SU reaches the lower limit position and stops to cause the clamping means to perform an opening operation, and the drive mechanism DM that rotationally moves the operating mechanism 730 while switching the operation direction thereof between the forward rotation direction and the reverse rotation direction.

<Drive Mechanism>

As illustrated in FIG. 32 and the like, the drive mechanism DM includes a motor (a DC motor) 710 fixed on a fixed base board (a fixed base part) 711, an output pulley (or a gear) 710*b* fixed to an output shaft 710*a* of the motor, a driving shaft 712 that is arranged in parallel to the output shaft 710*a* and that is pivotally supported by a bearing member 711*a* fixed to the base board 711 to be rotatable, a driven pulley (or a sprocket) 713 that has a shaft core fixed to a base end portion of the driving shaft 712, a belt (or a chain) 714 that is wound on the output pulley and the driven pulley, a short first link 716 that has one end fixed by the other end portion (a shaft part) 712*a* of the driving shaft 712, and a long second link 717 that is provided on the other end portion of the first link and that has one end portion pivotally supported by a shaft 716*a* parallel to the driving shaft 712 to be rotatable. The driving shaft 712, the first link 716, and the second link 717 constitute a crank mechanism.

The motor 710 rotates only in one direction and shifts the stacker unit SU to an upright state (the upper limit position) illustrated in FIG. 32 and the like, and a lying state (the lower limit position) illustrated in FIG. 38 and the like through the crank mechanism and the operating mechanism 730 in the process of rotating by 360 degrees. Specifically, when the stacker unit SU is at the lower limit position illustrated in FIG. 39, the stacker unit SU can be shifted to the upper limit position illustrated in FIG. 34 by rotation of the driving shaft 712 by 180 degrees in the forward rotation direction (in a clockwise direction in FIG. 32 and the like). The stacker unit SU can be shifted to the state illustrated in FIG. 39 by rotation of the driving shaft 712 by another 180 degrees in the same direction from the state illustrated in FIG. 34.

The drive mechanism DM is driving means that actuates the operating mechanism (other mechanisms) 730 supported by another site of the base board 711, and causes the operating base piece 732 (particularly a second operating base piece 732*b*) constituting the operating mechanism to perform a reciprocating operation in an angular range of about 90 degrees between an upright position (an initial position and a position before attitude switching) illustrated in FIGS. 32 to 35 and a lying position after the attitude switching illustrated in FIGS. 38 to 40 during one rotation of the driving shaft 712 in the clockwise direction illustrated in FIGS. 32 to 35.

The motor is in the middle of driving (a state immediately before stopped) and the stacker unit is in the middle of forward rotation in the states in FIGS. 33 and 35, and the driving of the motor is stopped in the states in FIGS. 32 and 34.

The motor is in the middle of driving (a state immediately before stopped) and the stacker unit is in the middle of reverse rotation in the state in FIG. 38, and the motor is stopped in the state illustrated in FIG. 39.

When the stacker unit is at the upper limit position as illustrated in FIG. 33, the first link 716 is at an illustrated angle and the first link 716 and the second link 717 are not in a linear location relation. On the other hand, at a stage when the operating mechanism 730 is additionally operated by a predetermined angle in the forward rotation direction due to driving of the drive mechanism DM after the stacker unit stops at the upper limit position as illustrated in FIG. 34, the first link 716 and the second link 717 are in linear arrangement. The additionally operated state can be maintained by stopping the motor in this state.

When the stacker unit is at the lower limit position as illustrated in FIG. 38, the first link 716 is at an illustrated angle and is not in a linear location relation with the second link 717. However, as illustrated in FIG. 39, at a stage when the operating mechanism 730 is additionally operated by a predetermined angle in the reverse rotation direction due to driving of the drive mechanism DM after the stacker unit stops at the lower limit position, the first link 716 and the second link 717 are in linear arrangement. The additionally operated state can be maintained by stopping the motor in this state.

The operation of the crank mechanism, that is, the rotation angles of the links 716 and 717 can be known by the cashbox control board 952 (FIG. 52) provided in the cashbox unit through detection of a slit on a pulse plate 712A provided on the other portion of the driving shaft 712 illustrated in FIGS. 32, 40, and the like using an optical sensor 712B.

In the present embodiment, the cashbox control board 952 only checks that the crank mechanism has operated the stacker unit in the range of 90 degrees based on detection information from the pulse plate and the optical sensor, and detects an additional operation from the upper limit position and the lower limit position in a software manner using a timer. Therefore, the operations and the timings of the operating mechanism 730 and other movable components do not need to be individually checked by optical sensors.

However, if necessary, the cashbox control board 952 can similarly know the rotation angles, the positions, and the operation timings of other movable components such as the operating mechanism 730, the clamping means 812, and aligning means 850 using optical sensors.

Since the drive mechanism can be configured to have a high reduction ratio and is low in the speed, it is easy to stop or start driving the drive mechanism using a DC motor.

<Stacker Unit>

Rotation (rotational movement) directions of components constituting the stacker unit SU and the operating mechanism 730 in a case in which the stacker unit rotationally moves in a standing direction are referred to as "forward rotation direction", and rotation (rotational movement) directions of the components constituting the stacker unit SU and the operating mechanism 730 in a case in which the stacker unit in the upright state rotationally moves in a lying direction are referred to as "reverse rotation direction".

The stacker unit SU includes a stacker base 800 that is rotationally moved in the forward and reverse directions by the operating mechanism 730, and the clamping means 812, the second clamping-means actuating mechanism M2, the aligning means 850, an aligning-means actuating mechanism S, a pressurizing takeout member (pinch rollers) 870, and a pressurizing takeout-member actuating mechanism PM mounted on the stacker base, and the like. The stacker base 800 represents the whole part that is operated to swivel by the operating mechanism, and movable components are supported and retained by the stacker base.

The stacker unit SU is brought into contact with a rear wall (an upper limit stopper) 760 at the back face to be restricted not to further rotationally move in the forward rotation direction and is stopped (the upper limit position) while being brought into contact with the base board 711 and other fixing members (a rubber cushion 711B) at the front face to be restricted not to further rotationally move in the reverse rotation direction and is stopped (the lower limit position).

When at the upper limit position, the stacker unit SU forms a space being the banknote extraction position PP where the transport body 500 transported into the cashbox unit 700 through the transport routes 400 and 401 is received and stopped (FIGS. 36 and 37). The stacker unit is inhibited from further rotationally moving by a back portion that is brought into contact with the rear wall 760 (butting portions 762, FIG. 40) fixedly arranged when rotationally moving in a lifting direction (the forward rotation direction), and this limit position in the rotational movement is referred to as the "upper limit position". The stacker unit is brought into contact with a fixing member provided at an appropriate place on the base board, the rubber cushion 711B provided on the upper face of a seating 711A in the present embodiment, when rotationally moving in a lowering direction, thereby being inhibited from further rotationally moving in the lowering direction (the reverse rotation direction), and this limit position in the rotational movement is referred to as the "lower limit position".

<Operating Mechanism>

As illustrated in FIGS. 32 to 37, the operating mechanism 730 includes a first operating base piece 732*a* that is pivotally supported at an appropriate place on a lower portion by a shaft part (a base shaft part) 718*a* of bearing parts 718 being provided on the base board 711 and being located in the rear of the driving shaft 712 to be able to rotationally move, thereby rotationally moving along a plane parallel to a plane (a rotational movement trajectory) where the second link 717 rotationally moves when the stacker unit SU is at the upper limit position, that is pivotally supported at an appropriate place on an upper portion by a shaft 717*a* (parallel to the driving shaft) provided at an end of the second link 717 to be able to rotationally move, and that is U-shaped in the planar shape, a second operating base piece 732*b* that is arranged inside of the first operating base piece 732*a*, that is pivotally supported at a lower portion by the bearing part 718 to be able to rotationally move, that is relatively rotatable with respect to the first operating base piece, and that is protruded upward from the first operating base piece, the first operating lever 740 that is pivotally supported at a lower portion by the shaft part (the base shaft part) 718*a* of the bearing parts 718 to rotationally move in parallel to a rotational movement face of the operating base piece 732 (732*a* and 732*b*), and that is positioned in the rear (on a side in the forward rotation direction) of the operating base piece 732, the second operating lever 745 that is integrated with the first operating lever and that is positioned between the first operating lever and the operating base piece 732, and the tension spring 750 that is arranged between the operating base piece 732 (the second operating base piece 732*b*) and the first operating lever 740 and that biases the first operating lever (the second operating lever) and the operating base piece 732 in a direction attracting each other.

In other words, the operating mechanism 730 includes the operating base piece 732 (732*b*) that is pivotally supported at the lower portion by the base shaft part 718*a* to rotationally move, the operating levers 740 and 745 that are pivotally supported at the lower portions by the base shaft part 718*a* to rotationally move in a state being rotatable relative to the operating base piece and that are arranged on a side in the forward rotation direction of the stacker unit with respect to the operating base piece, and the tension spring 750 that is arranged between the operating base piece (the second operating base piece 732*b*) and the operating lever (the first operating lever 740) to bias these components in the direction attracting each other. A configuration in which one of the operating base piece and the operating lever is brought into contact with a protrusion (an actuated part 805) provided on a side surface of the stacker unit to press the protrusion in the forward rotation direction or the reverse rotation direction is further included. That is, a configuration in which the operating base piece (732*b*) is brought into contact with the actuated part 805 to press the actuated part in the forward rotation direction and the operating lever (740) is brought into contact with the actuated part to press the actuated part in the reverse rotation direction is included.

The stacker base 800 of the stacker unit SU is supported by the base shaft part 718*a* across the two bearing parts 718 to be able to rotationally move between the upper limit position and the lower limit position. That is, the base shaft part 718*a* is a common shaft part supporting the operating base piece 732 (732*a* and 732*b*), the first operating lever 740 (the second operating lever 745), and the stacker base 800 to be able to rotationally move.

In the following explanations, the second operating base piece 732*b* is referred to also simply as "operating base piece 732*b*".

As illustrated in FIG. 35(*b*), an appropriate number, six in the present example, of bearings as pressing actuating members 717A that press the first operating lever 740 and the second operating lever 745 in the forward rotation direction when the operating mechanism 730 operates in the same direction and that press the operating base piece 732*b* in the reverse rotation direction when the operating mechanism operates in the same direction are provided on the shaft 717*a* at a predetermined interval in the axis direction of the shaft 717*a*. In the present example, two bearings include no flange, which are not used as the pressing actuating members 717A and four bearings include a flange, which are used as the pressing actuating members. The bearings used as the pressing actuating members include two pressing actuating members 717AIN on the inner side and two pressing actuating members 717AOUT on the outer side. The two inner pressing actuating members 717AIN press the first and second operating levers 740 and 745 at the time of forward rotation and the two outer pressing actuating members 717AOUT press the operating base piece 732*b* at the time of reverse rotation.

The inner pressing actuating members 717AIN are positioned on moving routes of the first operating lever 740 and the second operating lever 745 and the outer pressing actuating members 717AOUT are positioned on moving routes of the operating base piece 732*b*, respectively. That is, the driving force of the drive mechanism DM is transmitted to the operating mechanism 730 by any of the pressing actuating members 717A pressing the first operating lever 740 and the second operating lever 745 in the forward rotation direction and pressing the operating base piece 732*b* in the reverse rotation direction.

The actuated part 805 is constituted of a bearing fixed to the stacker base 800 as illustrated in FIG. 35(*c*). When the operating mechanism 730 operates in the forward rotation direction, the operating base piece 732*b* presses the actuated part 805 in the same direction. When the operating mechanism operates in the reverse rotation direction, the first operating lever 740 presses the actuated part 805 in the same direction.

In other words, the pressing actuating member 717A and the actuated part 805 are both arranged between the operating levers 740 and 745 and the operating base piece 732*b*. That is, the shaft 717*a* attached to the first operating base piece 732*a* and the actuated part 805 are sandwiched by the second operating lever 745 and the second operating base piece 732*b* and are clamped by the tension spring 750.

This arrangement of the tension spring 750 between the second operating lever 745 and the second operating base piece brings the pressing actuating member 717A and the actuated part 805 to a state clamped by the second operating lever and the operating base piece 732*b*. During swivel of the stacker unit in the forward and reverse rotation directions between the upper limit position and the lower limit position, the second operating lever 745 and the operating base piece 732*b* operate in a state clamping the pressing actuating member 717A and the actuated part 805.

While the motor is being driven and the stacker unit SU has reached the upper limit position in the state in FIG. 33, the operating mechanism 730 continues to operate until it is brought to the state illustrated in FIG. 34. Specifically, when the driving shaft 712*a* further rotates by a predetermined angle in the clockwise direction in the state in FIG. 33 and stops, the state shifts to that in FIG. 34 and the links 716 and 717 have a linear location relation. With rotation of the motor (the driving shaft 712*a*) by the predetermined angle from the state in FIG. 33 and stop as described above, the pressing actuating member 717A further pushes the first operating lever 740 (the second operating lever 745) by the predetermined angle in the forward rotation direction. The first operating lever 740 has already reached the additionally operated position illustrated in FIG. 34 due to driving of the drive mechanism DM at that time. However, the second operating base piece 732*b* cannot move in the forward rotation direction beyond the position in FIG. 33 (the upper limit position of the operating base piece) by the presence of the actuated part 805 integrated with the stacker unit. Accordingly, the tension spring 705 is biased (spread) in a spreading direction by an operation of the first operating lever to be separated from the operating base piece 732*b*, so that the operating base piece 732*b* that is in the state not moving any more in the forward rotation direction due to the presence of the actuated part 805 is pulled toward the first operating lever. The stacker unit SU pressed in the forward rotation direction by the operating base piece 732*b* through the actuated part 805 is also similarly pulled toward the first operating lever 740 at that time. However, the stacker unit is held by the rear wall 760 to keep the upper limit position (a vertical position). By stopping the motor in this state, the stacker unit SU can stably keep the upper limit position in the state elastically pressed against the rear wall 760 due to a tensile force of the tension spring 750 without wobbles.

While the tension of the tension spring 750 is applied on the actuated part 805 through the second operating base piece 732*b* in the state in FIG. 33, the value of the tension is small. That is, in the state in FIG. 33, wobbles occur and the stacker unit cannot be stabilized because the tension of the tension spring applied to the rear wall 760 is small.

As described above, in the process of the operating base piece 732*b* and the operating levers 740 and 745 (the operating mechanism 730) rotating forward in the state sandwiching the tension spring 750 therebetween, the operating base piece 732*b* first presses the actuated part 805 to cause the stacker unit to reach the upper limit position (FIG. 33). The operating lever 740 (745) still continuously operates in the forward rotation direction until reaching the additionally operated position and, first, the first operating lever 740 reaches the additionally operated position as illustrated in FIG. 34. Then, the tension of the tension spring is applied to bias the operating base piece 732*b* stopped at the upper limit position in the forward rotation direction, so that the stacker unit SU is elastically pressed against the rear wall 760.

In the process of the second operating base piece 732*b* and the operating levers 740 and 745 reversely rotating in the state sandwiching the tension spring 750 therebetween, the second operating lever 745 first presses the actuated part 805 to reversely rotate the stacker unit and stop the stacker unit at the lower limit position (FIG. 38). At this point of time, the second operating lever 745 stops rotational movement in the reverse rotation direction along with the stacker unit (the lower limit position of the second operating lever). The tension of the tension spring 750 applied to the actuated part 805 through the second operating lever 745 is small in the state in FIG. 38. That is, since the tension of the tension spring applied to the rubber cushion 711B in the state of FIG. 38 is not sufficiently large, wobbles occur and the stacker unit cannot be stabilized.

Meanwhile, the operating base piece 732*b* positioned ahead of the second operating lever 745 in the reverse rotation direction still continuously operates in the reverse rotation direction and reaches the additionally operated position as illustrated in FIG. 39. As a result of antecedent movement of the second operating base piece relatively in the reverse rotation direction with respect to the second operating lever stopped at the lower limit position, the distance therebetween increases. With separation of the second operating base piece from the second operating lever 745, the tension spring 750 is biased in the spreading direction (is spread). By stopping the motor in this state, the stacker unit SU can stably maintain the lower limit position in a state elastically pressed against the rubber cushion 711B with the tensile force of the tension spring 750.

That is, in the state in FIG. 38, the motor is driven, the stacker unit SU has reached the lower limit position, and the second operating lever is also at the lower limit position where it cannot reversely rotate any more, while the second operating base piece 732*b* still continues to operate until reaching the additionally operated position in FIG. 39. Specifically, when the driving shaft 712*a* further rotates by the predetermined angle in the clockwise direction in the state in FIG. 38 and stops, the links 716 and 717 have a linear location relation as illustrated in FIG. 39. By rotating the motor (the driving shaft 712*a*) by the predetermined angle and stopping the motor in this way, the pressing actuating member 717A further pushes the operating base piece 732*b* by the predetermined angle in the reverse rotation direction. At the point of time illustrated in FIG. 39, the operating base piece 732*b* has already reached the additionally operated position due to driving of the drive mechanism DM and biases the tension spring 750 having one end fixed to the second operating lever in the spreading direction. Accordingly, the second operating lever in the stopped state is pulled toward the operating base piece 732*b*. Although the stacker unit SU pressed by the second operating lever in the reverse rotation direction is also similarly pulled toward the operating base piece 732*b* at that time, the stacker unit is held by the rubber cushion 711B and keeps the lower limit position (the horizontal position). By stopping the motor in this state, the stacker unit SU can stably maintain the lower limit position in the state pressed against the rubber cushion 711B with the tensile force of the tension spring 750.

While being able to relatively rotate with respect to the operating base piece 732 (732*a* and 732*b*), the first and second operating levers 740 and 745 are coupled by the tension spring 750 and are biased in a direction approaching each other. Accordingly, the first and second operating levers 740 and 745 substantially integrally move during a period in which the stacker unit forward and reversely rotates between the upper limit position and the lower limit position. However, since the first and second operating levers 740 and 745 move in the forward rotation direction by a predetermined angle (for example, 8 degrees) also after the stacker unit (and the operating base piece 732*b*) has reached the upper limit position at the time of forward rotation, the operating levers move to the additionally operated position. The operating base piece 732*b* is pulled toward the operating levers with the tensile force applied by the tension spring 750 after the first and second operating levers 740 and 745 have reached the additionally operated position, whereby the stacker unit can be stably maintained at the upper limit position.

The second operating base piece 732*b* reversely moves by a predetermined angle (for example, 8 degrees) to move to the additionally operated position also after the stacker unit (and the operating levers) has reached the lower limit position. The operating levers are pulled toward the second operating base piece with the tensile force applied by the tension spring after the second operating base piece has reached the additionally operated position, whereby the stacker unit can be stably maintained at the lower limit position.

The actuated part (actuated protrusion) 805 is provided in a protruded manner on the side surface of the stacker base positioned between the second operating lever 745 and the operating base piece 732 (the second operating base piece 732*b*) and the actuated part 805 interferes with the moving routes of the second operating lever 745 and the operating base piece 732*b*. Accordingly, the actuated part 805 is pressed by the operating base piece 732*b* as illustrated in FIGS. 33 and 34 in an angular range where the second operating lever 745 and the operating base piece 732*b* are rotated forward by the drive mechanism DM. Therefore, the stacker unit rotates forward. Conversely, when the second operating lever 745 and the operating base piece 732*b* rotate reversely, the actuated part 805 is pressed by the first operating lever 740 as illustrated in FIGS. 38 and 39. Accordingly, the stacker unit rotates reversely.

In the present invention, the drive mechanism DM rotationally moves the stacker unit SU through the operating mechanism 730 by about 90 degrees between the upper limit position illustrated in FIG. 33 and the lower limit position illustrated in FIG. 38 on the base shaft part 718*a*. Meanwhile, the operating levers 740 and 745 and the operating base piece 732 constituting the operating mechanism are a configuration that rotationally moves independently of the stacker unit. Therefore, the operating levers can further rotationally move by a desired angle (8 degrees in the present example) in the forward rotation direction independently of the stacker unit (FIG. 34) even after the stacker unit is stopped at the upper limit position as in FIG. 33. Similarly, the operating base piece can further rotationally move by a desired angle (8 degrees in the present example) in the reverse rotation direction independently of the stacker unit (FIG. 39) even after the stacker unit is stopped at the lower limit position as in FIG. 38.

That is, the stacker unit SU having the clamping means 812 mounted thereon is brought into contact with the rear wall 760 fixedly arranged in the rear side when rotating forward from the lower limit position to the upper limit position, thereby being prevented from rotationally moving backward (in the forward rotation direction) beyond the upper limit position. However, the first and second operating levers 740 and 745 can rotationally move in the forward rotation direction (a direction away from the operating base piece 732) also after the stacker unit has reached the upper limit position. That is, also after the stacker unit has stopped at the upper limit position, the first and second operating levers 740 and 745 move in the forward rotation direction due to the drive mechanism DM to reach the additionally operated position. With this additional operation of the operating levers, the first operating lever 740 presses a clamping-means actuating lever 814 (the first clamping-means actuating mechanism M1) described later in the opening direction to open the clamping means 812. With this additional operation, the second operating lever 745 presses an aligning-means actuating lever 858 (the aligning-means actuating mechanism S) described later to open the aligning means 850.

Conversely, when the stacker unit SU rotates reversely from the upper limit position to the lower limit position, the stacker base 800 is brought into contact with the fixing member (the rubber cushion 711B) and is thereby prevented from rotationally moving in the reverse rotation direction beyond the lower limit position. However, the operating base piece 732*b* can rotationally move in the reverse rotation direction (a direction away from the operating base piece 732) also after the stacker unit has reached the lower limit position. That is, also after the stacker unit has stopped at the lower limit position, the operating base piece 732*b* moves in the reverse rotation direction due to the drive mechanism DM to reach the additionally operated position on the lower side. With this additional operation of the operating base piece 732*b*, the operating base piece 732*b* actuates the second clamping-means actuating mechanism M2 to open the clamping means. Furthermore, the additional operation of the operating base piece 732*b* becomes a trigger for actuating the pinch-roller actuating mechanism PM.

<Clamping Means and Clamping-Means Actuating Mechanism>

Explanations of Outline

The clamping means (a movable-side clamping part) 812 out of the clamping means 812 and 803 mounted on the stacker unit SU is positioned above the banknote extraction position PP and is operated to open or close when the stacker unit is at the upper limit position illustrated in FIGS. 32 to 34. When the clamping means is opened, an entry route for the transport body and the banknotes to the banknote extraction position is opened. The clamping means clamps an upper edge portion of a long side of (a batch of) banknotes on the transport body by closing in the state in which the transport body is stopped at the banknote extraction position. The operating/closing operation of the clamping means at the time when the stacker unit is at the upper limit position is performed by the first clamping-means actuating mechanism M1.

Furthermore, the clamping means 812 is actuated to open by actuation of the second clamping-means actuating mechanism M2 and to cancel clamping of the banknote batch with the fixed-side clamping part 803 when the stacker unit SU is at the lower limit position.

The first clamping-means actuating mechanism M1 and the second clamping-means actuating mechanism M2 are collectively referred to as "clamping-means actuating mechanism M".

When the stacker unit is at the upper limit position, the operating mechanism 730 starts the reverse rotation operation centering on the base shaft part 718*a* after a time point the clamping means 812 has clamped the banknotes, and thereby rotationally moves the stacker unit to transfer the banknotes onto the takeout member 960 being at a position corresponding to the lower limit position while laterally swiveling the attitude (direction) of the banknotes having been in the upright state by the predetermined angle (substantially 90 degrees in the present embodiment) (laying the banknotes on their sides).

While the stacker unit at the upper limit position is inhibited from rotating forward beyond the upper limit position, the operating mechanism 730 (the first operating lever 740) can move to the additionally operated position in the forward rotation direction where the operating mechanism has rotationally moved by the predetermined angle in the forward rotation direction also after the stacker stops at the upper limit position, and actuates the first clamping-means actuating mechanism M1 to operate the clamping means to open when the operating mechanism (the first operating lever 740) moves from the upper limit position of the stacker unit to the additionally operated position in the forward rotation direction.

That is, the first clamping-means actuating mechanism M1 brings the clamping means 812 to the open state by being actuated by continuous forward rotation of only the operating mechanism to move to the additionally operated position after the stacker unit rotationally moved in the forward rotation direction by the forward rotation operation of the operating mechanism 730 reaches the upper limit position and stops, and brings the clamping means to the clamping (closed) state when the operating mechanism at the additionally operated position starts the reverse rotation operation.

The first clamping-means actuating mechanism M1 includes the operating mechanism 730 (the first operating lever 740, the tension spring 750, and the operating base piece 732), the clamping-means actuating lever 814, a roller 815, and the like.

While the stacker unit at the lower limit position is inhibited from reversely rotating beyond the lower limit position by being in contact with the rubber cushion 711B on the side of the lower limit position, the operating mechanism (the second operating base piece 732*b*) operates independently of the stacker unit at the lower limit position and can rotationally move by the predetermined angle in the reverse rotation direction to move to the additionally operated position on the lower side also after the stacker unit is stopped. When the stacker unit stops the reverse rotation operation at the lower limit position illustrated in FIG. 38 and the operating base piece 732*b* thereafter moves to the additionally operated position in the reverse rotation direction (FIG. 39), the second clamping-means actuating mechanism M2 is actuated to cause the clamping means to perform the opening operation.

That is, the second clamping-means actuating mechanism M2 is means for releasing clamping of banknotes by the clamping means 812 after a time point the banknotes have been transferred onto the takeout member. The second clamping-means actuating mechanism M2 includes a first releasing piece 820 that is actuated when the pressing actuating member 717A receiving a driving force from the drive mechanism DM pushes only the operating base piece 732*b* downward to move the operating base piece to the additionally operated position after a time point the stacker unit has reached the lower limit position, and a second releasing piece 825 that swings by being pressed by the first releasing piece.

After the stacker unit has reached the lower limit position and the operating base piece 732*b* has reached the additionally operated position, the operating levers 740 and 745 in the stopped state with the tensile force (spring pressure) of the tension spring 750 are elastically biased in the reverse rotation direction and are locked at the additionally operated position in cooperation with the crank mechanism (the links 716 and 717). This locking operation enables the stacker unit to be prevented from wobbling at the lower limit position. If the locking function of the tension spring 750 is not provided when the stacker unit is at the lower limit position, the operating levers wobble at the lower limit position and the stopped state of the stacker unit is therefore not stabilized. Meanwhile, by pushing the operating base piece 732*b* into the additionally operated position to spread the tension spring, the relation between the operating base piece 732*b* and the operating levers can be locked with the tensile force of the tension spring. Due to this locking operation, problems such as variation in the banknote seating position at the time of transfer of the banknote batch clamped by the clamping means onto the takeout member 960, and destabilization of the takeout operation can be resolved.

Figure 51A:
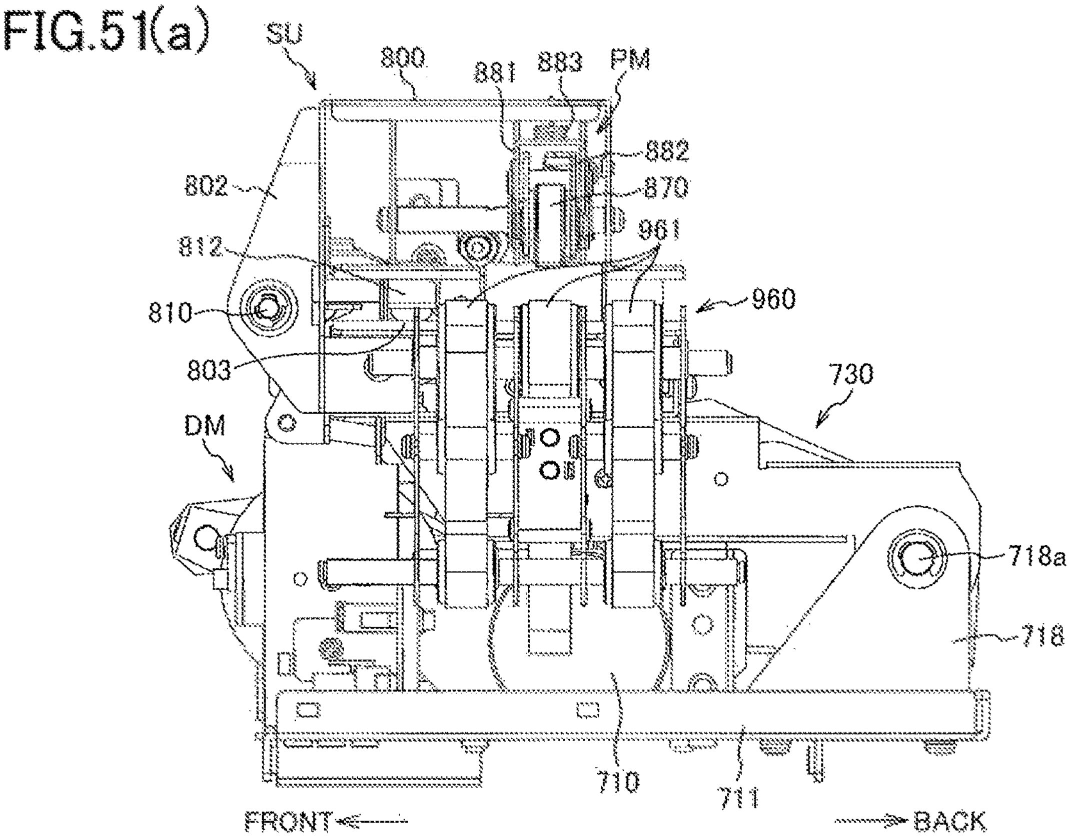
FIGS. 51(*a*) and 51(*b*) are side views illustrating a location relation between the stacker unit at the lower limit position and a takeout member.
Figure 51B:
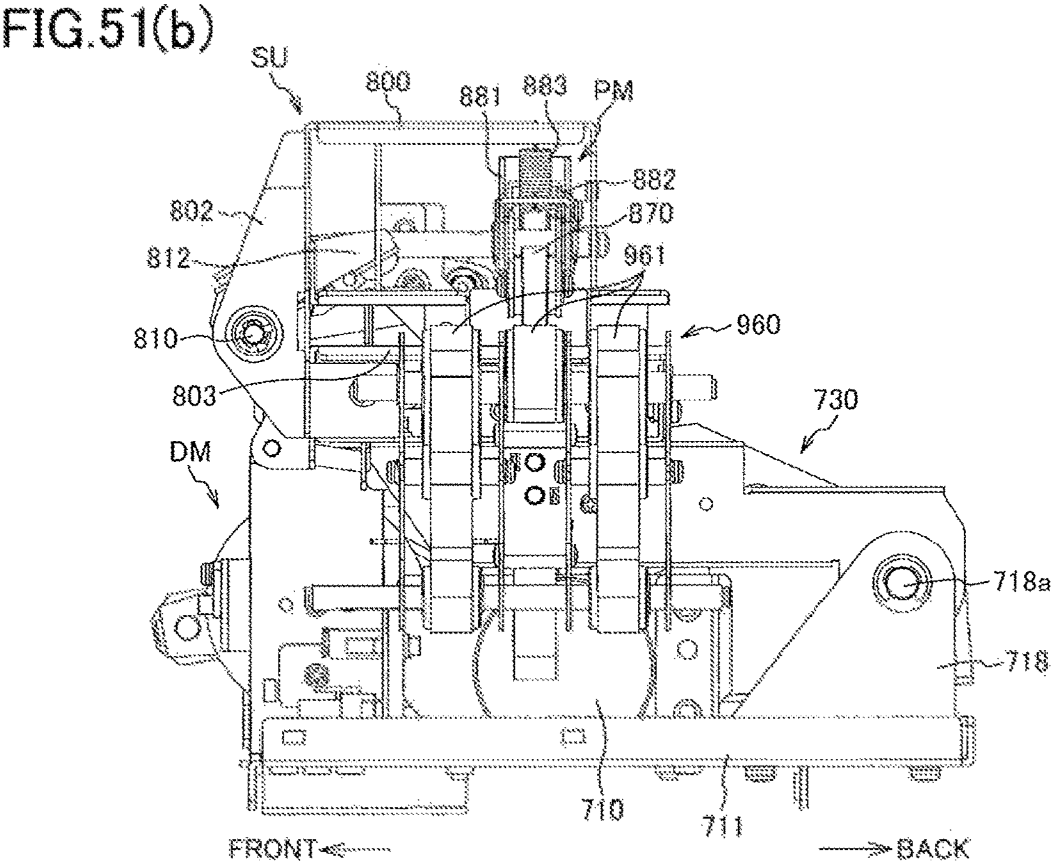

To smoothly transfer a batch of banknotes from the place between the movable-side clamping means 812 and the fixed-side clamping part 803 onto the takeout member 960 in the state in FIG. 39, it is first necessary that a central portion of the banknote batch in the width direction, which is clamped between the clamping means 812 and 803 in the state in FIG. 39 is surely transferred onto a takeout belt 961 (see FIG. 51(*a*)).

Next, the fixed-side clamping part 803 needs to be configured not to catch the banknote batch to interrupt separation of the batch when the movable-side clamping means 812 is operated to open (see FIG. 51(*b*)). For this purpose, it suffices to set the dimension to cause the height location of the fixed-side clamping part 803 in the state in FIG. 39 to be retracted sufficiently below the upper face of the takeout belt 961. With this configuration, the banknote batch and the fixed-side clamping part 803 are in an almost contactless or a slight contact state at a time point the movable-side clamping means 812 is opened.

Figure 48:
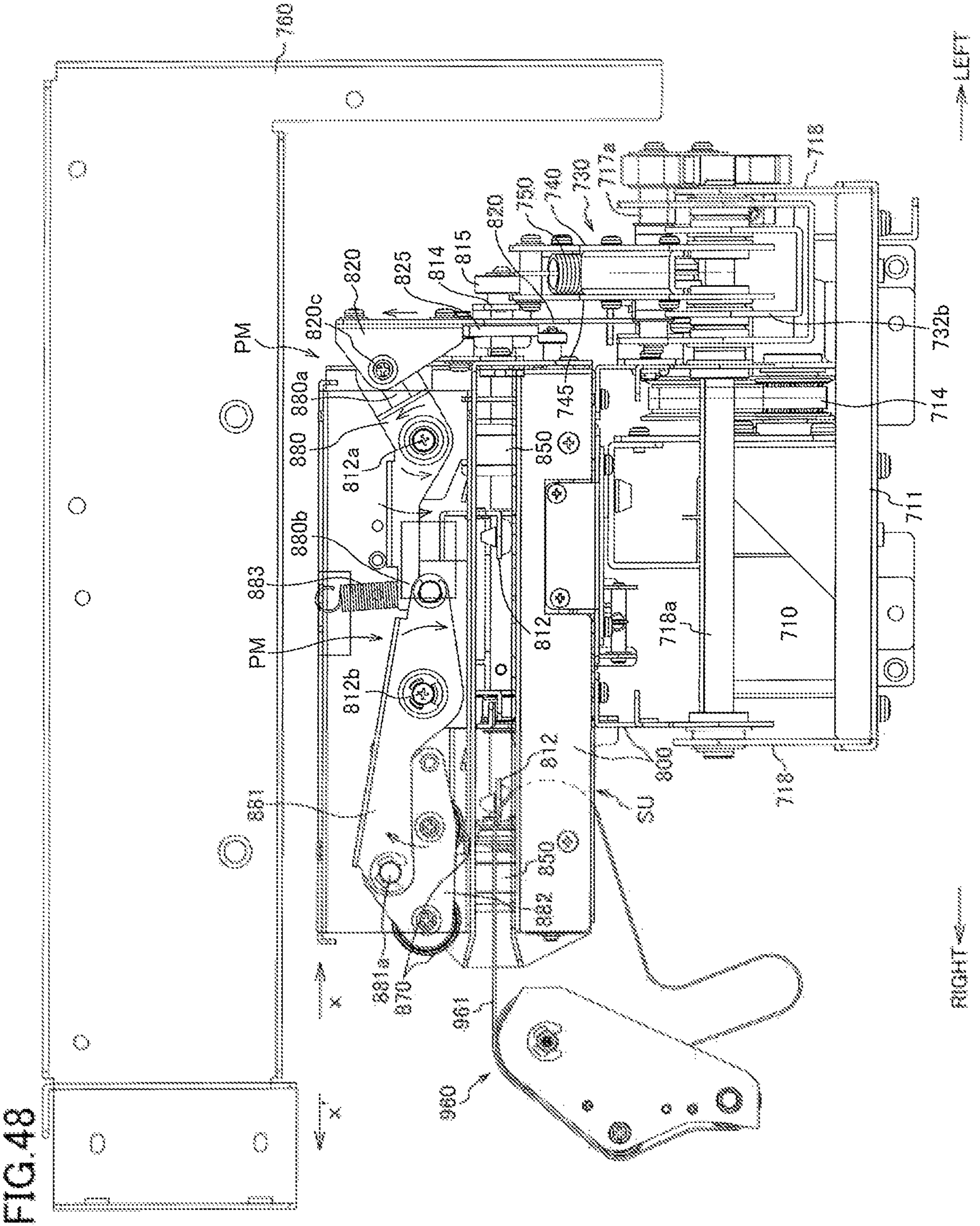
FIG. 48 is a rear view illustrating a configuration and an operation of a pressuring takeout-member actuating mechanism PM.

In the present embodiment, as illustrated in FIG. 48, the location of the takeout belt 961 on the stacker unit side (the location of a belt reversing part) is in contact by a predetermined length with a position near the head of the banknote batch having a long side clamped by the clamping means 812 and 803 in the takeout direction.

Although the operations to lock the stacker unit at the upper limit position and the lower limit position may be performed by finely controlling the motor 710 and the crank mechanism, it is difficult to practically finely control these components. Accordingly, the stacker unit is moved relatively roughly to each of the upper limit position and the lower limit position and then the stacker unit can be locked with the tensile force of the tension spring 750. Wobbling of the stacker unit at the upper limit position and the lower limit position can be prevented by this lock operation. Therefore, the operations of various movable components after the additional operation can be stabilized.

The clamping means 812 and 803, the first clamping-means actuating mechanism M1, and the second clamping-means actuating mechanism M2 are explained in more detail next.

First Clamping-Means Actuating Mechanism M1

The first clamping-means actuating mechanism M1 is explained below.

Figure 41A:
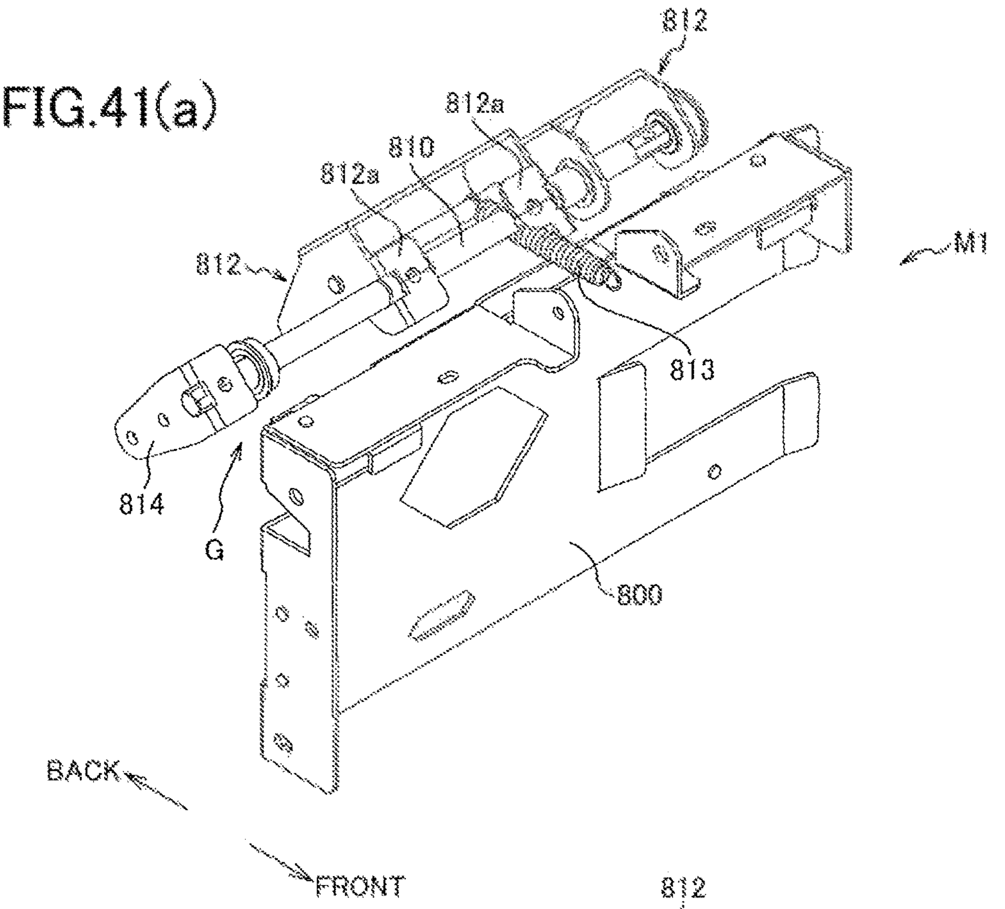
FIGS. 41(*a*) and 41(*b*) are perspective views illustrating a configuration and an operation of a part of the first clamping-means actuating mechanism M1.
Figure 41B:
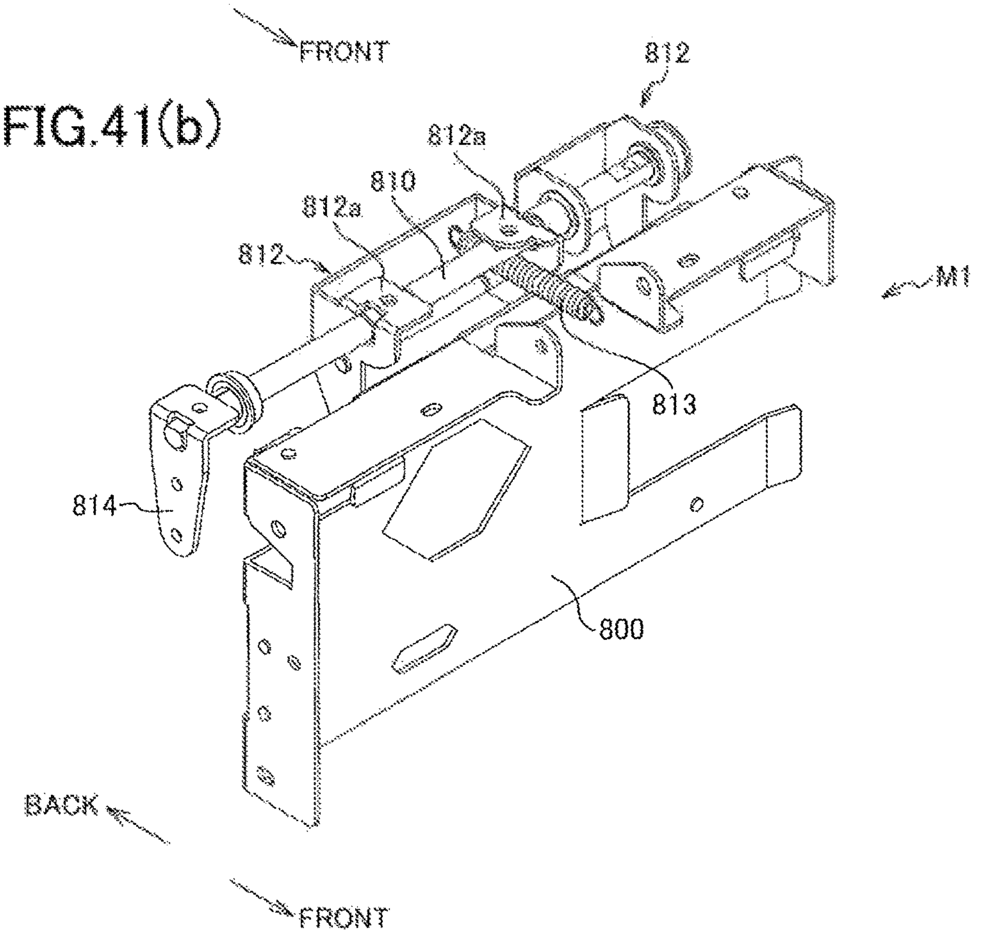
Figure 42B:
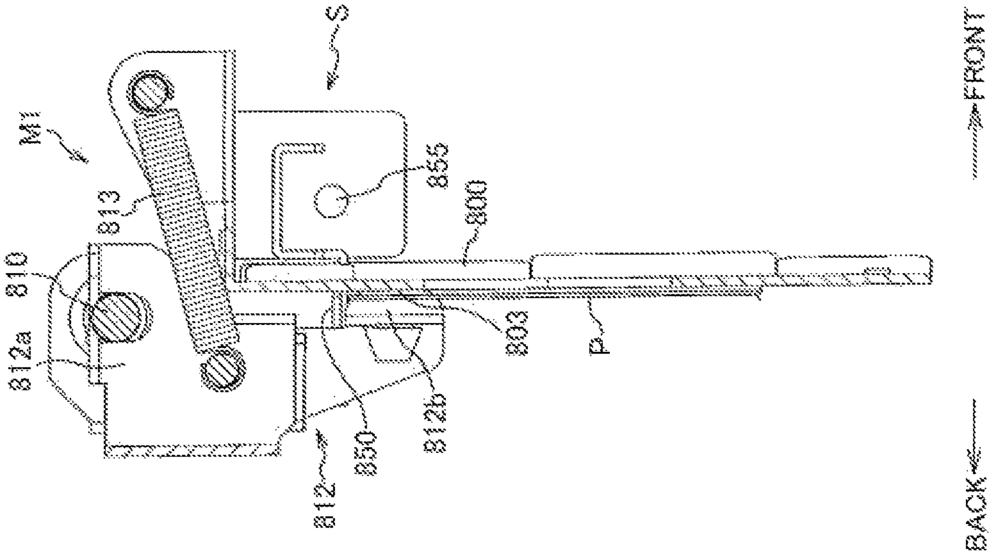
FIGS. 42(*a*) and 42(*b*) are explanatory diagrams illustrating the configuration and the operation of a part of the first clamping-means actuating mechanism M1.
Figure 42A:
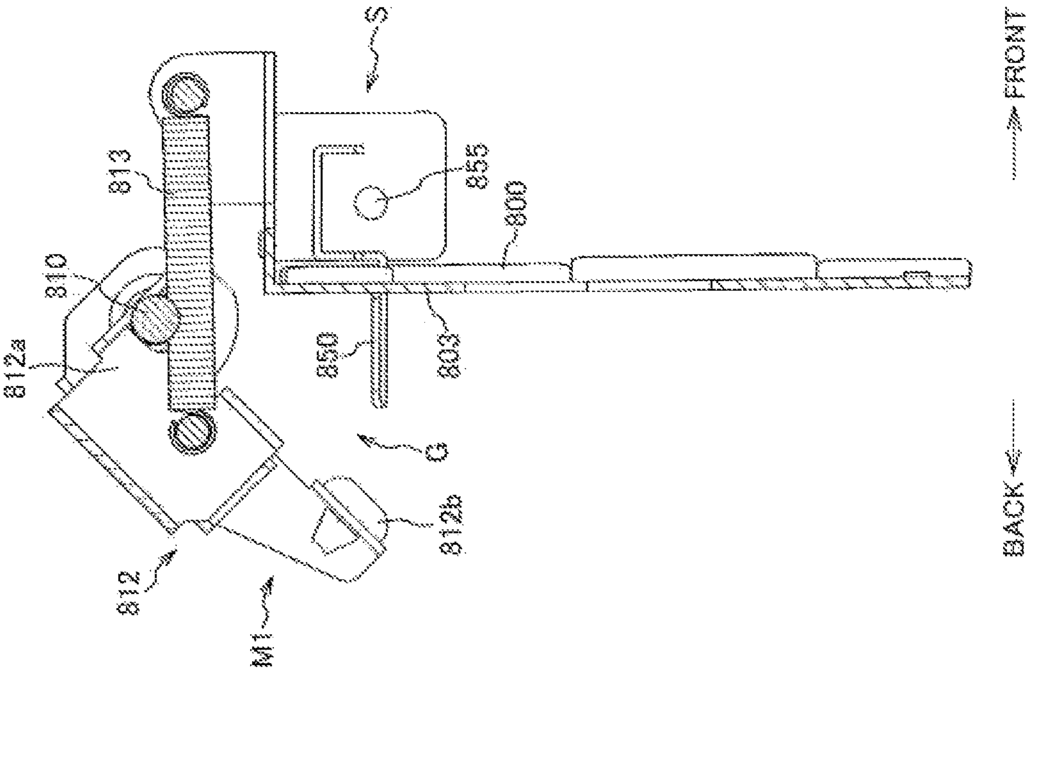

FIGS. 41(*a*) and 41(*b*) are perspective views illustrating a configuration and an operation of a part of the first clamping-means actuating mechanism M1, and FIGS. 42(*a*) and 42(*b*) are explanatory diagrams illustrating the configuration and the operation of a part of the first clamping-means actuating mechanism M1.

The configuration and the operation of a part (the clamping means 812, the shaft part 810, and a clamping-means biasing member 813) of the first clamping-means actuating mechanism M1 are explained below with reference also to FIGS. 38 to 40.

Base parts 812*a* of the clamping means (the movable-side clamping part 812) are fixed to the shaft part 810 that is supported by two bearing members 802 provided on the stacker base 800, and rotate integrally with the shaft part 810 to perform the opening/closing operation. The clamping means 812 is arranged in an upper portion of the banknote extraction position PP being a space in the stacker unit. When closed, the clamping means 812 clamps an upper edge portion (the upper long side) of banknotes retained in the upright state on the transport body 500 stopped inside the banknote extraction position at a distal end portion 812*b* with the fixed-side clamping part (clamping means) 803 arranged on the stacker base 800, as illustrated in FIGS. 36, 41, (b), and 42(*b*). When the clamping means 812 is at the clamping position, a contact part between the distal end portion 812*b* (a pad) and the fixed-side clamping part 803 are in a location relation where an appropriate place on the upper edge portion of (a batch of) banknotes P retained in the upright state on the transport body 500 can be clamped thereby.

When the clamping means 812 is opened, a gap G is formed between the clamping means 812 and the fixed-side clamping part 803. By forming this gap G, the transport body 500 and the banknote batch are enabled to enter the banknote extraction position PP.

One end of the lever 814 (the clamping-means actuating lever) is fixed to a location that is one end of the shaft part 810 being a rotational movement axis of the clamping means 812 and that is on an outer side of one of the bearing members 802, and the roller 815 having a buffering effect is pivotally supported at an end of the lever 814 to be rotatable. The roller 815 is positioned in a movement locus of a contact plate 740*a* (FIGS. 32 and 35(*a*)) provided at an end of the first operating lever 740.

Since the first operating lever 740 continues to rotationally move in the forward rotation direction with the driving force from the motor also after the stacker stops at the upper limit position, the contact plate 740*a* is brought into contact with the roller 815 and presses the roller 815 in a direction of opening the clamping means. Accordingly, the lever 814, the shaft part 810, and the clamping means 812 are rotationally moved in the opening direction against the clamping-means biasing member 813. When the stacker unit at the upper limit position thereafter starts rotating reversely toward the lower limit position and the first operating lever 740 at the additionally operated position thereby rotationally moves by the predetermined angle (8 degrees) in the reverse rotation direction, the first operating lever 740 is separated from the roller 815. Therefore, the clamping means 812 returns to the closing position due to the tensile force of the clamping-means biasing member 813.

The attitudes of the clamping means 812 and the aligning means 850 and the location relation therebetween at a time when the stacker unit is at the lower limit position and the second operating base piece 732*b* has reached the additionally operated position in the reverse rotation direction are those at a time when constituent elements such as the stacker base 800, the shaft part 810, the clamping means 812, and the aligning means 850 illustrated in FIG. 42(*b*) are collectively swiveled by 90 degrees in the clockwise direction centering on the base shaft part 718*a*.

Since the clamping means 812 is biased in the closing direction to be brought into contact with the fixed-side clamping part 803 through pressurizing by the clamping-means biasing member (a coil spring) 813, the clamping means maintains the closed position when no external force in the opening direction is applied from the first operating lever 740. When the stacker unit SU is lifted from the lower limit position to reach the upper limit position, the first operating lever does not bias the roller 815 (the lever 814) in the direction to open the clamping means (the clamping means is closed). However, at a time when the stacker unit including the clamping means is blocked from further moving by the rear wall 760 and the first operating lever reaches the additionally operated position due to driving of the motor (FIG. 34), the first operating lever rotationally moves the roller 815 (the lever 814) in the opening direction, so that the clamping means is opened.

With the configuration of the clamping means to be arranged at a position immediately above the banknote extraction position PP and to perform the opening/closing operation, entry of the transport body into the banknote extraction position is allowed when the clamping means is opened, and banknotes on the transport body can be clamped by closing the clamping means in the state in which the transport body is stopped at the banknote extraction position.

Second Clamping-Means Actuating Mechanism M2

The second clamping-means actuating mechanism M2 is explained next.

Figure 43A:
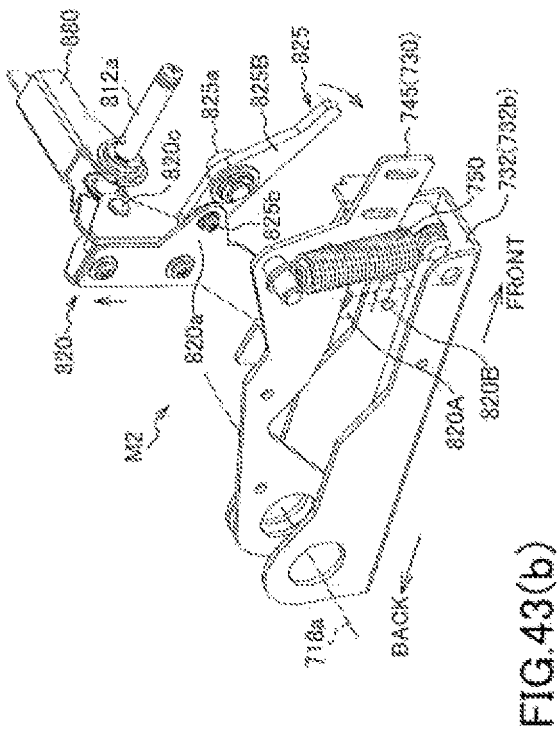
FIGS. 43(*a*), 43(*b*), and 43(*c*) are a perspective view, a side view, and a rear view illustrating a configuration and an operation of a second clamping-means actuating mechanism M2.
Figure 43B:
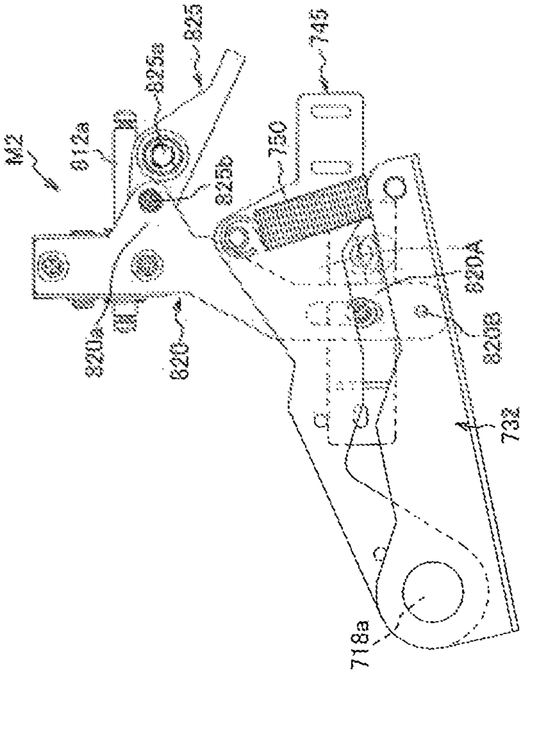
Figure 43C:
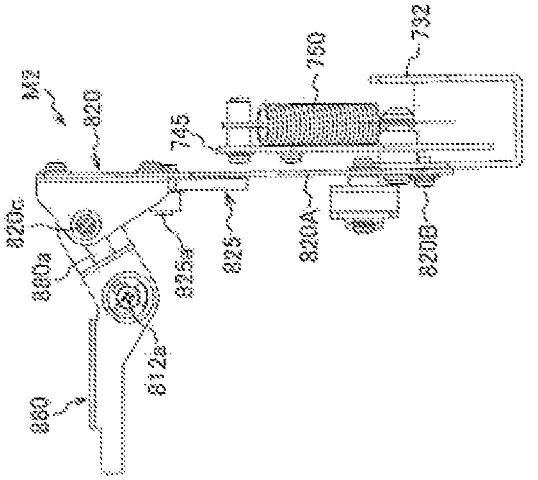
Figures 44A, 44B, 44C:
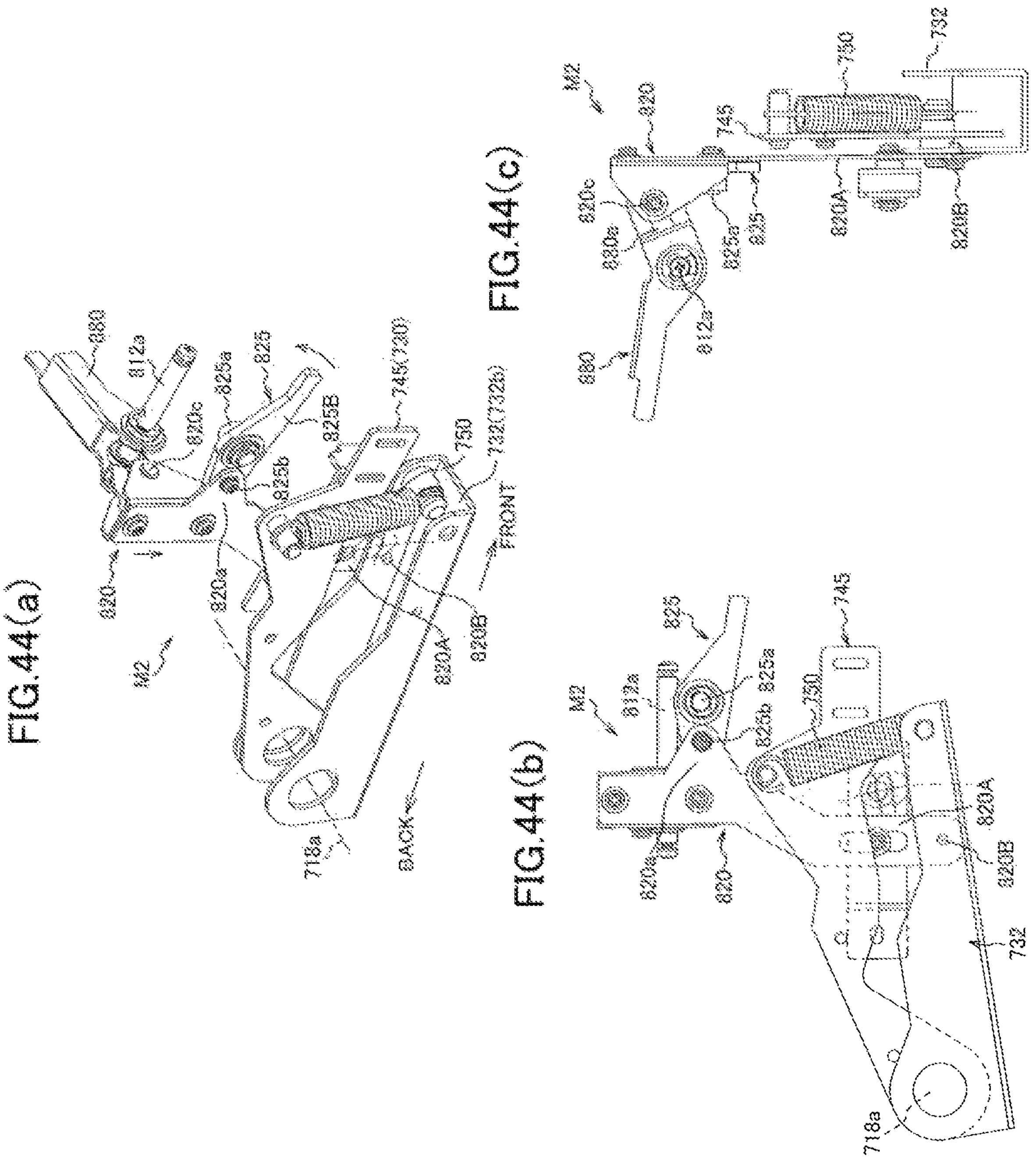
FIGS. 44(*a*), 44(*b*), and 44(*c*) are a perspective view, a side view, and a rear view illustrating the configuration and the operation of the second clamping-means actuating mechanism M2.

FIGS. 43(*a*), 43(*b*), and 43(*c*) are a perspective view, a side view, and a rear view illustrating a configuration and an operation of the second clamping-means actuating mechanism M2 (the first releasing piece 820 is at a first position (a lifted position)), and FIGS. 44(*a*), 44(*b*), and 44(*c*) are a perspective view, a side view, and a rear view illustrating a configuration and an operation of the second clamping-means actuating mechanism M2 (the first releasing piece 820 is at a second position (a lowered position).

The configuration and the operation of the second clamping-means actuating mechanism M2 are explained below with reference also to FIGS. 38 to 40, and the like.

In the process of movement of the stacker unit SU from the upper limit position to the lower limit position, the operating mechanism 730 rotationally moves downward while holding the tension spring 750 between the operating lever and the operating base piece 732*b*. Since this cancels the pressing of the roller 815 by the first operating lever, the clamping-means biasing member 813 is actuated to bring the clamping means to the closed state. The closed state of the clamping means continues until the stacker unit reaches the lower limit position. After the stacker unit reaches the lower limit position, only the second operating base piece 732*b* is further pressed downward due to continuation of the driving of the motor. That is, an additional operation to rotationally move the operating base piece 732*b* by the predetermined angle (8 degrees) in a direction away from the operating levers 740 and 750 (stopped at the lower limit position) is performed after the stacker unit SU is stopped at the lower limit position. With the additional operation of the operating base piece 732*b*, the second clamping-means actuating mechanism M2 is actuated to cause the clamping means 812 to perform the opening operation against the clamping-means biasing member 813 and to cancel the state in which banknotes are clamped.

The first releasing piece 820 is supported by the stacker base to be able to move back and forth in arrow directions between the first position (the lifted position) illustrated in FIGS. 38 and 43 and the second position (the lowered position) illustrated in FIGS. 39 and 44. Specifically, for example, a long hole extending vertically is formed on the first releasing piece 820 and a pin is provided on the stacker base to fit in this long hole to be able to move up and down. The first releasing piece is biased toward the first position by a spring 820*b* illustrated in FIG. 39. A lower portion 820A of the first releasing piece 820 is rotatably supported by a collar fixed to the operating base piece 732*b* with a screw 820B as illustrated in FIGS. 43 and 44.

The first releasing piece is at the first position on the upper side when the operating base piece 732*b* is at the first position (a position immediately before the additional operation and a state in which the tension spring 750 is not spread) illustrated in FIG. 38, and the first releasing piece is pushed down to the second position on the lower side when the operating base piece 732*b* is at the second position (the additionally operated position and a state in which the tension spring is spread) illustrated in FIG. 39.

The second releasing piece 825 is pivotally supported on an appropriate place of the stacker base by a shaft part 825*a* to be able to rotationally move (swing) in the upper-lower direction and is further coupled to a portion (a convex piece 820*b*) of the first releasing piece 820 at one of arms 825A by a shaft part 825*b* to be able to rotationally move.

The other arm 825B of the second releasing piece 825 is in a location relation engaging with an engaging protrusion 814*a* provided on the rear face of the lever 814 (the clamping-means actuating lever) and the arm 825B rotationally moves the lever 814 by a predetermined angle in the clockwise direction (a clamping-means opening direction) against the clamping-means biasing member 813 to open the clamping means when the arm 825B is rotationally moved in the counterclockwise direction from a most lowered position illustrated in FIG. 38 to reach a position illustrated in FIG. 39.

When the first releasing piece 820 is at the first position illustrated in FIG. 38, the second releasing piece 825 is biased in the clockwise direction to lower the right arm 825B. Therefore, the clamping means maintains the closed position. On the other hand, when the first releasing piece 820 is lowered to the second position illustrated in FIG. 39, the second releasing piece 825 is biased in the counterclockwise direction and accordingly lifts the right arm 825B. Therefore, the lever 814 is pushed up in the opening direction and the clamping means is opened.

The first releasing piece 820 is at the first position illustrated in FIG. 38 at a time when the stacker unit SU reaches the lower limit position, and the second releasing piece 825 has not been actuated and maintains the clamping means in the closed state at that time. When the operating base piece 732*b* is rotationally moved by the predetermined angle in the reverse rotation direction by driving of the motor after the stacker unit reaches the lower limit position, the first releasing piece 820 is lowered to the second position illustrated in FIG. 39. When the first releasing piece is lowered to move to the second position, the right arm 825A of the second releasing piece is rotationally moved upward (in the clockwise direction) and the clamping means is therefore rotationally moved in the opening direction (a clamping releasing direction). A timing of opening the clamping means is a time point when banknotes clamped by the clamping means are transferred onto the takeout member 960 or after this time point.

As will be described later, the first releasing piece 820 also functions as means for starting actuation of the pinch rollers.

<Aligning Means and Aligning-Means Actuating Mechanism>

The aligning means 850 and the aligning-means actuating mechanism S are explained next.

Figure 45A:
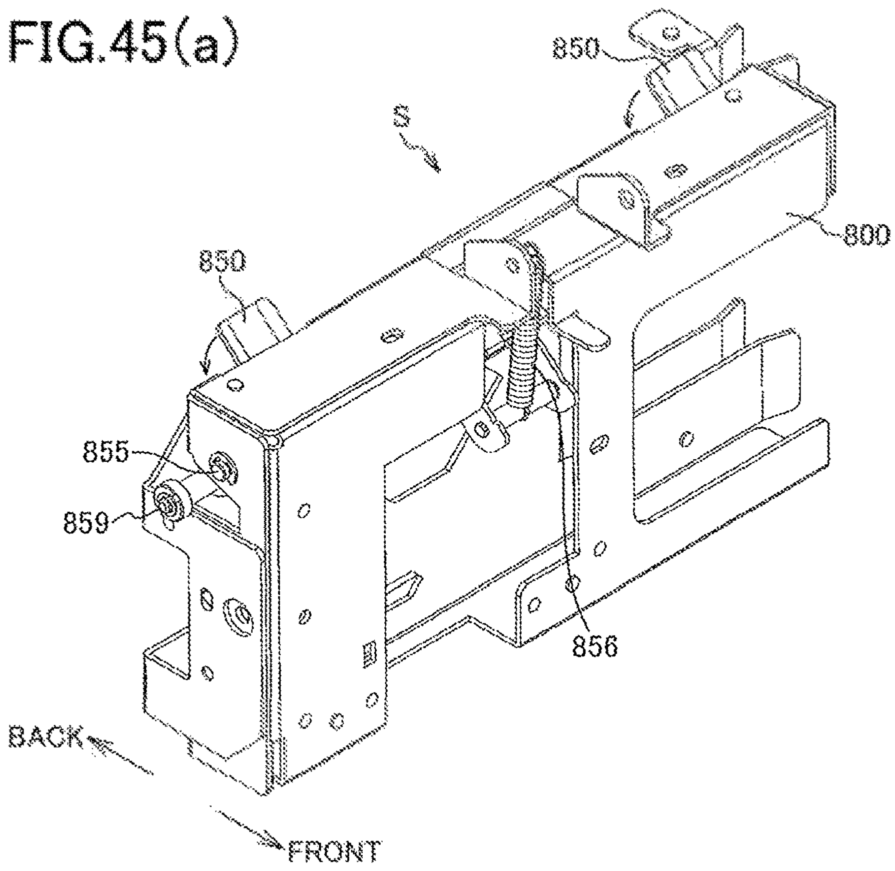
FIGS. 45(*a*) and 45(*b*) are front perspective views of relevant parts, illustrating configurations and operations of aligning means supported by a part of the stacker base and an aligning-means actuating mechanism.
Figure 45B:
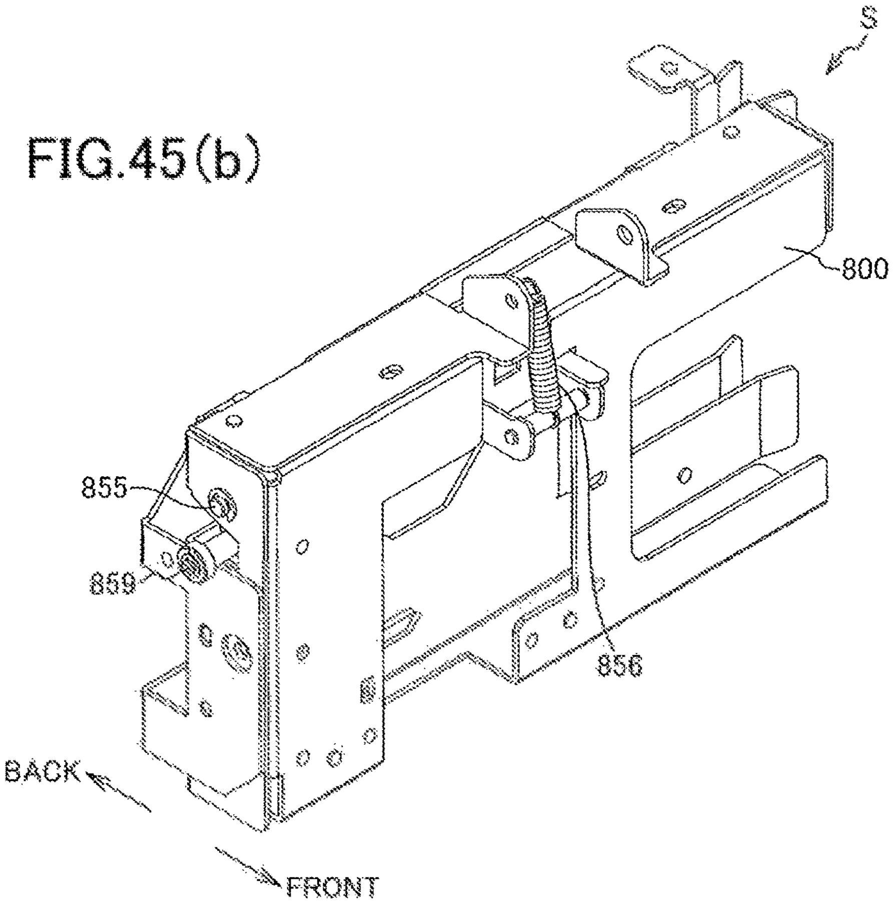
Figure 46A:
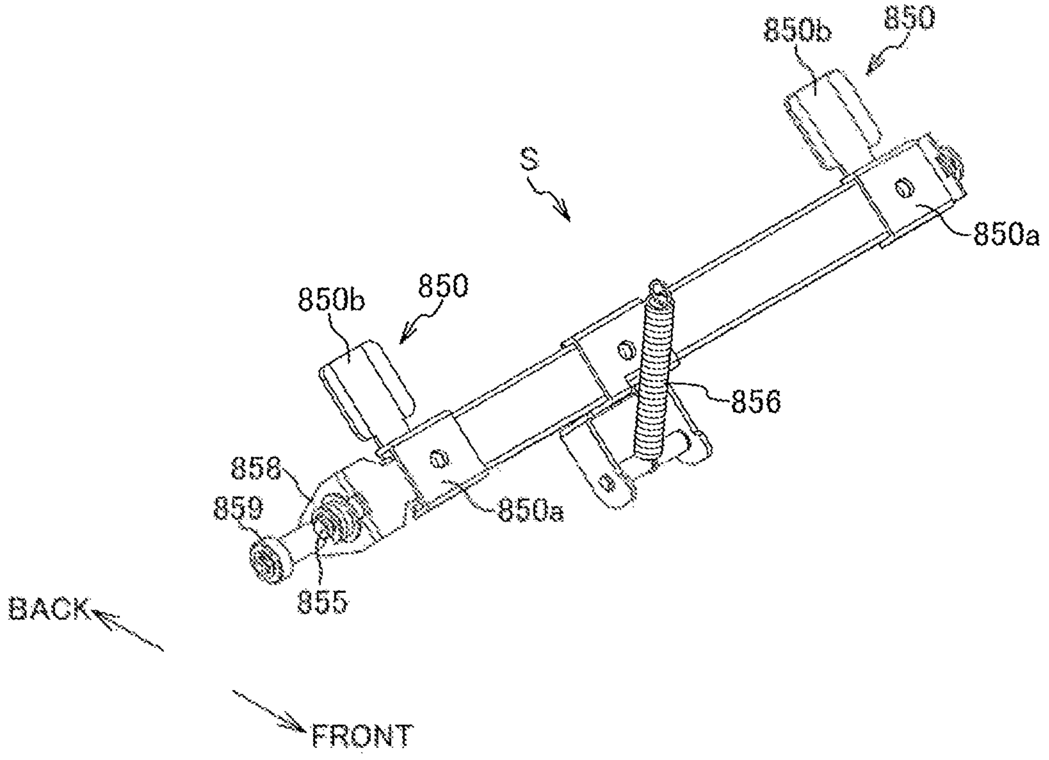
FIGS. 46(*a*) and 46(*b*) are front perspective views illustrating the configurations and the operations of the aligning means and the aligning-means actuating mechanism.
Figure 46B:
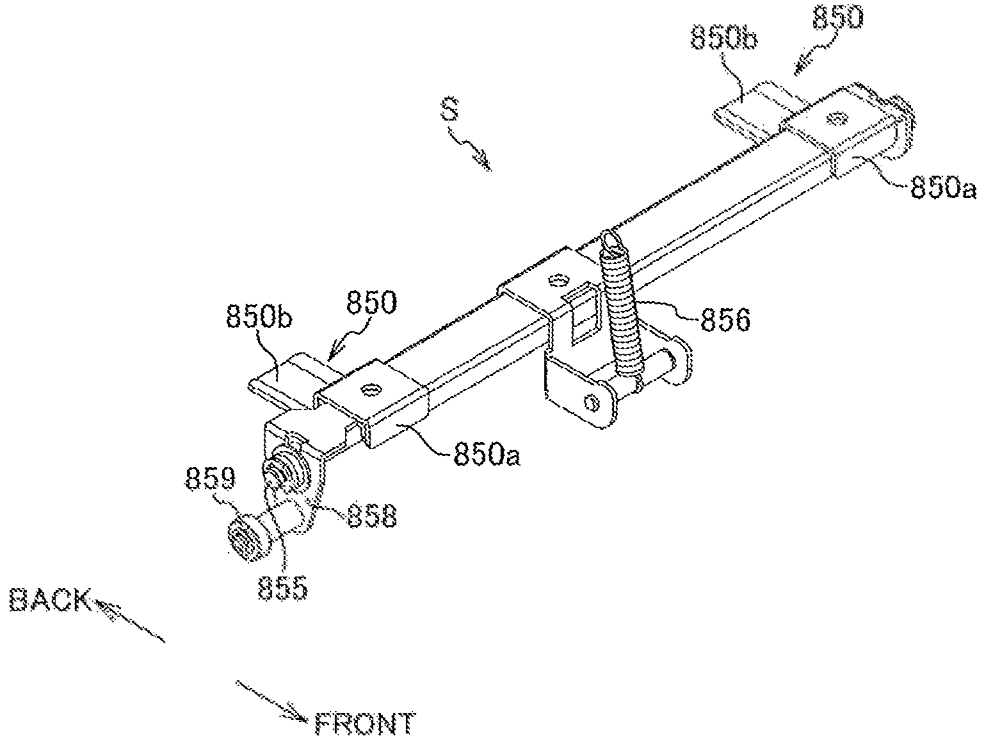
Figure 47A:
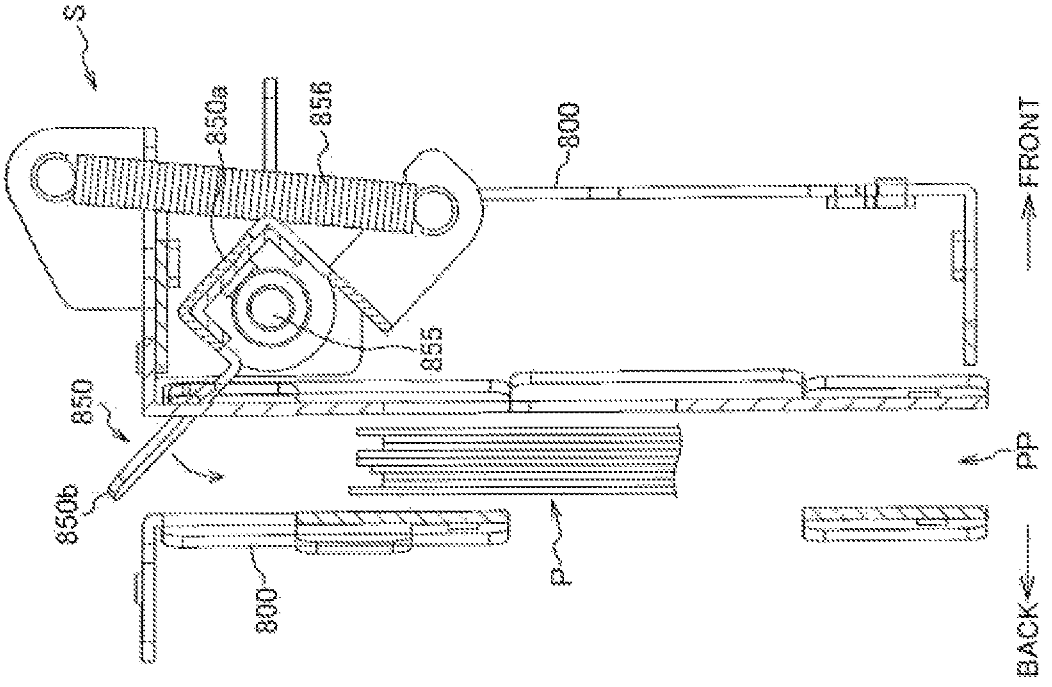
FIGS. 47(*a*) and 47(*b*) are side views of relevant parts, illustrating the configurations and the operations of the aligning means and the aligning-means actuating mechanism.
Figure 47B:
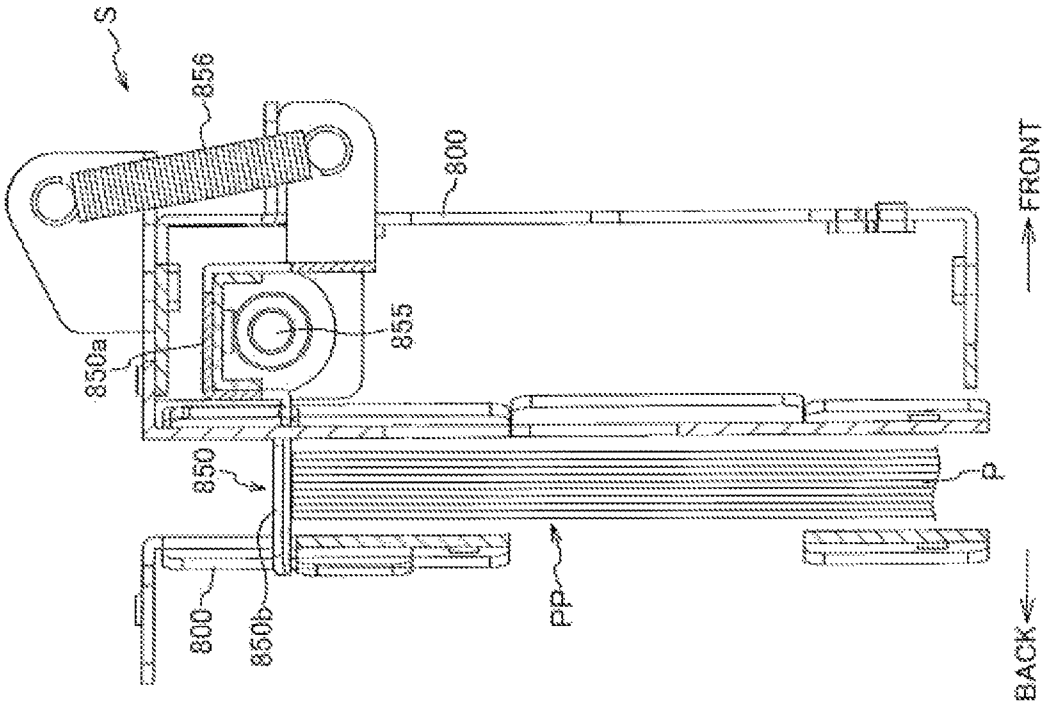

FIGS. 45(*a*) and 45(*b*) are front perspective views of relevant parts, illustrating configurations and operations of the aligning means supported by a part of the stacker base and the aligning-means actuating mechanism, FIGS. 46(*a*) and 46(*b*) are front perspective views illustrating the configuration and the closing operations of the aligning means and the aligning-means actuating mechanism, and FIGS. 47(*a*) and 47(*b*) are side views of relevant parts, illustrating the configurations and the operations of the aligning means and the aligning-means actuating mechanism.

The configuration and the operation of the aligning-means actuating mechanism S are explained below with reference also to FIGS. 33 to 37.

As illustrated in FIGS. 36, 37, and 45 to 47, the aligning means (banknote aligning means, an aligning member, and an aligning piece) 850 is operated to open and close by the aligning-means actuating mechanism S and, when the transport body 500 is stopped at the banknote extraction position PP, is positioned at a separate position separate upward from an upper edge portion of a batch of banknotes until the clamping means 812 starts clamping the banknote batch on the transport body (FIGS. 45(*a*), 46(*a*), and 47(*a*)). Before the clamping means starts clamping the banknote batch, the aligning means 850 is lowered to move to a pressurizing position (an aligning position) to pressurize an upper edge of the banknote batch P and maintains the pressurizing position also after the stacker unit thereafter moves to the lower limit position (FIGS. 45(*b*), 46(*b*), and 47(*b*)). This pressurizing operation aligns the banknotes in such a manner that the location of the upper edge of the banknote batch does not vary and prevents the banknote batch from being unpiled or misaligned even in the process of switching of the banknote batch in the attitude by 90 degrees and transfer thereof onto the takeout member 960. When takeout of the banknote batch is started after the banknote batch is transferred onto the takeout member 960, the aligning means 850 can continuously guide one edge of the banknote batch along the long side to stabilize the takeout operation.

In FIGS. 36 and 37, states of the closed position (the pressurizing position), an intermediate position, and the opened position of the clamping means 812, the aligning means 850, and other movable members are indicated by solid lines to illustrate operation patterns, respectively.

The aligning means (banknote aligning means) 850 is a plate-like small piece as illustrated in FIGS. 36, 37, and 46 and a base part 850*a* thereof is pivotally supported by a shaft part 855 of the aligning means. The aligning means 850 is brought into contact with an upper edge of the banknote batch at a lower face of a tip part 850*b* and aligns the banknotes while pressurizing the banknotes. With forward/reverse rotational movement of the shaft part 855, the tip part 850*b* rotationally moves between a lowered position where it is in contact with the upper edge portion of the banknotes and a lifted position where it is retracted upward. In the present embodiment, two aligning means are arranged near both end portions of the shaft part 855, respectively.

The locations of the aligning means 850 in the axis direction are arranged to be deviated from the clamping means 812 located above the aligning means so as not to interfere with each other. Therefore, the operation of the aligning means to be brought into contact with (to pressurize) the banknote upper edge and the opening/closing operation by the clamping means 812 are performed smoothly and independently of each other.

A biasing member 856 that biases the aligning means in the closing direction is provided in a tensioned state between an appropriate place of the stacker base 800 and an appropriate place of the aligning means 850 to bias the aligning means 850 in the lowering direction (a direction of pressurizing banknotes). The shaft part 855 supported by the stacker base is positioned below the shaft part 810 of the clamping means and nearer the front, and the aligning means 850 is protruded from the shaft part 855 toward the rear. One end of the lever 858 (the aligning-means actuating lever) is fixed to one end portion of the shaft part 855 and a roller 859 is pivotally supported at the other end of the lever to be rotatable. The roller 859 is arranged at a location interfering with the moving route of the second operating lever 745. Therefore, the second operating lever 745 (integral with the first operating lever 740) presses the roller 859 in the process of rotationally moving in the forward rotation direction to open the aligning means. That is, while the second operating lever 745 does not interfere with the roller 859 until the stacker unit SU reaches the upper limit position and stops, the second operating lever 745 is additionally moved by the predetermined angle in the forward rotation direction by continuous driving of the motor after the time point the stacker unit stops. In the additional operation, the second operating lever 745 presses the roller 859 in the opening direction to lift (open) the aligning means 850. With lifting of the aligning means, the aligning means is retracted from the banknote extraction position PP and the transport body is therefore enabled to enter the banknote extraction position PP.

In the present embodiment, the timing when the aligning means 850 performs the opening operation after the stacker unit reaches the upper limit position is delayed from the timing when the clamping means 812 performs the opening operation. This is because since the first operating lever that operates the clamping means to open is positioned ahead in the forward rotation direction relative to the second operating lever 745 that operates the aligning means to open, the first operating lever antecedently opens the clamping means in the process of rotational movement of the both levers in the forward rotation direction. While the first operating lever 740 is configured to operate the roller 815 of the clamping-means actuating lever 814 positioned above the first operating lever by setting the location of the upper end portion of the first operating lever 740 to be above the location of the upper end portion of the second operating lever 745, the roller 859 of the aligning-means actuating lever 858 positioned below the first operating lever is operated by the shorter second operating lever 745.

Contrary to the opening operation, the timing when the aligning means 850 performs the closing operation is earlier than the timing when the clamping means 812 performs the closing operation. This is because when the second operating lever that operates the aligning means to close starts reverse rotation from the additionally operated position on the upper side illustrated in FIG. 34, the second operating lever is positioned ahead in the reverse rotation direction relative to the first operating lever that operates the clamping means to close, and the second operating lever therefore antecedently presses the aligning-means actuating lever 858 in the closing direction to close the aligning means ahead in the process of rotational movement of the both levers in the reverse rotation direction. By thus adjusting the lengths of the operating levers and the location relation therebetween, and the location relation between the clamping-means actuating lever 814 and the aligning-means actuating lever 858, the timings when the clamping means and the aligning means open and close are enabled to differ (to be adjusted).

In the configuration described above, when the stacker unit SU at the upper limit position is moved to the lowered position, the drive mechanism DM is driven to rotationally move the operating mechanism 730 in the reverse rotation direction. When the stacker unit SU at the upper limit position starts rotating reversely toward the lower limit position, the second operating lever 745 at the additionally operated position illustrated in FIG. 34 starts rotationally moving in the reverse rotation direction, so that pressing of the roller 859 having been at the position to open the aligning means is canceled and the aligning means 850 is moved to the pressurizing position with the tensile force of the biasing member 856. The pressurization (the closing operation) is completed at a time when the second operating lever 745 is rotationally moved by the predetermined angle in the reverse rotation direction from the additionally operated position, and the state is continuously maintained also in the process of subsequent movement of the stacker unit to the lower limit position.

The second operating lever 745, the tension spring 750, the shaft part 855 of the aligning means, the biasing member 856 of the aligning means, the lever 858 (the aligning-means actuating lever), the roller 859, and the like constitute the aligning-means actuating mechanism S.

The aligning-means actuating mechanism (aligning-member actuating mechanism) S moves the aligning means 850 back and forth between the separate position (the open position, FIG. 47(*a*)) and the pressurizing position (the closed position, FIG. 47(*b*)) during a period in which the stacker unit SU is at the upper limit position, and maintains the state in which the aligning means pressurizes the upper edge portion of the banknote batch in the process of the stacker unit SU starting rotationally moving in the reverse rotation direction to reach the lower limit position. Furthermore, the aligning-means actuating mechanism S maintains the state in which the aligning means pressurizes the upper edge portion of the banknote batch also until the operating base piece 732*b* reaches the additionally operated position (FIG. 39) on the lower side. Accordingly, the banknote batch is continuously held at the upper edge portion to prevent from being unpiled until the banknote batch clamped by the clamping means is transferred onto the takeout member 960. The aligning-means actuating mechanism S further continues to guide an edge portion of the banknote batch on the long side also after the banknote batch is transferred onto the takeout member in the stacked state and is started to be taken out because it is released from the clamping by the clamping means. When the takeout of the banknote batch by the takeout member is completed, the drive mechanism DM resumes the rotation operation to return the stacker unit to the upper limit position.

As described above, the aligning means 850 is biased in the closing direction (a direction to hold the banknote upper edge) by the biasing member 856 when an external force in the opening direction is not applied. When the first and second operating levers 740 and 745 are at the additionally operated position on the upper side as illustrated in FIGS. 36 and 37, the aligning means is pressed by the second operating lever through the lever 858 to be brought to a state opened against the biasing member 856.

On the other hand, when the operating levers 740 and 745 start rotationally moving downward, the second operating lever 745 stops pressing the lever 858 and the biasing force of the biasing member 856 is therefore canceled. Accordingly, the aligning means 850 rotationally moves in the closing direction due to application of the force of the biasing member 856 and holds the upper edge of the banknote batch. The aligning means continues to hold the upper edge of the banknote batch in the process of rotational movement of the stacker unit from the upper limit position to the lower limit position. The aligning means moves to the open position only when pressed in the opening direction by the second operating lever to reach the additionally operated position after the stacker unit reaches the upper limit position.

To realize the operation described above, the location relation and the dimensions of the associated parts are set to cause the first operating lever 740 to cancel the pressing of the roller 815 of the clamping-means actuating member to bring the clamping means to the clamping state immediately after the second operating lever 745 is actuated and the aligning means holds the upper edge of the banknote batch.

As illustrated in FIG. 47(*b*), the upper end edges of banknotes P are at aligned locations in a state in which the aligning means 850 has completed alignment of the banknote batch on the transport body 500. Since the lengths of short sides of banknotes of all denominations in Japan are standardized to 76 millimeters, it suffices to set the height location of the lowered aligning means 850 to a location substantially 76 millimeters (a small margin is required) from the upper face of the transport body 500. On the other hand, even when the height locations of banknotes on the transport body immediately after entering the banknote extraction position PP vary as illustrated in FIG. 47(*a*), the aligning means 850 can lower to hold the upper edge portions of protruded banknotes, thereby aligning the banknotes in the aligned state illustrated in FIG. 47(*b*).

<Pressurizing Takeout Member and Pressurizing Takeout-Member Actuating Mechanism>

The pressurizing takeout member (pinch rollers) 870 and the pressurizing takeout-member actuating mechanism PM are explained next.

Figure 49:
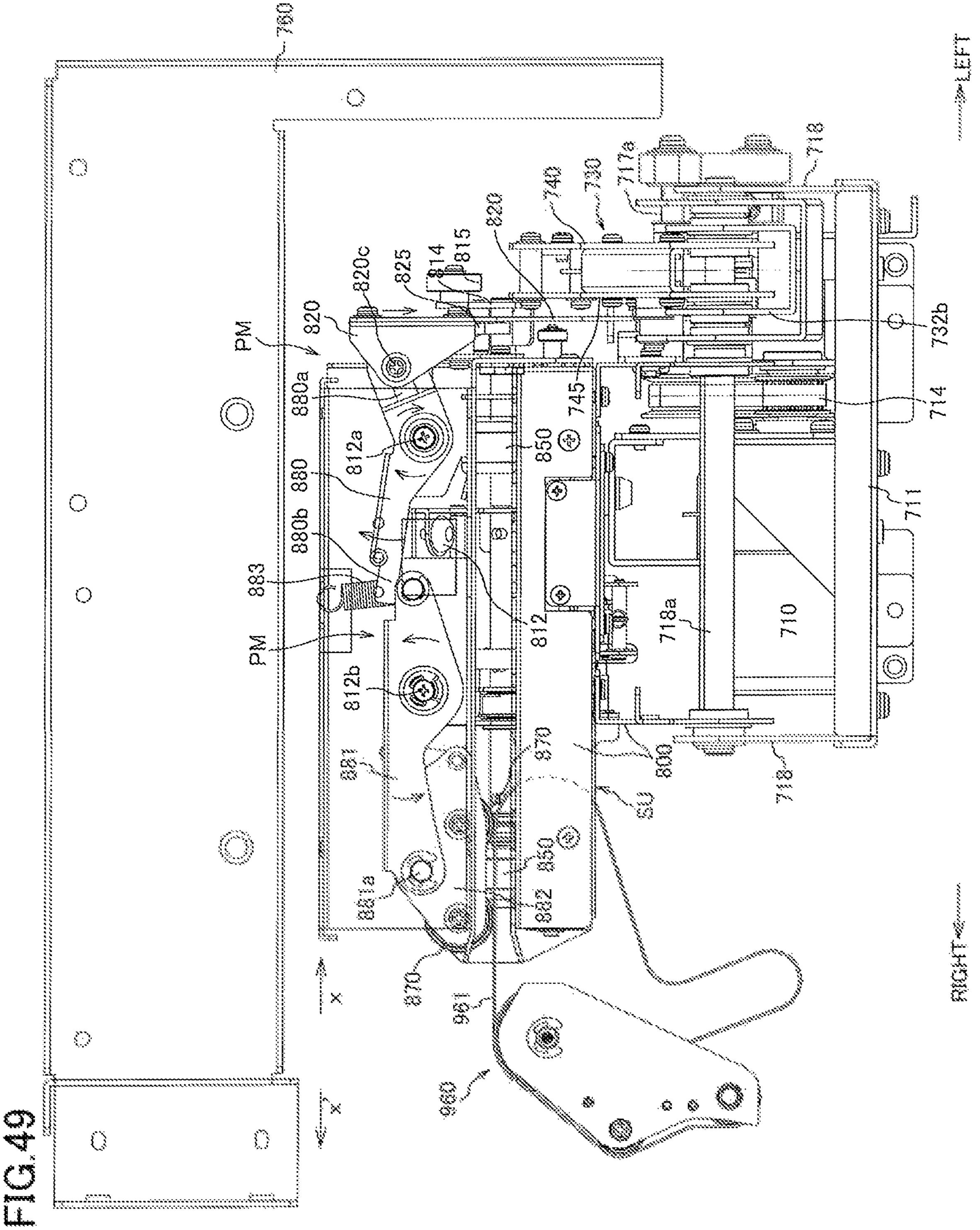
FIG. 49 is a rear view illustrating the configuration and the operation of the pressuring takeout-member actuating mechanism PM.
Figure 50:
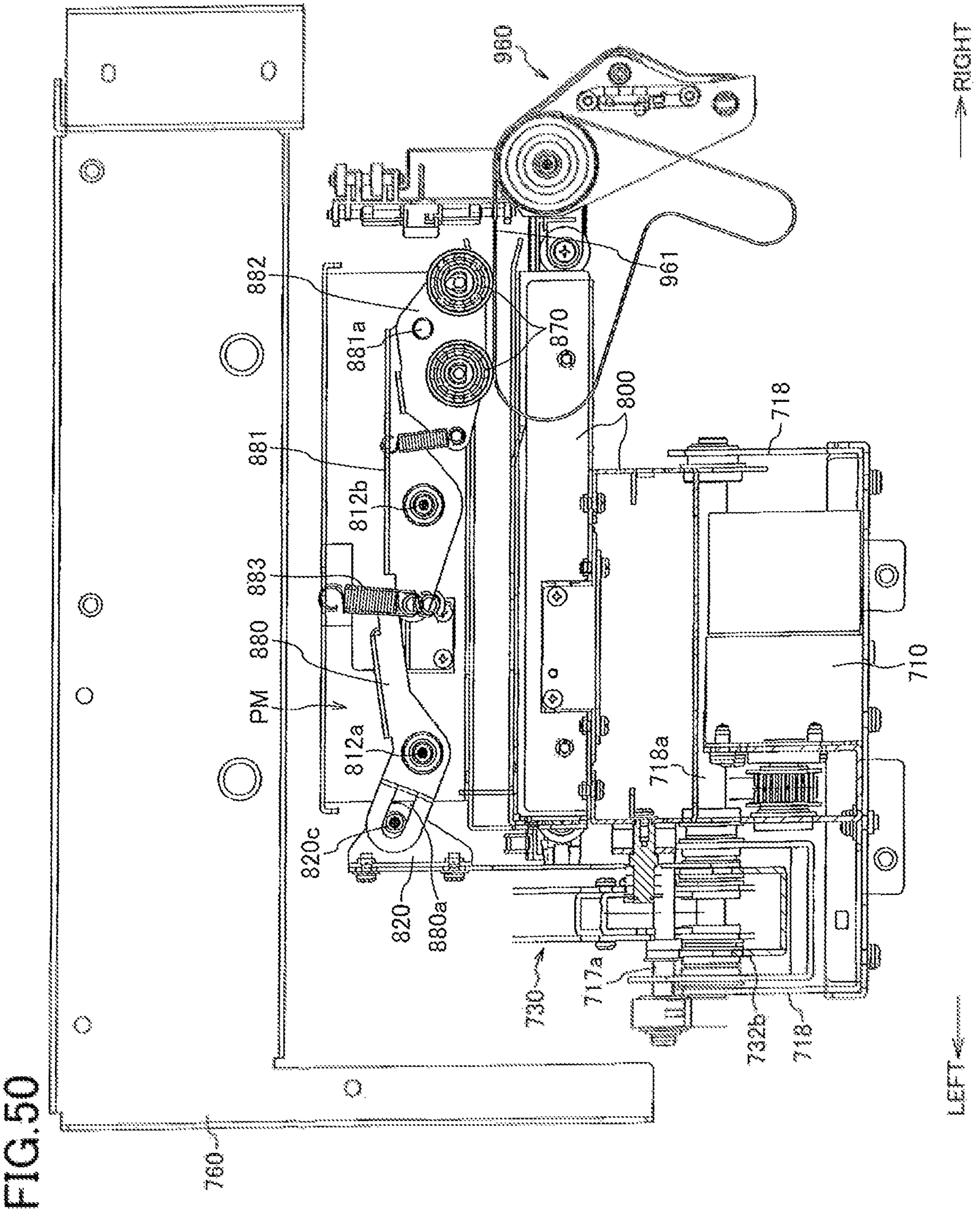
FIG. 50 is a view of the pressuring takeout-member actuating mechanism viewed from the front side.

FIGS. 48 and 49 are rear views illustrating a configuration and an operation of the pressurizing takeout-member actuating mechanism, FIG. 50 is a view of the pressuring takeout-member actuating member viewed from the front side, and FIGS. 51(*a*) and 51(*b*) are side views illustrating a location relation between the stacker unit at the lower limit position and the takeout member (views seen from a takeout member side).

As illustrated in FIG. 37, when the stacker unit is at the upper limit position, the pinch rollers 870 are at a position (a retracted position) on the side of the rear face of the banknote extraction position PP and lower than the aligning means and the aligning-means actuating mechanism S. Furthermore, the pinch rollers 870 are arranged to be spaced backward of (a batch of) banknotes retained in the upright state by the transport body 500 (backward of the banknote extraction position PP). Accordingly, when the stacker unit reversely rotates by 90 degrees from the state illustrated in FIG. 37 to reach the lower limit position and the operating mechanism 730 further performs the additional operation to cause the pinch rollers to be protruded, a state in which the circumferential face of the pinch rollers is just in contact with a central portion of the banknote (batch) in the width direction is obtained.

That is, the location relation of the pinch rollers 870 is set to enable the pinch rollers to lower onto the upper face of the takeout belt 961 constituting the takeout member 960 and to be in contact with the banknote (batch) on the takeout belt when the stacker unit SU has moved to the lower limit position.

When the stacker unit is at the upper limit position, the pinch rollers 870 supported by the stacker base 800 to be able to move back and forth maintain the retracted position where the pinch rollers cannot be in contact with the takeout member even if the stacker unit is lowered as it is. Meanwhile, the pinch rollers 870 are configured to be protruded downward from the retracted position to be in contact with the upper face of the banknote (batch) on the takeout member 960 and to be able to continuously pressurize the banknotes after the stacker unit moves to the lower limit position and the banknotes clamped by the clamping means are transferred onto the takeout member.

The pinch-roller actuating mechanism PM retains the pinch rollers 870 at the retracted position when the stacker unit is at the upper limit position, and causes the pinch rollers to be protruded to be able to be in contact with the takeout member when the stacker unit reaches the lower limit position.

The operation to cause the pinch rollers to be protruded is performed in conjunction with the operation of the second clamping-means actuating mechanism M2 to cancel the clamping by the clamping means and to release the banknote batch, and it is preferable that the pinch rollers are protruded after the clamping by the clamping means is canceled. However, the pinch rollers may be protruded before the cancellation or at the same time as the cancellation.

The pinch-roller actuating mechanism PM is actuated in conjunction with the first releasing piece 820 constituting the second clamping-means actuating mechanism M2. The pinch-roller actuating mechanism PM includes a first actuating piece 880 that is pivotally supported at an intermediate portion in FIG. 48 by a shaft 812*a* provided on the stacker base 800 to be able to rotationally move in the upper-lower direction, a second actuating piece 881 that is pivotally supported at an intermediate portion by another shaft 812*b* to be able to rotationally move in the upper-lower direction, a pinch-roller support member 882 that is pivotally supported by a shaft 881*a* provided at a location near an end portion of the second actuating piece 881 to be swingable and that pivotally supports the two pinch rollers 870 to be able to rotationally move, and an elastic member 883 that is provided in a tensioned state between one end portion of the second actuating piece 881 and one portion of the stacker base and that biases the one end portion of the second actuating piece 881 upward (in the counterclockwise direction) in FIG. 48.

A long hole 880*a* is provided at one end of the first actuating piece 880 and a pin (a bolt) 820*c* provided in a protruded manner at a portion of the first releasing piece 820*a* fits in the long hole to be movable therein. The first actuating piece 880 includes a pressing part 880*b* at a distal end portion and the pressing part pushes one end portion of the second actuating piece 881 downward against the biasing force of the elastic member 883 as illustrated in FIG. 48 and retains the pinch rollers 870 supported by the support member 882 at the retracted position illustrated in FIG. 48. In FIG. 48, the first releasing piece 820 is at the lifted position (the first position, FIG. 38) and the first actuating piece 880 is biased in the counterclockwise direction, so that the second actuating piece 881 is rotationally moved clockwise (in a pinch-roller retraction direction) by the pressing part 880*b*.

Next, when the first releasing piece 820 is moved to the lowered position (the second position, FIG. 39) as illustrated in FIG. 49, the first actuating piece 880 is biased in the clockwise direction, so that the pressing of the second actuating piece 881 by the pressing part 880*b* is canceled and the second actuating piece is therefore rotationally moved counterclockwise with the force of the elastic member 883 and moves the pinch rollers 870 supported by the holding member 882 to the protruded position illustrated in FIG. 49.

The first releasing piece 820 at the first position illustrated in FIG. 38 is moved to the lowered position (the second position) illustrated in FIG. 39 as described above when the operating base piece 732*b* is moved to the additionally operated position after the stacker unit SU reaches the lower limit position. At a time when the stacker unit reaches the lower limit position, the pinch rollers are at the retracted position and are separated from the upper face of the takeout member 960 (the clamping means is also still clamping the banknote batch). When the operating base piece 732*b* is moved to the additionally operated position, the pinch rollers are first protruded from the retracted position to be in contact with the upper face of the takeout member (the clamping means is also opened at that time).

As described above, with the lowering operation of the first releasing piece 820, the clamping means 812 is opened and the pinch rollers press against and are brought into contact with the upper face of the banknote (batch) immediately after being transferred onto the takeout belt 960.

In this state, by driving of the takeout belt 961 of the takeout member in the takeout direction with a takeout motor, the banknote (batch) is taken out to the cashbox 950 in a state nipped by the takeout belt and the pinch rollers. Since the banknote batch transported by the transport body 500 is switched in the direction and is thereafter input in a lump to the cashbox, the processing can be quickened. If the banknote batch is separated into sheets on the downstream of the takeout member and is input one by one to the cashbox, jam is likely to occur. However, since the banknote batch is transported and input to the cashbox in a lump, such a failure does not occur.

After the clamping means is opened to release the banknote batch, it is difficult to take out the banknotes while keeping the shape of the banknote batch. However, since the aligning means continues to guide the banknote batch, misalignment or unpiling of the banknotes can be prevented.

In the present embodiment, the pinch rollers are kept at the retracted position at normal times (in the process of moving to the upper limit position and the lower limit position) and are protruded at a timing of pressurizing (being in contact with) the banknote batch on the takeout member. The reason is that, if the pinch rollers are always located at the protruded position or are configured to be freely protruded from the retracted position under its own weight, the pinch rollers interfere with the banknote batch sandwiched by the clamping means in the process of the stacker unit rotationally moving to the lower limit position or interfere with the banknote batch to be transferred onto the takeout member due to protruding of the pinch rollers at a time when the stacker unit reaches the lower limit position, which leads to a malfunction. That is, it is desirable that the pinch rollers ideally press against and are brought into contact with the upper face of the banknote batch only after the banknote batch is seated on the upper face of the takeout belt. However, if the pinch rollers are always at the protruded position or are in a state in which it can freely be protruded, the pinch rollers start pressurizing the upper face of the banknote batch before the banknote batch is brought into contact with the upper face of the takeout belt or before the banknote batch stops at a normal position after being in contact with the upper face of the takeout belt. Accordingly, a malfunction such as deviation in the contact position with the upper face of the banknote batch or unpiling of the banknote batch to cause a feeding failure occurs. That is, the pinch rollers cannot nip the banknote batch with the takeout belt in a proper attitude suitable for feeding.

In the present invention, to solve this problem, the pinch rollers 870 are normally kept at the retracted position and are protruded only at specific required timings. For the timing when the pinch rollers are to be protruded, a relation with the timing of cancellation of the clamped state of the banknote batch by the clamping means is important. Although the pinch rollers may be protruded to be seated on the banknote batch at the same time as the clamping means cancels clamping of the banknote batch, after the clamping means has surely canceled the clamping, or immediately before the clamping means cancels the clamping, there is a risk that the adverse effects described above are involved on the banknote batch if protruding of the pinch rollers is too early or too late.

Furthermore, in the present invention, the pinch rollers are positioned on the upper face of the takeout belt to start pressing to be brought into contact therewith in a state in which the stacker unit is locked at the lower limit position and is prevented from wobbling by continuously biasing the operating lever at the lower limit position due to the tensile action of the tension spring 750 toward the operating base piece 732*b* at the additionally operated position. Therefore, an effective nipping pressure can be created between the pinch rollers and the takeout member to further enhance the feeding stability.

As illustrated in FIG. 48, an end portion of the takeout belt 961 on the side of the stacker unit is in the stacker unit only to such an extent that can be brought into contact with the two pinch rollers 870. However, this is sufficient to take out the banknote batch because the pinch rollers reliably pressurize a site of the banknote batch near the end portion and compress the site with the upper face of the takeout belt.

<Layout in Cashbox Unit>

As illustrated in FIG. 30, the banknote (batch) P transferred on the takeout belt 961 is transported into the cashbox 950 through the transport route 962 to the cashbox 950, and is stored in the cashbox in an attitude with the long sides facing the upper-lower direction (a direction orthogonal to the transport direction x) and stacked in a direction parallel to the transport direction x.

In contrast thereto, the banknote batch on the transport body 500 inside the banknote extraction position PP at a time when the stacker unit SU is at the upper limit position completely differs in the attitude from that of the banknotes in the cashbox. The banknote batch on the transport body at that time has the long sides parallel to the transport direction x and is stacked in the direction orthogonal to the transport direction x. That is, the banknote batch is retained in the upright state.

To compactly house the direction switching and transferring device (the swivel stacker device) and the cashbox 950 in the housing 701 of the cashbox unit 700 and to prevent an increase in the total length in the transport direction x, providing a housing space below the direction switching and transferring device H as illustrated in FIG. 30 and arranging the cashbox 950 in the housing space in a location relation parallel to the direction switching and transferring device H is required. However, the banknote batch is transported in the upright state (in an attitude and a direction orthogonal to the transport direction x) on the transport body because of particularity of the banknote transport device C using an air flow in the present invention. Meanwhile, the stacking direction of the banknote batch in the cashbox is a direction parallel to the transport direction x.

Therefore, the direction switching and transferring device H of the present invention is configured to laterally turn the banknote batch in the upright state received from the transport body by 90 degrees to have a horizontal attitude, then transfer the banknote batch on the takeout member 961, transport the banknote batch in this state along the long side direction of the banknote batch to be carried into the cashbox, and stack the banknote batch according to the stacking direction in the cashbox.

The cashbox 950 has a configuration to receive a batch of banknotes taken out from the direction switching and transferring device H that is arranged above the cashbox onto the takeout member 961 through a receiving port 951 as it is in a state in which the plural banknotes are stacked, and to load the takeout member along with the banknote batch in a storage part. For example, the configuration of a paper sheet storage part disclosed in Japanese Patent No. 6449972 can be applied to the cashbox.

A number judging unit that judges the number of banknotes in a transported banknote batch from the thickness thereof is arranged between the takeout member 961 and the cashbox to check the number of banknotes constituting the banknote batch.

Figure 52:
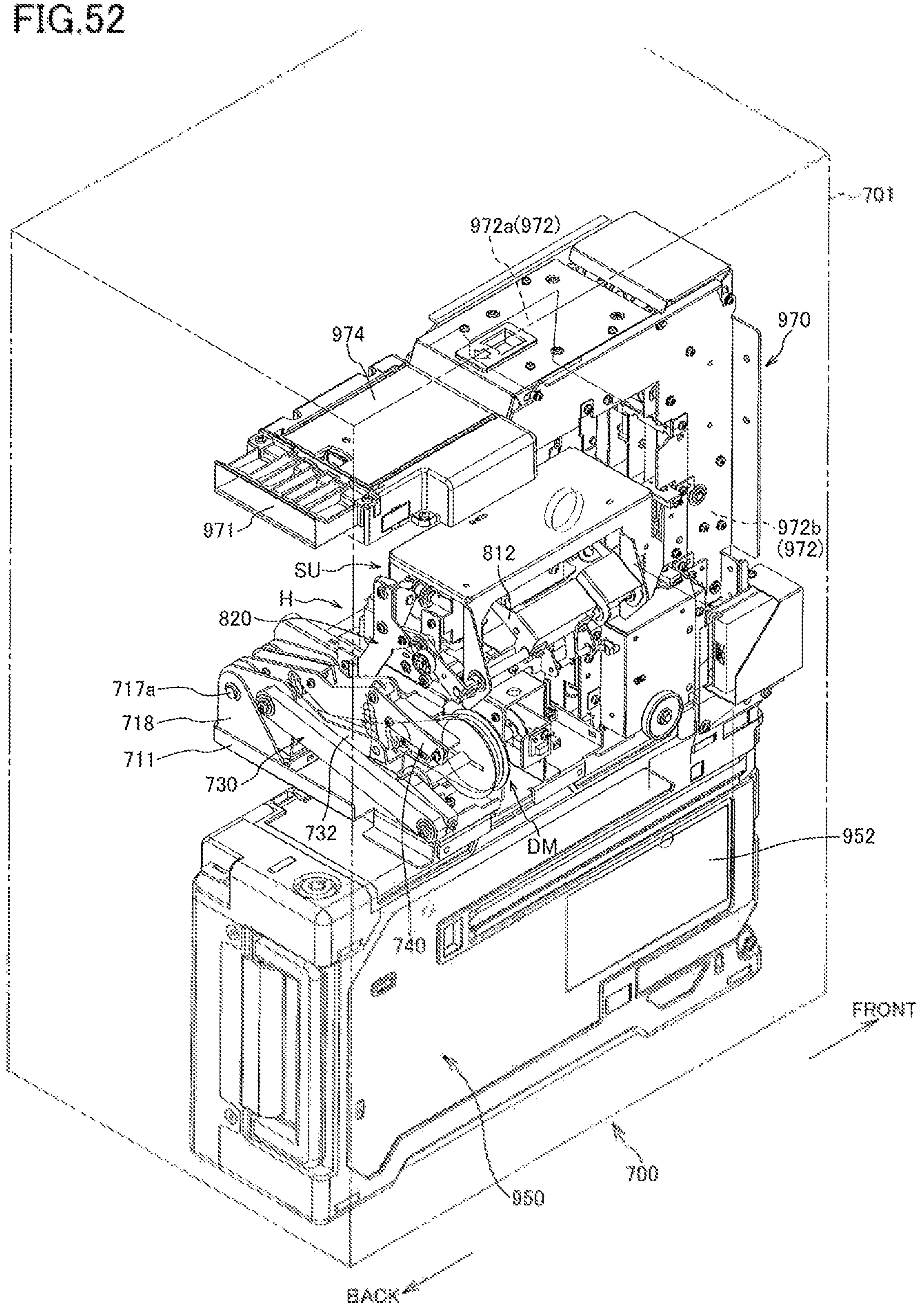
FIG. 52 is a perspective view illustrating an internal configuration of a cashbox unit including a processing device for transport error paper sheets (banknotes).
Figure 53:
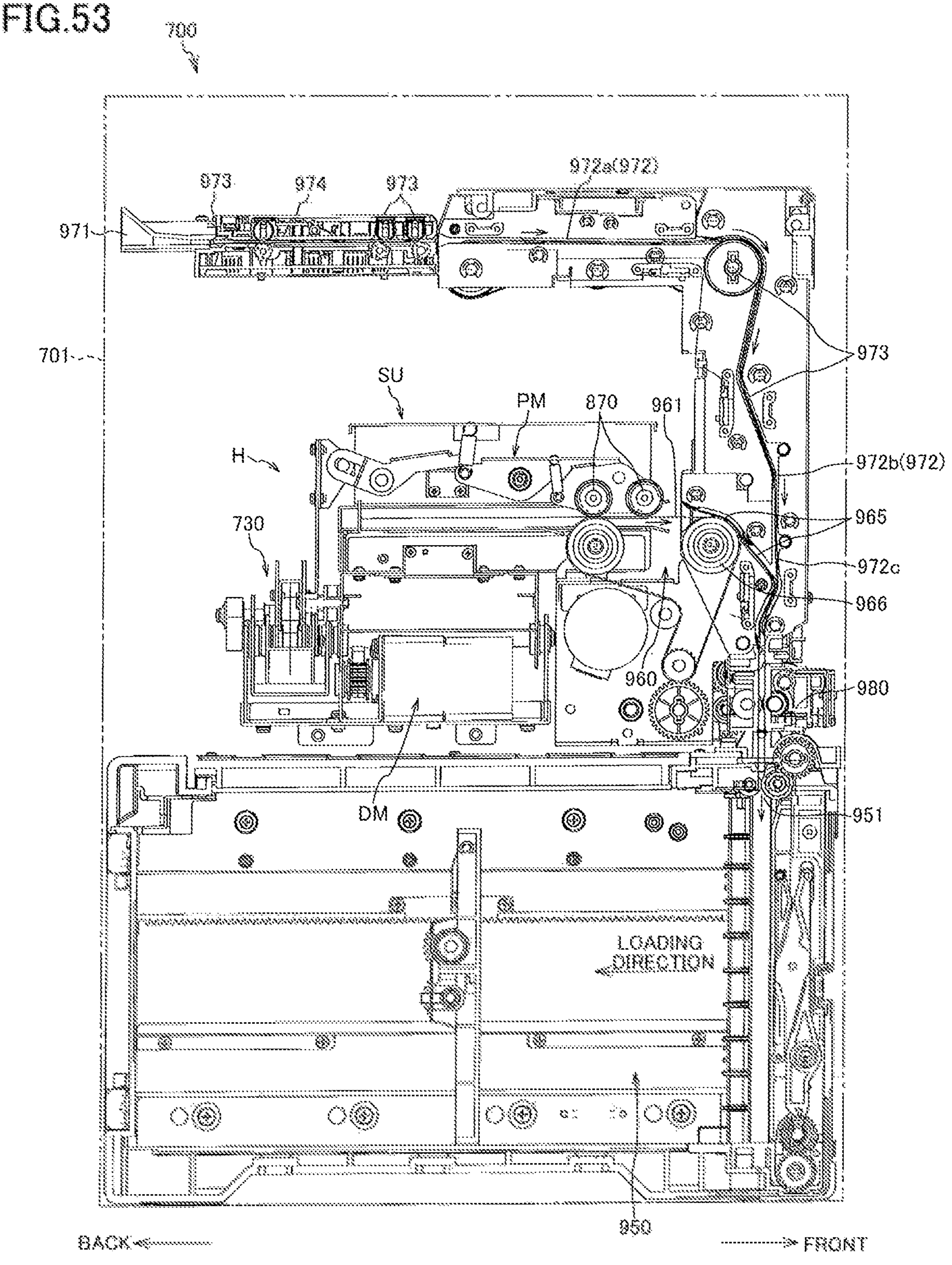
FIG. 53 is a side view illustrating the internal configuration of the cashbox unit.
Figure 54:
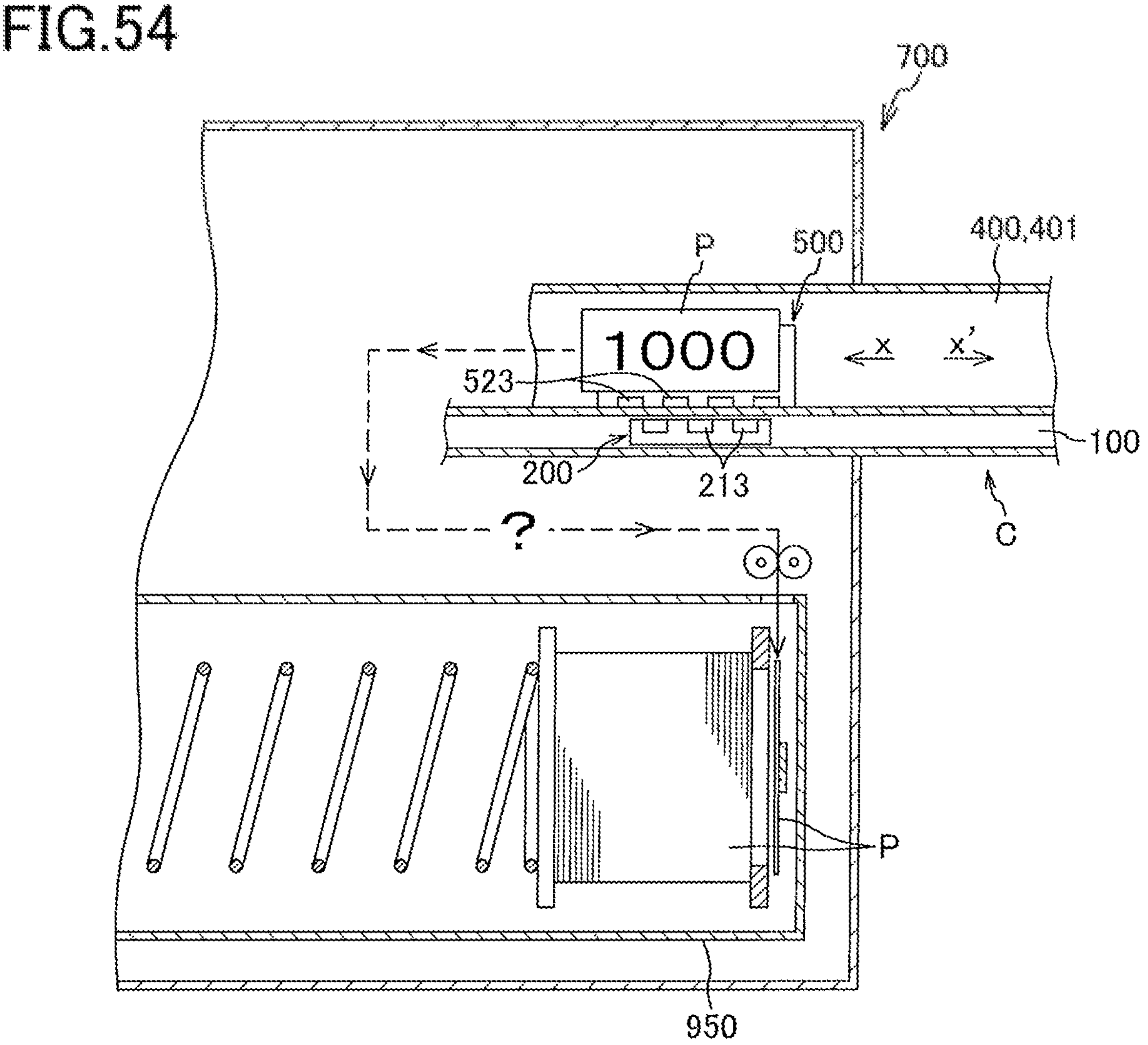
FIG. 54 is a schematic diagram for explaining problems of a cashbox unit in Patent Literature 1.

D. Processing Device for Transport Error Sheets (Banknotes) According to Fourth Invention FIG. 52 is a perspective view illustrating an internal configuration of the cashbox unit including a processing device for transport error sheets (banknotes), and FIG. 53 is a side view illustrating the internal configuration of the cashbox unit.

A situation in which the transport body cannot be moved to the banknote extraction position PP in the cashbox unit when the transport body stops on the transport device 400 for some reason or banknotes on the transport body cause jam is assumed. In such a case, if the banknotes on the transport body are separately and manually processed without being stored in the cashbox 950 through the direction switching and transferring device H, security of the entire paper sheet transport system 10 is lost.

In the present invention, as a countermeasure, a processing device 970 for transport error banknotes is arranged in the cashbox unit that stores banknotes on the transport body separately from the direction switching and transferring device H to enable all the transport error banknotes to be stored in the cashbox 950.

By storing and keeping all banknotes including the transport error banknotes transported to the cashbox unit in the cashbox, fraudulent acts in handling banknotes can be reliably and easily prevented.

The processing device 970 for transport error banknotes schematically includes a banknote inlet 971, an error banknote transport route 972 including a first transport route 972*a* extending horizontally from the banknote inlet 971 and a second transport route 972*b* extending downward from the first transport route to the receiving port 951 of the cashbox 950, a transport mechanism 973 such as a roller and a belt arranged along the error banknote transport route 972, a paper passage sensor (not illustrated) arranged along the banknote inlet and each of the transport routes, and a recognition device 974 located inside the banknote inlet 971.

The first transport route 972*a* is arranged above the direction switching and transferring device H in a space in the housing and the second transport route 972*b* is arranged in a space at the back of the direction switching and transferring device H.

The second transport route 972*b* joins a third transport route 965 for transporting a banknote batch taken out from the direction switching and transferring device (the swivel stacker device) H to the cashbox at a joint portion 972*c* in the middle.

A transport roller 966, a switching gate (not illustrated), and the like are arranged at the joint portion 972*c* to enable switching between a transport banknote (one sheet) from the second transport route 972*b* and transport banknotes (a batch) from the third transport route 965 to be selectively transported to the cashbox.

The recognition device 974 judges the authenticity of a banknote input one by one from the banknote inlet 971, the denomination thereof, and the like, and carries only receivable banknotes into the first transport route 972*a* using the transport mechanism and returns unreceivable banknotes to the banknote inlet 971 using the transport mechanism.

A number detecting device 980 that detects the number of banknotes in the batch transported from the direction switching and transferring device H through the third transport route 965 based on the thickness of the batch is arranged before the receiving port 951 of the cashbox.

In the configuration described above, when a situation in which banknotes cannot be transported to the cashbox unit, such as a situation in which the transport body 500 is stopped for a reason such as a transport error or banknote jam on the transport route 400 and cannot reach the banknote extraction position PP in the cashbox unit 700 occurs, processing by the processing device 970 for transport error banknotes is performed.

That is, first, a part of the transport tube (the transport route) 400 at a place where the transport body is stopped or a place where banknotes are jammed is detached to expose the transport body or the banknotes, and all the transport error banknotes are taken out from the transport tube. Next, the taken banknotes are input one by one through the banknote inlet 971 of the processing device 970 for transport error banknotes, so that a drawing transport mechanism 973 is actuated to transport the banknotes to the recognition device 974. The recognition device 974 performs judgement of the authenticity and the denomination as described above and transfers banknotes to the downstream side when the banknotes are receivable. The transport error banknotes are transported into the cashbox 950 through the first transport route 972*a* and the second transport route 972*b*. Before storage into the cashbox, the number of banknotes to be stored in the cashbox is counted by the number detecting device 980. Accordingly, banknotes taken out from the transport route due to an error are stored in the cashbox without being lost, and security is maintained.

As described above, with the processing device 970 for transport error banknotes of the present invention, when a transport failure such as jam occurs on the transport route 400 and banknotes cannot be transported to the direction switching and transferring device H, these banknotes can be taken out from the transport route and can thereafter be reliably stored one by one in the cashbox after checking the denomination of each of the banknotes without the need to handle the banknotes separately from those processed by the direction switching and transferring device H. Therefore, it is possible to prevent the security from being lost.

E. Number Detecting Device According to Fifth Invention

Figure 55:
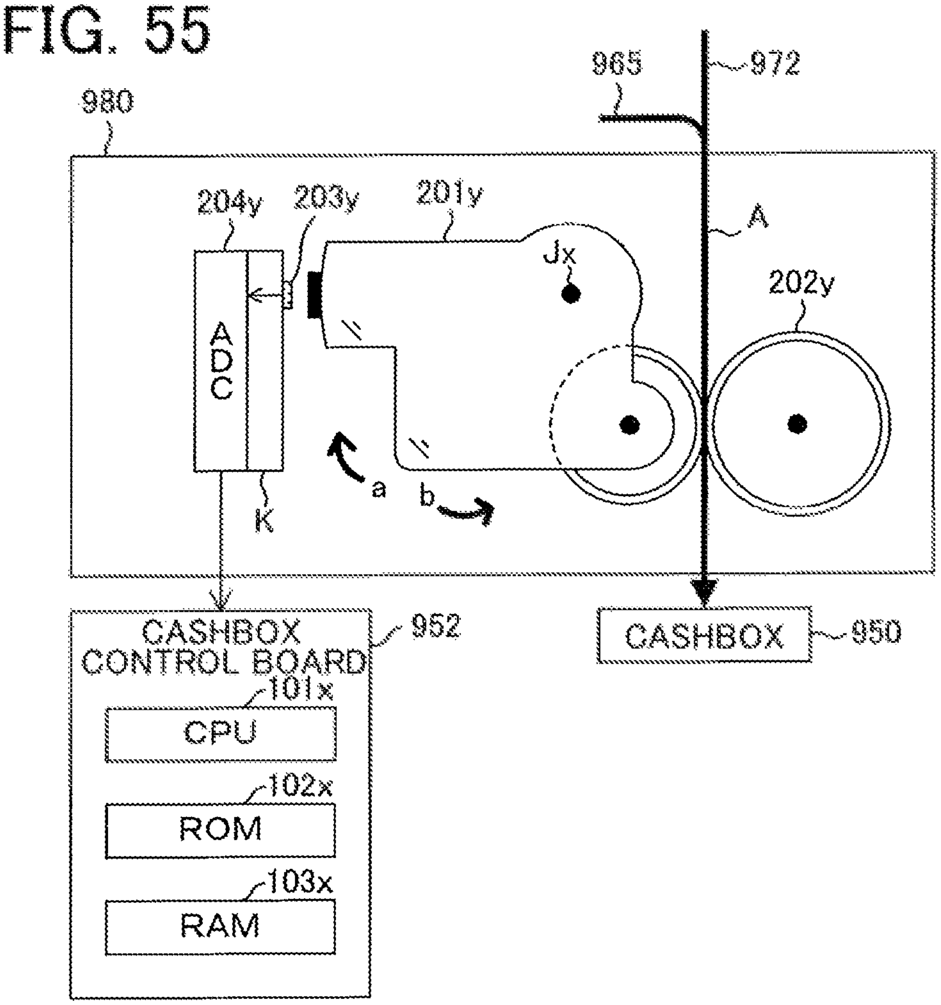
FIG. 55 is a diagram for explaining a hardware configuration including a number detecting device.

FIG. 55 is a diagram for explaining a hardware configuration of the cashbox unit 700 according to the present embodiment. As illustrated in FIG. 55, the cashbox unit 700 of the present embodiment is configured to include the cashbox 950, the number detecting device 980, and the cashbox control board 952. In the present embodiment, a banknote batch from the direction switching and transferring device H is received by the number detecting device 980 through the third transport route 965 and is subsequently stored in the cashbox 950 in the same manner as in the embodiments described above. Paper sheets transported on the error banknote transport route 972 are stored in the cashbox 950 via the number detecting device 980. Hereinafter, a transport route for paper sheets (a paper sheet batch) in the number detecting device 980 is sometimes referred to as "transport route A" for sake of explanations. Both the banknote batch from the direction switching and transferring device H and the paper sheets from the error banknote transport route 972 are transported on the transport route A.

As illustrated in FIG. 55, the number detecting device 980 of the present embodiment is configured to include a shifting member 201*y*, a detection roller 202*y*, a hall IC (Integrated Circuit) 203*y*, and an ADC (Analog to Digital Converter) 204*y*. The detection roller 202*y* rotates and transports paper sheets (a paper sheet batch) on the transport route A toward the cashbox 950 in a period in which take-in time processing is performed. Specifically, as illustrated in FIG. 55, a place between the detection roller 202*y* and the shifting member 201*y* (a transport roller 201*yb* described later) is a part of the transport route A. When the detection roller 202*y* rotates, the paper sheet batch is taken in between the detection roller 202*y* and the shifting member 201*y*.

The shifting member 201*y* is provided to be rotatable on a shaft portion Jx. Specifically, the shifting member 201*y* is provided to be rotatable in the direction of an arrow a in FIG. 55 and the direction of an arrow b (the opposite direction to the arrow a). The shifting member 201*y* is biased in the direction of the arrow b (toward the detection roller 202*y*) by a biasing member (not illustrated) (for example, a spring). Therefore, when there is no paper sheet on the transport route A, the shifting member 201*y* abuts the detection roller 202*y*. On the other hand, when a paper sheet batch passes between the detection roller 202*y* and the shifting member

201*y*, the shifting member 201*y* rotates in the direction of the arrow a according to the thickness of the paper sheet batch. This configuration will be explained in detail with reference to FIGS. 56(*a*) and 56(*b*) described later.

The hall IC 203*y* is a substantially plate-like member and is provided on a substrate K. The hall IC 203*y* detects a magnetic field and generates a voltage signal Sv corresponding to the magnetic field. The voltage signal Sv is an analog signal indicating a voltage value. Hereinafter, the voltage value indicated by the voltage signal Sv is sometimes referred to as "voltage value V" for sake of explanations.

The magnetic field detected by the hall IC 203*y* changes according to a location relation with the shifting member 201*y* (a magnet m described later (see FIG. 56(*a*)). That is, the voltage value V changes when the shifting member 201*y* shifts (rotates) (see FIG. 56(*c*) described later). Specifically, the voltage value V is larger as the shift amount of the shifting member 201*y* is larger. As will be described in detail later, in the present embodiment, the number of paper sheets in a paper sheet batch is calculated (estimated) using the voltage value V.

The ADC 204*y* converts the voltage value V indicated by the voltage signal Sv (an analog signal) into a digital signal. Specifically, a range of the voltage value (the voltage signal Sv) that can be output from the hall IC 203*y* is about from 0 (zero) to 5 V (volts). The ADC 204*y* converts the voltage value indicated by the voltage signal Sv into any of values 0 to 4095. For example, a voltage value 0 V is converted into a value "0", a voltage value 1 V is converted into a value "818" (≈4095/5), and a voltage value 5 V is converted into a value "4095". While the ADC 204*y* is provided on the side of the number detecting device 980 in the specific example illustrated in FIG. 55, a configuration in which the ADC 204*y* is provided on the side of the cashbox control board 952 may be applied.

The cashbox control board 952 is configured to include a CPU 101*x*, a ROM 102*x*, and a RAM 103*x*. The CPU 101*x* reads a control program memorized in the ROM 102*x* and loads the control program into the RAM 103*x* to execute the control program, whereby various functions (a calculating unit 16, and the like) described later are realized. Specifically, the voltage signal Sv converted into a digital signal by the ADC 204*y* is constantly input to the cashbox control board 952. The CPU 101*x* performs various types of processing (detecting processing, correcting processing, and calculating processing described later) for calculating the number of paper sheets in a paper sheet batch using the voltage value V indicated by the voltage signal Sv.

Figure 56A:
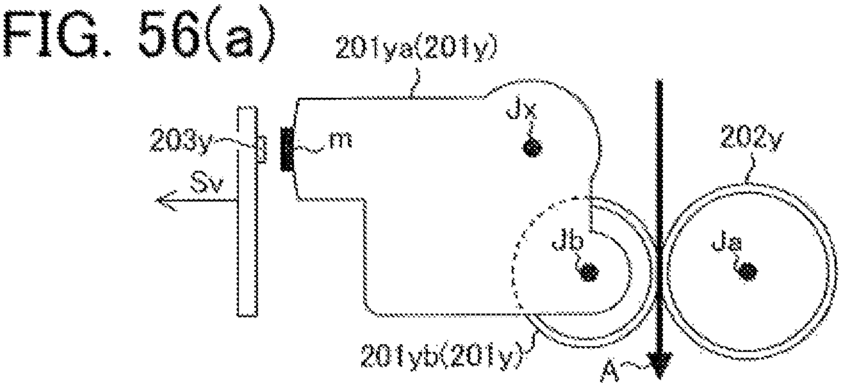
FIG. 56 are diagrams for explaining details of an operation of the number detecting device.
Figure 56B:
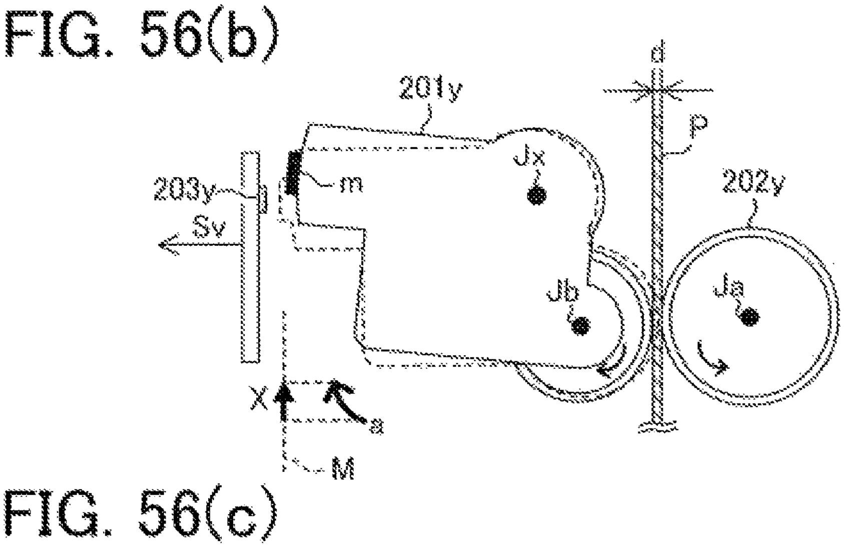
Figure 56C:
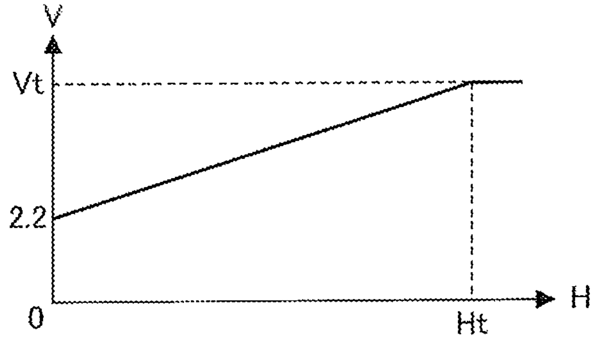

FIGS. 56(*a*) and 56(*b*) are diagrams for explaining a specific example of the operation of the shifting member 201*y*. FIG. 56(*a*) assumes a case in which there is no paper sheet batch (paper sheets) on the transport route A. As described above, the shifting member 201*y* is biased toward the detection roller 202*y* (in the direction of the arrow b in FIG. 55 described above). Therefore, when there is no paper sheet on the transport route A, the shifting member 201*y* abuts the detection roller 202*y*.

Specifically, the shifting member 201*y* is configured to include a body member 201*ya* and the transport roller 201*yb*. When there is no paper sheet on the transport route A, the transport roller 201*yb* of the shifting member 201*y* abuts the detection roller 202*y*. As illustrated in FIG. 56(*a*), the transport roller 201*yb* is provided to be rotatable on a shaft portion Jb provided on the body member 201*ya*. The transport roller 201*yb* rotates when a paper sheet batch (paper sheets) is transported by the detection roller 202*y*.

The shaft portion Jx described above is provided on the body member 201*ya*. Both the body member 201*ya* and the transport roller 201*yb* (the shaft portion Jb) integrally rotate on the shaft portion Jx (see FIG. 56(*b*) described later). The magnet m is provided on the body member 201*ya*. As illustrated in FIG. 56(*a*), the magnet m on the body member 201*ya* substantially faces the hall IC 203*y* when the detection roller 202*y* abuts the transport roller 201*yb* (when there is no paper sheet on the transport route A).

FIG. 56(*b*) is a diagram for explaining the operation of the shifting member 201*y* at the time of movement of a paper sheet batch (paper sheets) on the transport route A. A paper sheet batch P moving on the transport route A is illustrated in FIG. 56(*b*). The specific example illustrated in FIG. 56(*b*) assumes a case in which the thickness of the paper sheet batch P is about d mm (millimeters). As described above, when the paper sheet batch P moves on the transport route A, the paper sheet batch P passes between the shifting member 201*y* (the transport roller 201*yb*) and the detection roller 202*y*.

In this configuration, when the paper sheet batch P moves on the transport route A, the shifting member 201*y* rotates on the shaft portion Jx in the direction of the arrow a. In FIG. 56(*b*), the shifting member 201*y* after rotation is indicated by a solid line, and the shifting member 201*y* before rotation is indicated by a broken line. Before and after shifting of the shifting member 201*y*, the location relation among the shaft portion Ja of the detection roller 202*y*, the shaft portion Jx of the shifting member 201*y*, and the hall IC 203*y* does not change (is fixed).

As is understood also from FIG. 56(*b*), the shift amount of the shifting member 201*y* changes depending on the thickness (about d mm) of the paper sheet batch P. Specifically, the shift amount of the shifting member 201*y* increases substantially proportionately to the thickness of the paper sheet batch P. That is, the change amount of the distance from the center of the hall IC 203*y* to the center of the magnet m is larger as the paper sheet batch P is thicker. Hereinafter, the direction indicated by the arrow a projected on a plane (M in FIG. 56(*b*)) parallel to a face of the hall IC 203*y* on the side of the shifting member 201*y* (the magnet m) is referred to as "X-axis direction" for the sake of explanations. The X-axis direction in FIG. 56(*b*) is substantially parallel to the upper direction. The shift amount of the magnet m (the distance by which the magnet m has moved) in the X-axis direction is sometimes referred to as "shift amount H".

FIG. 56(*c*) is a diagram for explaining a specific example of the voltage value V indicated by the voltage signal Sv. The voltage value V changes depending on a magnetic force of the magnet m, which is detected by the hall IC 203*y*. That is, the voltage value V changes according to the location relation between the hall IC 203*y* and the magnet m (the shifting member 201*y*). This configuration can be restated as that the voltage value V changes depending on the shift amount H described above.

FIG. 56(*c*) illustrates a relation between the voltage value V (the vertical axis) and the shift amount H (the horizontal axis). As illustrated in FIG. 56(*c*), the voltage value V increases substantially proportionately to the shift amount H. A paper sheet handling device 11 of the present embodiment is formed to cause (enable) a shift amount (an actual shift amount) of the magnet m in the direction of the arrow a (see FIG. 56(*b*) described above) to substantially match (to be approximated by) the shift amount H (the shift amount in the X-axis direction). The shift amount (the shift amount H) of the magnet m in the direction of the arrow a is substantially proportionate to the thickness of the paper sheet batch P abutting the detection roller 202*y*. That is, the voltage value V increases substantially proportionately to the thickness of the paper sheet batch P.

As illustrated in FIG. 56(*c*), when the shift amount H becomes larger than a threshold value "Ht", the voltage value V becomes substantially constant at a value "Vt". The shifting member 201*y* of the present embodiment is formed to prevent the shift amount H from exceeding the threshold value "Ht" even when a paper sheet batch P having the largest thickness moves on the transport route A.

As illustrated in FIG. 56(*c*), even when the shift amount H has a value "0", the voltage value V has a value (about 2.2 V) larger than a value "0". In the present embodiment, as will be described in detail later, the voltage value V in a case in which the shift amount H has a value "0" is corrected to a value "0" (see FIGS. 59(*b*) and 59(*c*) described later). The cashbox control board 952 calculates (estimates) the number of paper sheets in a paper sheet batch P using the voltage value V (thickness information Da) on the basis of the relation between the shift amount H and the voltage value V illustrated in FIG. 56(*c*). This configuration is explained in detail below.

Figure 57:
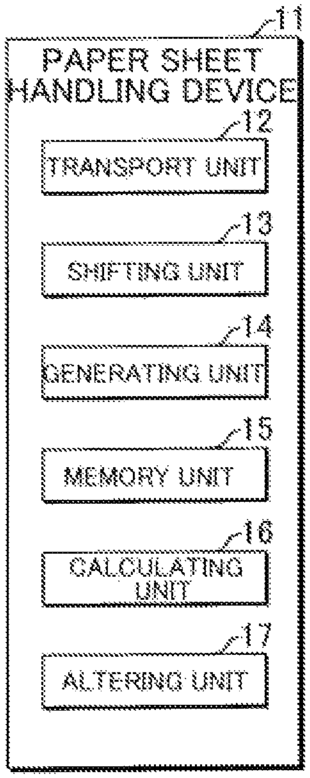
FIG. 57 is a functional block diagram of a paper sheet handling device.

FIG. 57 is a functional block diagram of the paper sheet handling device 11 in the present embodiment. As illustrated in FIG. 57, the paper sheet handling device 11 is configured to include a transport unit 12, a shifting unit 13, a generating unit 14, a memory unit 15, a calculating unit 16, and an altering unit 17. The CPU 101*x* of the cashbox control board 952 described above executes a program, whereby these functions are realized. For example, the transport unit 12 can transport a paper sheet batch, and the detection roller 202*y* described above can be adopted as the transport unit 12. The shifting unit 13 shifts according to the thickness of a paper sheet batch when the paper sheet batch is transported, and the shifting member 201*y* described above can be adopted as the shifting unit 13.

The generating unit 14 generates the thickness information Da. The thickness information Da is information based on a shift amount (the shift amount H) of the shifting unit 13 and is generated by the take-in time processing. Specifically, the thickness information Da is generated based on the voltage value V indicated by the voltage signal Sv. As described above, the voltage value V changes depending on the shift amount H. Furthermore, the shift amount H changes depending on the thickness of a paper sheet batch. That is, the thickness information Da is restated as information based on the thickness of a paper sheet batch. A specific example of a configuration to generate the thickness information Da is explained in detail with reference to FIGS. 58(*a*) and 58(*b*), and 59(*a*) to 59(*c*) described later.

The memory unit 15 memorizes reference information Dx. The reference information Dx is determined based on the thickness of one paper sheet. Specifically, the reference information Dx is the thickness information Da generated when one paper sheet is transported in the paper sheet handling device 11. This reference information Dx is previously generated and memorized in the memory unit 15 before shipment of the paper sheet handling device 11. In some cases, plural types of paper sheets are transported in the paper sheet handling device 11. In these cases, a configuration in which the thickness information Da is generated for each of the plural types of paper sheets to memorize the average value of plural pieces of the thickness information Da as the reference information Dx is suitable.

The calculating unit 16 calculates the number of paper sheets in a paper sheet batch from the thickness information Da and the reference information Dx. Specifically, the number of paper sheets in a paper sheet batch is calculated by dividing the thickness information Da by the reference information Dx. A specific example of the calculation method of the number of paper sheets in a paper sheet batch will be explained in detail with reference to FIG. 60 described later.

The altering unit 17 can alter the reference information Dx memorized in the memory unit 15. Specifically, the paper sheet handling device 11 is configured to be able to download new reference information Dx. When new reference information Dx is downloaded, the altering unit 17 rewrites the existing reference information Dx memorized in the memory unit 15 with the new reference information Dx. A case in which the type of paper sheets handled by the paper sheet handling device 11 is altered is assumed. In this case, an inconvenience that the number of paper sheets in a paper sheet batch cannot be accurately calculated with the existing reference information Dx may occur. With the altering unit 17 of the present embodiment, the reference information Dx can be altered depending on paper sheets to be newly handled. Therefore, there is an advantage that the inconvenience described above can be suppressed.

Figure 58A:
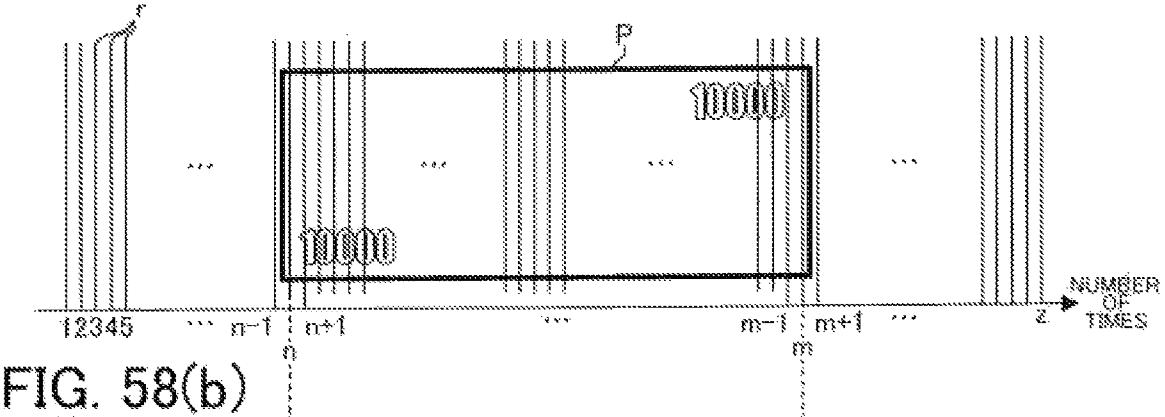
FIG. 58 are diagrams for explaining a specific example of detecting processing.
Figure 58B:
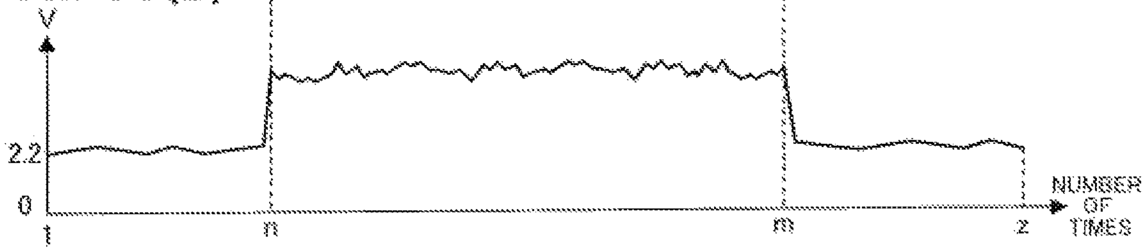

FIGS. 58(*a*) and 58(*b*) are diagrams for explaining a specific example of detecting processing in the take-in time processing. In the detecting processing, a current value of the voltage value V is detected (memorized). In the present embodiment, the detecting processing is performed plural times at one time of the take-in time processing. That is, when one paper sheet batch is taken in, a plurality of voltage values V are memorized. Specifically, the paper sheet take-in device 11 memorizes a voltage value V each time the detection roller 202*y* rotates by about θ degrees (for example, θ degrees=12 degrees). When the detection roller 202*y* rotates by about θ degrees, the paper sheet batch P is transported by about L mm (millimeters) (for example, L mm=1.57 mm).

The horizontal axis of FIG. 58(*a*) represents the number of times the detecting processing has been performed (hereinafter, sometimes referred to as "the number of times of detection"). Lines r respectively corresponding to the numbers of times of detection are illustrated in FIG. 58(*a*). These lines r include lines r located on a paper sheet batch P and lines r not located on the paper sheet batch P. A situation in which a line r is not located on a paper sheet batch P implies that the paper sheet batch P does not abut the detection roller 202*y* in execution of detecting processing at the number-th time of detection corresponding to this line r. Similarly, a situation in which a line r is located on a paper sheet batch P implies that the paper sheet batch P abuts the detection roller 202*y* in execution of detecting processing at the number-th time of detection corresponding to this line r.

The location of a line r on a paper sheet batch P indicates a region of the paper sheet batch P abutting the detection roller 202*y* in execution of detecting processing at the number-th time of detection corresponding to this line r. That is, the location of each line r indicates a region of the paper sheet batch P abutting the detection roller 202 when a voltage value V is detected. Hereinafter, a voltage value V detected in the detecting processing at the current number-th time of detection is sometimes referred to simply as "voltage value V at the number-th time of detection" for sake of explanations.

The detecting processing is repeatedly performed since before a paper sheet batch P reaches the detection roller 202*y*. In the specific example of FIG. 58(*a*), a case in which a paper sheet batch P does not reach the detection roller 202*y* until the number of times of detection reaches n is assumed. In this case, the detection roller 202*y* does not abut the paper sheet batch P (abuts the transport roller 201*yb*) until the number of times of detection reaches n. As will be described in detail later, each voltage value V detected before a paper sheet batch P reaches the detection roller 202*y* is used as a corresponding correction value C in correcting processing (see FIGS. 59(*a*) to 59(*c*)). In the specific example of FIG. 58(*a*), a case in which the detection roller 202*y* abuts a paper sheet batch P from the nth time of detection until the mth time of detection and does not abut the paper sheet batch P at the (m+1)th and subsequent times of detection is assumed.

FIG. 58(*b*) is a diagram for explaining a specific example of the voltage value V at each number of times of detection. In the specific example of FIG. 58(*b*), a case in which the detection roller 202*y* abuts a paper sheet batch P at the nth to mth times of detection is assumed similarly to the specific example of FIG. 58(*a*) described above. As described above, the voltage values V in a period in which a paper sheet batch P is located between the detection roller 202*y* and the transport roller 201*yb* (a period in which the shifting unit 13 is in a shifted state) are larger than those in other periods. Therefore, the voltage values V at the nth to mth times of detection are larger than the voltage values V at other numbers of times of detection.

In the period in which the detection roller 202*y* does not abut the paper sheet batch P, the voltage values V are supposed to be constant because the distance from the detection roller 202*y* to the transport roller 201*yb* does not change. However, if the paper sheet handling device 11 has a structural defect, the distance from the detection roller 202*y* to the transport roller 201*yb* may change even in the period in which the detection roller 202*y* does not abut the paper sheet batch P. Such a structural defect occurs, for example, when the shaft portion Ja of the detection roller 202*y* is formed out of the original location. When such a structural defect is included, the voltage values V at the numbers (0 to n−1 and m+1 to z) of times of detection in the period in which the detection roller 202*y* does not abut the paper sheet batch P are not constant as illustrated in FIG. 58(*b*).

As is understood from the above explanations, in the configuration of the present embodiment, an inconvenience that a noise value is superimposed on the voltage value V at each number of times of detection may occur. This noise value is also superimposed on the voltage values V in the period in which the paper sheet batch P abuts the detection roller 202*y*. This case has a disadvantage that an error is likely to occur in the number of paper sheets calculated using the voltage values V. In view of the above circumstances, correcting processing to eliminate the noise value described above from the voltage value V is enabled in the present embodiment. This correcting processing is explained in detail below.

Figure 59A:
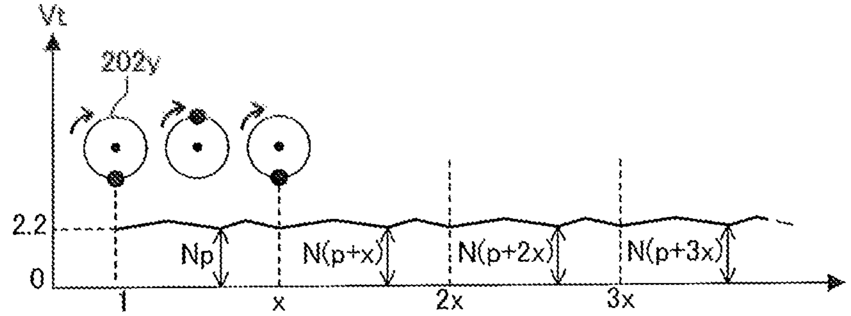
FIG. 59 are diagrams for explaining details of correcting processing.
Figure 59B:
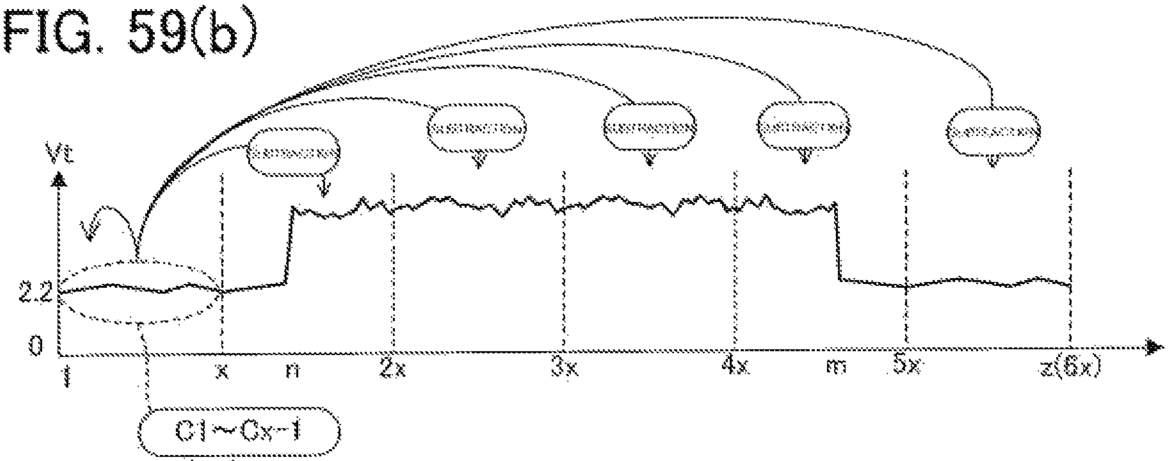
Figure 59C:
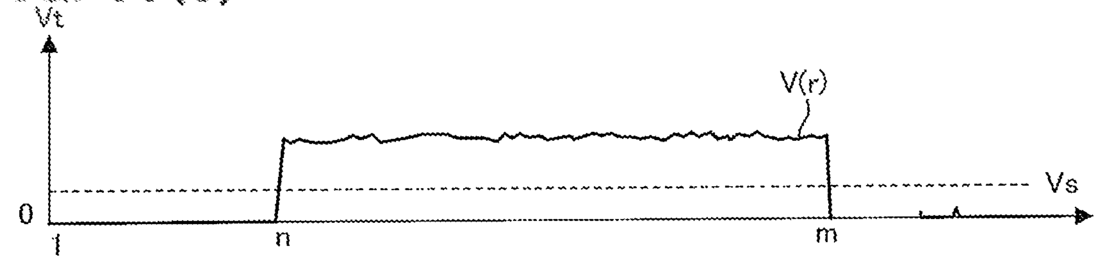

FIGS. 59(*a*) to 59(*c*) are diagrams for explaining details of the correcting processing. As described above, the noise value is superimposed on the voltage value V at each number of times of detection. FIG. 59(*a*) is a diagram for explaining the noise value at each number of times of detection. FIG. 59(*a*) illustrates the voltage value V at each number of times of detection, generated when the detection roller 202*y* continues to rotate in a state in which no paper sheet batch P is transported. The voltage value V at each of the numbers of times of detection is a noise value at the corresponding number of times of detection. Hereinafter, a noise value at the pth (p is an integer equal to or larger than a value 0) time of detection is referred to as "noise value Np" for sake of explanations. For example, a noise value N at the first time of detection is a noise value N1.

In the present embodiment, the detecting processing is performed x times while the detection roller 202*y* rotates once. That is, as illustrated in FIG. 59(*a*), when the detection roller 202*y* rotates once, the number of times of detection becomes x. Similarly, the number of times of detection becomes 2× when the detection roller 202*y* rotates twice, and the number of times of detection becomes 3× when the detection roller 202*y* rotates three times. That is, the number of times of detection increases by x each time the detection roller 202*y* rotates once. For example, a configuration in which the voltage value V is detected each time the detection roller 202*y* rotates by about 12 degrees is assumed. In this configuration, the number of times of detection becomes 30 when the detection roller 202*y* rotates once, and becomes 60 when the detection roller 202*y* rotates twice.

The noise value N caused by the structural defect (such as misalignment of the shaft portion Ja) described above is in a condition of periodically changing (having periodicity) each time the detection roller 202*y* rotates once as illustrated in FIG. 59(*a*). Therefore, for example, the noise N1 is substantially equal to a noise Nx detected at a time when the detection roller 202*y* has rotated once after the noise value N1 is detected, a noise value N2x detected at a time when the detection roller 202*y* has rotated twice, a noise value N3x detected at a time when the detection roller 202*y* has rotated three times. That is, when a certain number of times of detections is "p", a noise value Np is substantially equal to a noise value N(p+x), a noise value N(p+2x), a noise value N(p+3x).

As is understood from the above explanations, the noise value N at each number of times of detection in the second and subsequent rotations of the detection roller 202*y* can be estimated from the noise value N at each number of times of detection in the first rotation. In the correcting processing of the present embodiment, the noise value N at each number of times of detection from a predetermined start moment until the detection roller 202*y* has rotated once is acquired and each of the voltage values V at all the numbers (0 to z) of times of detection can be corrected using the acquired noise value N as the correction value C. This configuration is explained in detail below.

FIG. 59(*b*) is a diagram for explaining a specific example of the correction value C. FIG. 59(*b*) illustrates the voltage value V at each number of times of detection similarly to FIG. 58(*b*) described above.

The paper sheet handling device 11 (the transport route A) of the present embodiment is configured in such a manner that the detection roller 202*y* rotates once or more times in a period from when the take-in time processing is started until a paper sheet batch P reaches the detection roller 202*y*. As described above, the detection roller 202*y* rotates once in the x times of detection. In this configuration, at least the voltage values V from the first time of detection to the xth time of detection are noise values N.

In the correcting processing, the paper sheet handling device 11 memorizes the voltage values V from the first time of detection to the xth time of detection as the corresponding correction values C(1 to x).

The paper sheet handling device 11 subtracts the corresponding correction value C from the voltage value V at each number of times of detection. For example, the correction values C(1 to x) are subtracted from the voltage values V at the first to xth times of detection (in a period in which the number of rotations of the detection roller 202*y* is one), respectively. Specifically, the correction value C1 is subtracted from the voltage value V detected at the first time of detection, the correction value C2 is subtracted from the voltage value V at the second time, the correction value C3 is subtracted from the voltage value V at the third time, . . . , and the correction value Cx is subtracted from the voltage value V at the xth time. Since these correction values C and the corresponding voltage values V are same values, respectively, the voltage values V are corrected to a value "0".

The paper sheet handling device 11 also subtracts the correction values C(1 to x) from the voltage values V at the (x+1)th to 2xth times of detection (in a period in which the number of rotations of the detection roller 202_y_ is two), respectively. Specifically, the correction value C1 is subtracted from the voltage value V detected at the (x+1)th time of detection, the correction value C2 is subtracted from the voltage value V at the (x+2)th time, the correction value C3 is subtracted from the voltage value V at the (x+3)th time, . . . , and the correction value Cx is subtracted from the voltage value V at the 2xth time.

In the specific example of FIG. 59(_b_), a case in which the paper sheet batch P does not abut the detection roller 202_y_ at the (x+1)th to (n−1)th times of detection and abuts the detection roller 202_y_ at the nth (n<2x) and subsequent times of detection is assumed. In this case, when the corresponding correction values C are subtracted, the voltage values V at the (x+1)th to (n−1)th times of detection are corrected to about a value "0". Meanwhile, the voltage values V at the nth to 2xth times of detection are corrected to values from which the noise values N (estimated values) at the corresponding times of detection have been eliminated.

The paper sheet handling device 11 also subtracts the correction values C(1 to x) from the voltage values V at the (2x+1)th to 3xth times of detection (in a period in which the number of rotations of the detection roller 202_y_ is three), respectively. Similarly, the correction values C(1 to x) are subtracted from the voltage values V at the (3x+1)th to 4xth times of detection (in a period in which the number of rotations of the detection roller 202_y_ is four), and are subtracted from the voltage values V at the (4x+1)th to 5xth times of detection (in a period in which the number of rotations of the detection roller 202_y_ is five) to correct the voltage values V at the corresponding times of detection, respectively.

As is understood from the above explanations, in the present embodiment, the correction values C are determined from the corresponding voltage values V at the first to xth times of detection and the voltage values V at other numbers of times of detections can be corrected with the corresponding correction values C, respectively, in view of the periodicity of the noise value N. The paper sheet handling device 11 generates the thickness information Da using the corrected voltage values V.

FIG. 59(_c_) is a diagram for explaining a specific example of the thickness information Da. FIG. 59(_c_) illustrates the corrected voltage values V at the corresponding numbers of times of detection. In the specific example of FIG. 59(_c_), a case in which a paper sheet batch P abuts the detection roller 202_y_ in a period from the nth to mth times of detection is assumed. In this case, as illustrated in FIG. 59(_c_), most voltage values V other than the voltage values V at the nth to mth times of detection are corrected to about a value "0" by the correcting processing described above.

The present embodiment is configured in such a manner that the voltage value V becomes larger than a threshold value Vs (for example, Vs=0.1 V) when one or more paper sheets abut the detection roller 202_y_. In the specific example of FIG. 59(_c_), the voltage values V at the nth to mth times of detection are larger than the threshold value Vs, and the voltage values V at other numbers of times than the nth to mth times of detection are equal to or smaller than the threshold value Vs.

The paper sheet handling device 11 obtains the thickness information Da using the following formula 1 when the corrected voltage value V at each of the numbers of times of detection is "V(r)". In the formula 1, "r" denotes a certain number of times of detection. Furthermore, "n" in the formula 1 denotes the number of times of detection when the voltage value V has first exceeded the threshold value Vs. In the formula 1, "m" denotes the number of times of detection when the voltage value V has first fallen below the threshold value Vs after exceeding the threshold value Vs.

$$Da = \sum_{r=n}^{r=m} V(r) \qquad \text{[Formula 1]}$$

As is understood from the formula 1, the thickness information Da is a sum of the voltage values V at the numbers (n to m) of times of detection in a period in which a paper sheet batch P (paper sheets) abut the detection roller 202_y_. The paper sheet handling device 11 calculates (estimates) the number of paper sheets in the paper sheet batch P from the thickness information Da.

The voltage signal Sv is affected by noise in some cases. In these cases, an inconvenience that the voltage value V exceeding the threshold value Vs is temporarily detected in a period before a paper sheet batch P (the head) reaches the detection roller 202_y_ may occur. In view of the circumstances described above, a configuration to determine that a paper sheet batch P has reached the detection roller 202_y_ when the voltage value V exceeding the threshold value Vs is detected a predetermined number of times (for example, three times) in a row after the take-in time processing is started may be applied. In this configuration, the thickness information Da is generated with the voltage values V detected after it is determined that a paper sheet batch P has reached the detection roller 202_y_.

Similarly, an inconvenience that the voltage value V smaller than the threshold value Vs is temporarily detected in a period before a paper sheet batch P (the rear end) passes the detection roller 202_y_ may occur. In view of the circumstances described above, a configuration to determine that a paper sheet batch P has passed the detection roller 202_y_ when the voltage value V smaller than the threshold value Vs is detected a predetermined number of times (for example, three times) in a row after it is determined that the paper sheet batch P has reached the detection roller 202_y_ is suitable. In this configuration, the thickness information Da is generated with the voltage values V detected after the paper sheet batch P is determined to have reached the detection roller 202_y_ until the paper sheet batch P is determined to have passed the detection roller 202_y_. The inconvenience described above is suppressed with this configuration.

It is also possible to calculate the thickness of a paper sheet batch P with one voltage value V and calculate the number of paper sheets in the paper sheet batch P. Therefore, in the present embodiment, a configuration (hereinafter, "modification") in which the voltage value V is detected only once may be applied.

However, the thickness of a paper sheet in a first region (for example, a watermarked region) and the thickness in a second region (for example, a region in which images are printed) different from the first region are sometimes different from each other. Therefore, even in a case in which the voltage value V is detected for a plurality of paper sheet batches P each including the same number of paper sheets, a common voltage value V cannot be detected in some cases where the directions of the paper sheets in the paper sheet batches are different. That is, in the modification described above, the voltage value V may vary even if the voltage value V is detected for paper sheet batches P each including the same number of paper sheets. That is, the calculated numbers of paper sheets may vary.

As is understood from the above explanations, in the modification in which the voltage value V is detected only once, an inconvenience that different numbers of paper sheets are calculated when the numbers of paper sheets in a plurality of paper sheet batches P are calculated is likely to occur. According to the present embodiment, since the thickness information Da is generated with plural voltage values V corresponding to the thicknesses in plural regions of a paper sheet batch P, it is advantageous that the inconvenience described above is suppressed, for example, as compared to the modification.

Figure 60:
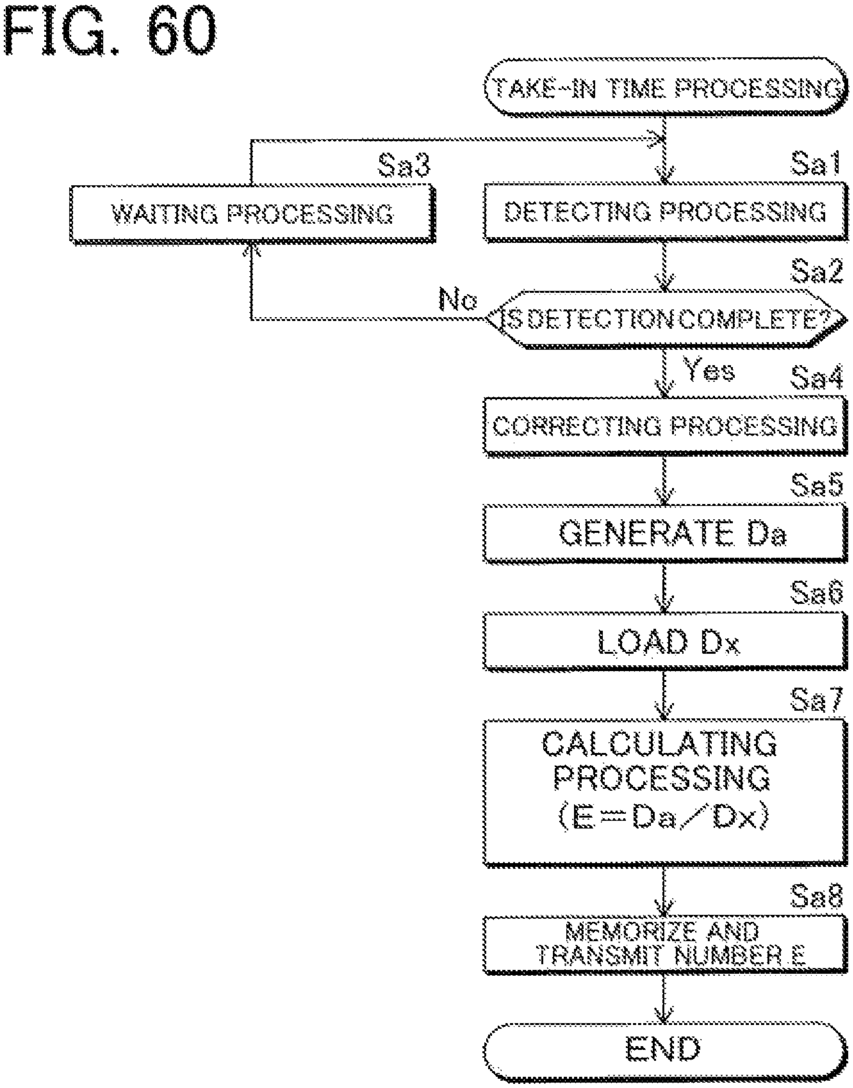
FIG. 60 is a flowchart of number calculating processing of the paper sheet handling device.

FIG. 60 is a flowchart of the take-in time processing. The paper sheet handling device 11 performs common take-in time processing in both of a case in which a paper sheet batch is transported to the transport route A from the transport route 965 (the direction switching and transferring device H) and a case in which a paper sheet is transported to the transport route A from the error banknote transport route 972. However, a configuration in which different take-in time processing is performed in each of these cases may be applied. The take-in time processing is started, for example, when entry of a paper sheet (a paper sheet batch) into the transport route A is detected.

When the take-in time processing is started, the paper sheet handling device 11 performs the detecting processing (Sa1). In the detecting processing, the voltage value V at each number of times of detection is detected (memorized). For example, in the first detecting processing, the voltage value V at the first time of detection is detected. After performing the detecting processing, the paper sheet handling device 11 determines whether the number of times of detection has reached a predetermined value z (for example, z=180) (Sa2).

When it is determined that the number of times of detection has not reached the value z (Sa2: No), the paper sheet handling device 11 waits until a timing when the next voltage value V is detected (until the detection roller 202*y* has rotated by θ degrees) (Sa3). Steps Sa1 to Sa3 described above are repeated until the number of times of detection has reached z (Sa2: Yes).

When it is determined that the number of times of detection has reached z, the paper sheet handling device 11 performs the correcting processing (Sa4). In the correcting processing, as described above, the correction value C is subtracted from each of the voltage values V detected in the detecting processing to correct the voltage values V. After performing the correcting processing, the paper sheet handling device 11 generates the thickness information Da (Sa5). Specifically, the paper sheet handling device 11 generates the thickness information Da using the formula 1 described above. When the thickness information Da is calculated, the paper sheet handling device 11 loads the reference information Dx (Sa6).

After loading the reference information Dx, the paper sheet handling device 11 performs the calculating processing (Sa7). In this calculating processing, the number E of paper sheets in a paper sheet batch is calculated. Specifically, in the calculating processing, the number E is calculated by dividing the thickness information Da generated at Step Sa5 described above by the reference information Dx loaded at Step S6. After performing the calculating processing, the paper sheet handling device 11 memorizes the number E in a predetermined memory region (for example, the RAM 103*x*) and transmits information indicating the number E to the cashbox control board 952 (Sa8). When the calculation result of the calculating processing is not an integer, the nearest whole number obtained by rounding the calculation result is memorized as the number E.

In the present embodiment, when a paper sheet is deposited, the associated receiving unit 600 transmits a deposit signal corresponding to the paper sheet to the management unit 1000. The management unit 1000 specifies a total number of paper sheets deposited in each of the receiving units 600 from the deposit signals. The management unit 1000 compares the total number specified from the deposit signals and the number E transmitted at Step Sa8 described above with each other. If the total number specified from the deposit signals and the number E differ from each other, the management unit 1000 issues a predetermined warning.

When a paper sheet is deposited into each of the receiving units 600, the denomination of the paper sheet is highly accurately identified. In view of the circumstances described above, the number detecting device 980 on the side of the cashbox 950 (on the downstream side) relative to the receiving units 600 does not identify the denomination of the paper sheet. However, the possibility that a paper sheet is lost from each of the receiving units 600 to the number detecting device 980 is not completely eliminated. The present embodiment has an advantage that whether all paper sheets have been stored in the cashbox unit 950 can be known with small processing load.

The configurations described above can be appropriately changed. For example, it suffices that the shifting member 201*y* shifts according to the thickness of a paper sheet batch, and the configuration thereof is not limited to the example described above. Instead of the shifting member 201*y* described above, a member that slides by a distance corresponding to the thickness of a banknote batch when the banknote batch is transported may be adopted. A configuration in which the shifting member 201*y* is provided to be able to move integrally with another member (hereinafter, "intermediary member") and the intermediary member abuts a paper sheet batch to shift according to the thickness of the paper sheet batch may be applied.

[Summary of Actions and Effects of Aspect Examples of Present Embodiment]

<First Aspect>

A paper sheet handling device (11) of the present aspect includes a transport unit (12) that transports a paper sheet batch, a shifting unit (13) that shifts according to a thickness of the paper sheet batch when the paper sheet batch is transported by the transport unit, a generating unit (14) that generates thickness information (Da) based on a shift amount (H) of the shifting unit, a memory unit (15) that memorizes reference information (Dx) determined based on a thickness of one paper sheet, and a calculating unit (16) that calculates the number (E) of paper sheets in the paper sheet batch from the thickness information and the reference information. According to the present aspect, the number of paper sheets in a paper sheet batch can be calculated.

<Second Aspect>

In the paper sheet handling device (11) of the present aspect, the thickness information is generated according to a thickness of the paper sheet batch in a first region, and a thickness thereof in a second region different from the first region. According to the present aspect, the number of paper sheets in a paper sheet batch can be calculated more accurately than, for example, in a configuration in which the number of paper sheets is calculated using only one voltage value V.

<Third Aspect>

The paper sheet handling device (11) of the present aspect includes an altering unit (17) that can alter the reference information. According to the present aspect, the reference information can be altered in association with alteration of the type of paper sheets to be transported by the paper sheet handling device. Therefore, for example, as compared to a configuration in which the reference information cannot be altered, the number of paper sheets can be calculated more accurately even when the type of paper sheets to be transported by the paper sheet handling device is altered.

<Fourth Aspect>

A calculation method of the number of paper sheets in a paper sheet batch being transported of the present aspect includes a step of memorizing reference information determined based on a thickness of one paper sheet, a step of generating thickness information based on a shift amount of a shifting unit that shifts according to a thickness of the paper sheet batch when the paper sheet batch is transported, and a step of calculating the number of paper sheets in the paper sheet batch from the thickness information and the reference information. According to the present aspect, effects identical to those of the first aspect described above are provided.

<Fifth Aspect>

A program of the present aspect causes a computer to perform the steps of the calculation method of the fourth aspect. According to the present aspect, effects identical to those of the first aspect described above are provided.

REFERENCE SIGNS LIST

L bank facility, P banknote (paper sheet), 1 game machine, 2 sandwiched machine, 10 banknote transport system (paper sheet transport mechanism), 100 air blowing tube (second circulation pipe), 100*a* one end portion, 100*b* the other end portion, 101 air flow path, 110 first air blowing tube, 111 moving route part, 120 second air blowing tube, 200 moving body, 210 divided piece, 211 hinge part, 213 moving body magnet (moving body magnetic material), 300 air-blow control unit (air-flow control device), 310 blower (air flow generating device), 320 switching unit, 321 casing, 323 flow path, 325 switching valve, 330 first circulation pipe, 330*a* one end portion, 330*b* the other end portion, 331 discharge tube, 333 intake tube, 340 connection pipe, C banknote (paper sheet) transport device, 400 transport tube (transport route), 401 transport path (transport body route, transport route), 402 base transport path, 403 banknote (paper sheet) transport path, 405 concave portion, 450 keeping part, 460, 465 guide plate, 500 transport body, 510 transport base, 520 divided piece, 520*a* internal space, 520*b* protrusion, 520*c* inner region, 521 hinge part, 523 transport body magnet (transport body magnetic material), 525 roller, 540 banknote collecting/retaining part, 541 support member, 541*a* pivotally support part, 541*b* spring (elastic member), 544 collecting pawl (collecting member), 545 roller, 600 receiving unit (paper sheet receiving device), 601 housing, 605 paper sheet receiving part, 610 introducing part, 612 introducing route, 613 first introducing route part, 613*a* entrance route part, 613*b* keeping route part, 615 second introducing route part, 617 inversion roller, 619 inversion path (inversion part), 620 transport mechanism, 630 recognition unit, 700 cashbox unit, 701 housing, 701*a* housing body, 701*b* door, H direction switching and transferring device (swivel stacker device), DM drive mechanism, 710 motor, 710*a* output shaft, 711 base board (fixed base part), 711*a* bearing member, 711A seating, 711B rubber cushion, 712 driving shaft, 716 link, 716*a* shaft, 717 link, 717*a* shaft, 717A pressing actuating member, 718 bearing part, 718*a* base shaft part, 718*a* shaft part, 730 operating mechanism, 732, 732*a*, 732*b* operating base piece, 740 first operating lever, 740*a* contact plate, 745 second operating lever, 750 tension spring, 760 rear wall, 762 butting portion, 800 stacker base, 802 bearing member, 803 fixed-side clamping part (clamping means), 805 actuated part, 810 shaft part, M clamping-means actuating mechanism, M1 first clamping-means actuating mechanism, M2 second clamping-means actuating mechanism, 812 clamping means (movable-side clamping part), 813 clamping-means biasing member, 814 clamping-means actuating lever, 814*a* engaging protrusion, 815 roller, 820 first releasing piece, 820*a* spring, 820*b* convex piece, 825 second releasing piece, 825A arm, 825B arm, 825*a* shaft part, 825*b* shaft part, S aligning-means actuating mechanism, 850 aligning means, 855 shaft part, 856 biasing member, 858 lever, 859 roller, 858 aligning-means actuating lever, 859 roller, PM pinch-roller actuating mechanism, 870 pinch roller, 880 actuating piece, 880*a* pressing part, 880*a* long hole, 880*b* pressing part, 881 actuating piece, 881*a* shaft, 882 pinch-roller support member, 882 support member, 882 holding member, 883 elastic member, 950 cashbox, 952 cashbox control board (security box control board), 960 takeout member, 961 takeout belt, 1000 management unit (control means), 1001 housing, 980 number detecting device, 201*y* shifting member, 202*y* detection roller, 203*y* hall IC, 204*y* ADC, 101*x* CPU, 102*x* ROM, 103*x* RAM, 11 paper sheet handling device, 12 transport unit, 13 shifting unit, 14 generating unit, 15 memory unit, 16 calculating unit, 17 altering unit.

The invention claimed is:

1. A paper sheet handling device comprising:

a detection roller that transports a paper sheet batch;

a shifting member that shifts according to a thickness of the paper sheet batch when the paper sheet batch is transported by the detection roller;

wherein the paper sheet handling device generates thickness information based on a shift amount of the shifting member;

memorizes reference information determined based on a thickness of one paper sheet; and calculates a number of paper sheets in the paper sheet batch from the thickness information and the reference information.

2. The paper sheet handling device according to claim 1, wherein the thickness information is generated according to a thickness of the paper sheet batch in a first region, and a thickness thereof in a second region different from the first region.

3. The paper sheet handling device according to claim 2, wherein the paper sheet handling device can alter the reference information.

4. The paper sheet handling device according to claim 1, wherein the paper sheet handling device can alter the reference information.

5. A calculation method of number of paper sheets in a paper sheet batch being transported, the method comprising:

a step of memorizing reference information determined based on a thickness of one paper sheet;

a step of generating thickness information based on a shift amount of a shifting member that shifts according to a thickness of the paper sheet batch when the paper sheet batch is transported; and a step of calculating a number of paper sheets in the paper sheet batch from the thickness information and the reference information.

6. A non-transitory storage medium recording a program for causing a computer to perform a calculation method of number of paper sheets in a paper sheet batch being transported, the method comprising:

a step of memorizing reference information determined based on a thickness of one paper sheet;

a step of transporting a paper sheet batch;

a step of generating thickness information based on a shift amount of a shifting member that shifts according to a thickness of the paper sheet batch when the paper sheet batch is transported; and a step of calculating a number of paper sheets in the paper sheet batch from the thickness information and the reference information.

* * * * *